US012652610B2

(12) United States Patent
Noh et al.

(10) Patent No.: US 12,652,610 B2
(45) Date of Patent: Jun. 9, 2026

(54) METHOD FOR RECEIVING DOWNLINK SIGNAL AND CHANNEL IN WIRELESS COMMUNICATION SYSTEM, AND DEVICE THEREFOR

(71) Applicant: WILUS INSTITUTE OF STANDARDS AND TECHNOLOGY INC., Gyeonggi-do (KR)

(72) Inventors: Minseok Noh, Seoul (KR); Kyungjun Choi, Gyeonggi-do (KR); Geunyoung Seok, Seoul (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 508 days.

(21) Appl. No.: 18/135,123

(22) Filed: Apr. 15, 2023

(65) Prior Publication Data

US 2023/0254761 A1 Aug. 10, 2023

Related U.S. Application Data

(63) Continuation of application No. PCT/KR2021/014522, filed on Oct. 18, 2021.

(30) Foreign Application Priority Data

Oct. 16, 2020 (KR) ........................ 10-2020-0134690
Feb. 26, 2021 (KR) ........................ 10-2021-0027004

(51) Int. Cl.
| | |
|---|---|
| *H04W 48/10* | (2009.01) |
| *H04L 5/00* | (2006.01) |
| *H04W 72/0446* | (2023.01) |

(52) U.S. Cl.
CPC .......... *H04W 48/10* (2013.01); *H04L 5/0053* (2013.01); *H04W 72/0446* (2013.01)

(58) Field of Classification Search
CPC .. H04W 48/10; H04W 72/0446; H04L 5/0053
See application file for complete search history.

(56) References Cited

U.S. PATENT DOCUMENTS

| | | |
|---|---|---|
| 11,160,050 B2 | 10/2021 | Si et al. |
| 2021/0083911 A1 | 3/2021 | Morozov et al. |

(Continued)

FOREIGN PATENT DOCUMENTS

| | | |
|---|---|---|
| CN | 108702768 | 10/2018 |
| KR | 10-2019-0011699 | 2/2019 |

(Continued)

OTHER PUBLICATIONS

Office Action dated May 1, 2024 for Korean Patent Application No. 10-2023-7016484 and its English translation provided by Applicant's foreign counsel.

(Continued)

*Primary Examiner* — Michael Thier
*Assistant Examiner* — Nevena Zecevic Sandhu
(74) *Attorney, Agent, or Firm* — WOMBLE BOND DICKINSON (US) LLP

(57) ABSTRACT

A method, performed by a terminal, for receiving a downlink signal and channel in a wireless communication system comprises the steps of: receiving a synchronization signals and PBCH block (SSB) from a base station; and transmitting an uplink channel to the base station on the basis of the SSB.

18 Claims, 42 Drawing Sheets

(56) References Cited

U.S. PATENT DOCUMENTS

| | | | |
|---|---|---|---|
| 2021/0084605 A1* | 3/2021 | Wu | H04L 5/0094 |
| 2021/0235419 A1 | 7/2021 | Si | |
| 2022/0279590 A1 | 9/2022 | Lee et al. | |

FOREIGN PATENT DOCUMENTS

| | | |
|---|---|---|
| KR | 10-2020-0007686 | 1/2020 |
| KR | 10-2020-0085282 | 7/2020 |
| KR | 10-2020-0103624 | 9/2020 |
| WO | 2020/033689 | 2/2020 |
| WO | 2022/080996 | 4/2022 |
| WO | 2022/213240 | 10/2022 |

OTHER PUBLICATIONS

International Search Report for PCT/KR2021/014522 mailed on Feb. 8, 2022 and its English translation from WIPO (now published as WO 2022/080996).

Written Opinion of the International Searching Authority for PCT/KR2021/014522 mailed on Feb. 8, 2022 and its English translation from Google Translate (now published as WO 2022/080996).

Qualcomm Incorporated: "NR using existing DL/UL NR waveform to support operation between 52.6 GHz and 71 GHZ", 3GPP TSG-RAN WG1 #101-e, R1-2004500, e-Meeting, May 16, 2020, pp. 1-16.

Intel Corporation: "Discussion on Required Changes to NR in 52.6-71 GHz", 3GPP TSG RAN WG1 #102-e, R1-2006986, e-Meeting, Aug. 14, 2020, pp. 1-24.

Office Action dated Jan. 23, 2025 for Korean Patent Application No. 10-2023-7016484 and its English translation provided by Applicant's foreign counsel.

NTT Docomo, Inc.: "Remaining details on Remaining minimum system information delivery", 3GPP TSG RAN WG1 Meeting 91, R1-1720791, Reno, USA, Nov. 18, 2017, pp. 1-10.

Wilus Inc.: "Discussion on physical layer aspects for NR beyond 52.6GHz", 3GPP TSG RAN WG1 #102-e, R1-2006885, e-Meeting, Aug. 8, 2020, pp. 1-3.

Samsung: "Design aspects for extending NR to up to 71 GHz", 3GPP TSG RAN WG1 #102-e, R1-2006136, e-Meeting, Aug. 8, 2020, pp. 1-8.

Notice of Allowance dated Aug. 26, 2025 for Korean Patent Application No. 10-2023-7016484 and its English translation provided by Applicant's foreign counsel.

Intel Corporation: "Initial access signals/channels for NR-unlicensed", 3GPP TSG RAN WG1 Meeting #98, R1-1908621, Prague, Czech Republic, Aug. 26-30, 2019, pp. 1-17.

Moderator (Intel Corporation): "Discussion summary #2 of [102-e-NR-52-71-Waveform-Changes]", 3GPP TSG RAN WG1 Meeting #102-e, R1-2007109, e-Meeting, Aug. 17-28, 2020, pp. 1-59.

NTT Docomo, Inc.: "Initial access signals and channels for NR-U", 3GPP TSG RAN WG1 #99, R1-1913239, Reno, Nevada, USA, Nov. 18-22, 2019, pp. 1-13.

NTT Docomo, Inc.: "Initial access signals and channels for NR-U", 3GPP TSG RAN WG1 #99, R1-1912871, Reno, Nevada, USA, Nov. 18-22, 2019, pp. 1-12.

* cited by examiner 1 radio frame, $T_f = \left(\Delta f_{max} N_f / 100\right) \cdot T_c = 10\,ms$ 1 sub-frame, $T_{sf} = \left(\Delta f_{max} N_f / 1000\right) \cdot T_c = 1\,ms$

| #0 | #1 | #2 | #3 | ... | #8 | #9 |

| slot#0 | slot#1 | slot#2 | slot#3 | ... | #slot#($2^\mu$-2) | slot#($2^\mu$-1) |

1 slot, $T_{slot} = \left(\Delta f_{max} N_f / 1000\right) \cdot T_c \cdot 2^{-\mu} = 2^{-\mu}\,ms$ (a) Single CC            (b) Multiple CC

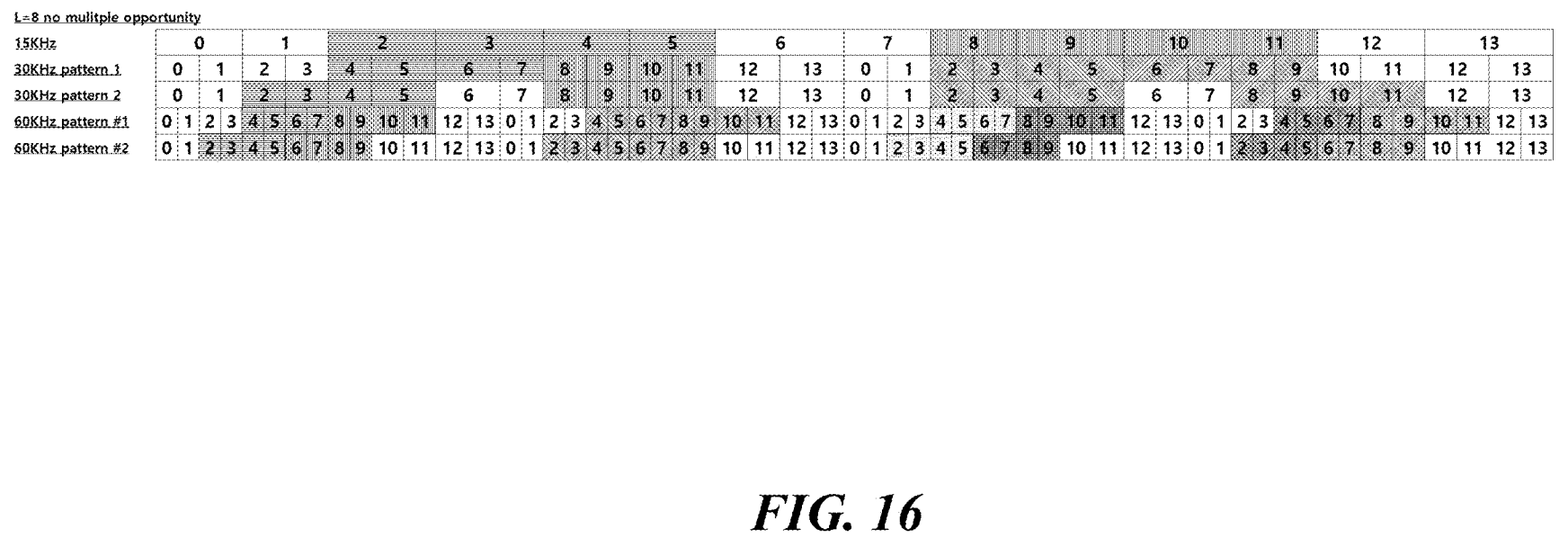

L=8 no multiple opportunity

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 15KHz | | | | | | | | | | | | | | |
| 30KHz pattern 1 | 0 | 2 | 3 | 4 | 5 | 6 | 7 | 8 | 9 | 10 | 11 | 12 | 13 | |
| 30KHz pattern 2 | 0 | 2 | 3 | 4 | 5 | 6 | 7 | 8 | 9 | 10 | 11 | 12 | 13 | |
| 60KHz pattern #1 | 0 1 | 2 3 | 4 5 | 6 7 | 8 9 | 10 11 | 12 13 | 0 1 | 2 3 | 4 5 | 6 7 | 8 9 | 10 11 | 12 13 |
| 60KHz pattern #2 | 0 1 | 2 3 | 4 5 | 6 7 | 8 9 | 10 11 | 12 13 | 0 1 | 2 3 | 4 5 | 6 7 | 8 9 | 10 11 | 12 13 |

*FIG. 16*

SSB pattern A: SSBs are at symbol {2,3,4,5} and {8,9,10,11} in the slot. (symbol index is starting from 0 in the slot.

SSB pattern B: SSBs are at symbol {2,3,4,5} and {9,10,11,12} in the slot. (symbol index is starting from 0 in the slot.

FIG. 37

METHOD FOR RECEIVING DOWNLINK SIGNAL AND CHANNEL IN WIRELESS COMMUNICATION SYSTEM, AND DEVICE THEREFOR

CROSS-REFERENCE TO RELATED APPLICATIONS

This application is a continuation of pending PCT International Application No. PCT/KR2021/014522, which was filed on Oct. 18, 2021, and which claims priority under 35 U.S.C 119(a) to Korean Patent Application No. 10-2020-0134690 filed with the Korean Intellectual Property Office on Oct. 16, 2020, and Korean Patent Application No. 10-2021-0027004 filed with the Korean Intellectual Property Office on Feb. 6, 2021. The disclosures of the above patent applications are incorporated herein by reference in their entirety.

TECHNICAL FIELD

This specification relates to a wireless communication system, and relates to a method for receiving a downlink signal and channel, and a device therefor.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

In recent years, with the explosion of mobile traffic due to the spread of smart devices, it is becoming difficult to cope with the increasing data usage for providing cellular communication services using only the existing licensed frequency spectrums or licensed frequency bands.

In such a situation, a method of using an unlicensed frequency spectrum or an unlicensed frequency band (e.g., 2.4 GHz band, 5 GHz band or higher band, or the like) for providing cellular communication services is being discussed as a solution to the problem of lack of spectrum.

Unlike in licensed bands in which telecommunications carriers secure exclusive use rights through procedures such as auctions, in unlicensed bands, multiple communication devices may be used simultaneously without restrictions on the condition that only a certain level of adjacent band protection regulations are observed. For this reason, when an unlicensed band is used for cellular communication service, it is difficult to guarantee the communication quality to the level provided in the licensed band, and it is likely that interference with existing wireless communication devices (e.g., wireless LAN devices) using the unlicensed band occurs.

In order to use LTE and NR technologies in unlicensed bands, research on coexistence with existing devices for unlicensed bands and efficient sharing of wireless channels is to be conducted in advance. That is, it is required to develop a robust coexistence mechanism (RCM) such that devices using LTE and NR technologies in the unlicensed band do not affect the existing devices for unlicensed bands.

DISCLOSURE OF INVENTION

Technical Problem

This specification is to provide a method for transmitting a downlink channel, and a device therefor.

Solution to Problem

This specification provides a method for receiving a downlink signal and channel in a wireless communication system.

Specifically, a method performed by a terminal includes: receiving a synchronization signals and PBCH block (SSB) from a base station; and transmitting an uplink channel to the base station, based on the SSB, wherein i) when a subcarrier spacing (SCS) is 480 KHz or 960 KHz, the SSB is transmitted on a symbol mapped to a first SSB candidate set and a second SSB candidate set, each of which is configured by four symbols, the first SSB candidate set and the second SSB candidate set are mapped on one slot, a start symbol to which the first SSB candidate set is mapped is a third symbol of the one slot, a start symbol to which the second SSB candidate set is mapped is a tenth symbol of the one slot, and at least one gap symbol for beam sweeping exists between the first SSB candidate set and the second SSB candidate set, and ii) when the subcarrier spacing (SCS) is 120 KHz, the SSB is transmitted on a symbol mapped to a first SSB candidate set, a second SSB candidate set, a third SSB candidate set, and a fourth SSB candidate set, each of which is configured by four symbols, the first SSB candidate set, the second SSB candidate set, the third SSB candidate set, and the fourth SSB candidate set are mapped on two slots, a start symbol to which the first SSB candidate set is mapped is a fifth symbol of the two slots, a start symbol to which the second SSB candidate set is mapped is a ninth symbol of the two slots, a start symbol to which the third SSB candidate set is mapped is a seventeenth symbol of the two slots, and a start symbol to which the fourth SSB candidate set is mapped is a twenty-first symbol of the two slots.

In this specification, the SSB mapped to the first SSB candidate set and the second SSB candidate set when the subcarrier spacing (SCS) is 480 KHz or 960 KHz, and the SSB mapped to the first SSB candidate set, the second SSB candidate set, the third SSB candidate set, and the fourth SSB candidate set when the subcarrier spacing (SCS) is 120 KHz are mapped to consecutive symbols.

A terminal for receiving a downlink signal and channel in a wireless communication system includes: a communication module; and a processor configured to control the communication module, wherein the processor is configured to receive a synchronization signals and PBCH block (SSB) from a base station, and transmit an uplink channel to the base station, based on the SSB, wherein i) when a subcarrier spacing (SCS) is 480 KHz or 960 KHz, the SSB is transmitted on a symbol mapped to a first SSB candidate set and a second SSB candidate set, each of which is configured by four symbols, the first SSB candidate set and the second SSB candidate set are mapped on one slot, a start symbol to which the first SSB candidate set is mapped is a third symbol of the one slot, a start symbol to which the second SSB candidate set is mapped is a tenth symbol of the one slot, and at least one gap symbol for beam sweeping exists between the first SSB candidate set and the second SSB candidate set, and ii) when the subcarrier spacing (SCS) is 120 KHz, the SSB is transmitted on a symbol mapped to a first SSB candidate set, a second SSB candidate set, a third SSB candidate set, and a fourth SSB candidate set, each of which is configured by four symbols, the first SSB candidate set, the second SSB candidate set, the third SSB candidate set, and the fourth SSB candidate set are mapped on two slots, a start symbol to which the first SSB candidate set is mapped is a fifth symbol of the two slots, a start symbol to which the second SSB candidate set is mapped is a ninth symbol of the two slots, a start symbol to which the third SSB candidate set is mapped is a seventeenth symbol of the two slots, and a start symbol to which the fourth SSB candidate set is mapped is a twenty-first symbol of the two slots.

This specification relates to a method for transmitting a downlink signal and channel in a wireless communication system, the method being performed by a base station and including: transmitting a synchronization signals and PBCH block (SSB) to a terminal; and receiving an uplink channel based on the SSB from the terminal, wherein i) when a subcarrier spacing (SCS) is 480 KHz or 960 KHz, the SSB is transmitted on a symbol mapped to a first SSB candidate set and a second SSB candidate set, each of which is configured by four symbols, the first SSB candidate set and the second SSB candidate set are mapped on one slot, a start symbol to which the first SSB candidate set is mapped is a third symbol of the one slot, a start symbol to which the second SSB candidate set is mapped is a tenth symbol of the one slot, and at least one gap symbol for beam sweeping exists between the first SSB candidate set and the second SSB candidate set, and ii) when the subcarrier spacing (SCS) is 120 KHz, the SSB is transmitted on a symbol mapped to a first SSB candidate set, a second SSB candidate set, a third SSB candidate set, and a fourth SSB candidate set, each of which is configured by four symbols, the first SSB candidate set, the second SSB candidate set, the third SSB candidate set, and the fourth SSB candidate set are mapped on two slots, a start symbol to which the first SSB candidate set is mapped is a fifth symbol of the two slots, a start symbol to which the second SSB candidate set is mapped is a ninth symbol of the two slots, a start symbol to which the third SSB candidate set is mapped is a seventeenth symbol of the two slots, and a start symbol to which the fourth SSB candidate set is mapped is a twenty-first symbol of the two slots.

In this specification, when the subcarrier spacing (SCS) is 480 KHz or 960 KHz, a first symbol, a second symbol, an eighth symbol, and a ninth symbol of the one slot are resources allocated for a control resource set (CORESET).

In this specification, when the subcarrier spacing (SCS) is 480 KHz or 960 KHz, the at least one gap symbol is a sixth symbol of the slot.

In this specification, the one slot is configured by a first half slot configured by seven symbols and a second half slot configured by seven symbols, and when the subcarrier spacing (SCS) is 480 KHz or 960 KHz, the first SSB candidate set and the second SSB candidate set are symmetrically mapped to the first half slot and the second half slot, respectively.

In this specification, the at least one gap symbol is a last symbol of the first half slot.

In this specification, when the subcarrier spacing (SCS) is 120 KHz, the SSB is transmitted within a discovery burst transmission window (DBTW), the DBTW is a resource having the maximum length of 5 ms, and the maximum number of multiple SSBs transmittable in the DBTW is 80.

In this specification, the DBTW is configured by 40 slots, the first SSB candidate set, the second SSB candidate set, the third SSB candidate set, and the fourth SSB candidate set are repeatedly mapped on a first slot set configured by slots other than a ninth slot, a tenth slot, a nineteenth slot, a twentieth slot, a twenty-ninth slot, a thirtieth slot, a thirty-ninth slot, and a fortieth slot among the 40 slots, and each of the slots configuring the first slot set includes two SSB candidate indexes indicating an SSB candidate set capable of transmitting the SSB.

In this specification, in odd-numbered slots among the slots configuring the first slot set, SSB candidates are mapped to locations of symbols to which the first SSB candidate set and the second SSB candidate set are mapped, and in even-numbered slots among the slots configuring the first slot set, SSB candidates are mapped to locations of symbols to which the third SSB candidate set and the fourth SSB candidate set are mapped.

In this specification, multiple SSB candidate sets capable of transmitting the SSB are additionally mapped on a second slot set configured by the ninth slot, the tenth slot, the nineteenth slot, the twentieth slot, the twenty-ninth slot, the thirtieth slot, the thirty-ninth slot, and the fortieth slot among the 40 slots, and each of the slots configuring the second slot set includes two SSB candidate indexes indicating an SSB candidate set capable of transmitting the SSB.

In this specification, in odd-numbered slots among the slots configuring the second slot set, SSB candidates are mapped to locations of symbols to which the first SSB candidate set and the second SSB candidate set are mapped, and in even-numbered slots among the slots configuring the second slot set, SSB candidates are mapped to locations of symbols to which the third SSB candidate set and the fourth SSB candidate set are mapped.

In this specification, the method may further include receiving, by the terminal, an indicator indicating that the multiple SSB candidate sets have been additionally mapped on the second slot set from the base station.

In this specification, the processor is configured to receive, from the base station, an indicator indicating that the multiple SSB candidate sets have been additionally mapped on the second slot set.

In this specification, the indicator is a parameter indicating a subcarrier spacing included in a master information block (MIB), and the subcarrier spacing is a subcarrier spacing used for remaining minimum system information (RMSI).

In this specification, the indicator is a parameter indicating an offset in a frequency domain included in the MIB, and the offset is an offset between resource blocks (RBs) available in a cell in which the terminal and the SSB are included.

This specification relates to a method for transmitting a downlink signal and channel in a wireless communication system, the method being performed by a base station and including: transmitting a synchronization signals and PBCH block (SSB) to a terminal; and receiving an uplink channel based on the SSB from the terminal, wherein i) when a subcarrier spacing (SCS) is 480 KHz or 960 KHz, the SSB is transmitted on a symbol mapped to a first SSB candidate set and a second SSB candidate set, each of which is configured by four symbols, the first SSB candidate set and the second SSB candidate set are mapped on one slot, a start symbol to which the first SSB candidate set is mapped is a third symbol of the one slot, a start symbol to which the second SSB candidate set is mapped is a tenth symbol of the one slot, and at least one gap symbol for beam sweeping exists between the first SSB candidate set and the second SSB candidate set, and ii) when the subcarrier spacing (SCS) is 120 KHz, the SSB is transmitted on a symbol mapped to a first SSB candidate set, a second SSB candidate set, a third SSB candidate set, and a fourth SSB candidate set, each of which is configured by four symbols, the first SSB candidate set, the second SSB candidate set, the third SSB candidate set, and the fourth SSB candidate set are mapped on two slots, a start symbol to which the first SSB candidate set is mapped is a fifth symbol of the two slots, a start symbol to which the second SSB candidate set is mapped is a ninth symbol of the two slots, a start symbol to which the third SSB candidate set is mapped is a seventeenth symbol of the two slots, and a start symbol to which the fourth SSB candidate set is mapped is a twenty-first symbol of the two slots.

Advantageous Effects of Invention

The purpose of this specification is to provide a method for determining a pattern of a synchronization signal and PBCH block in a wireless communication system.

The purpose of this specification is to provide a method for configuring a discovery reference signal including a synchronization signal and PBCH block.

BRIEF DESCRIPTION OF DRAWINGS

FIG. 11 is a diagram illustrating a position of an OFDM symbol occupied by SSB within a plurality of slots of a licensed band of an NR system according to an embodiment of the present invention.

FIG. 13 shows a location of an OFDM symbol in which an SSB is transmitted within a time interval of 1 ms in a case where a subcarrier spacing of 60 KHz is used and the maximum number of SSBs is 3 according to an embodiment of the disclosure.

FIG. 14 shows a location of an OFDM symbol in which an SSB is transmitted within a time interval of 1 ms in a case where a subcarrier spacing of 60 KHz is used and the maximum number of SSBs is 4 according to an embodiment of the disclosure.

FIG. 15 shows a location of an OFDM symbol in which an SSB is transmitted within a time interval of 1 ms in a case where a subcarrier spacing of 60 KHz is used and the maximum number of SSBs is 6 according to an embodiment of the disclosure.

FIG. 16 shows a location of an OFDM symbol in which an SSB is transmitted within a time interval of 1 ms in a case where a subcarrier spacing of 60 KHz is used for SSB transmission and the maximum number of SSBs is 8 according to an embodiment of the disclosure.

FIGS. 37 to 42 show a method for configuring an SSB for each of multiple subcarrier spacings.

BEST MODE FOR CARRYING OUT THE INVENTION

Figure 1:
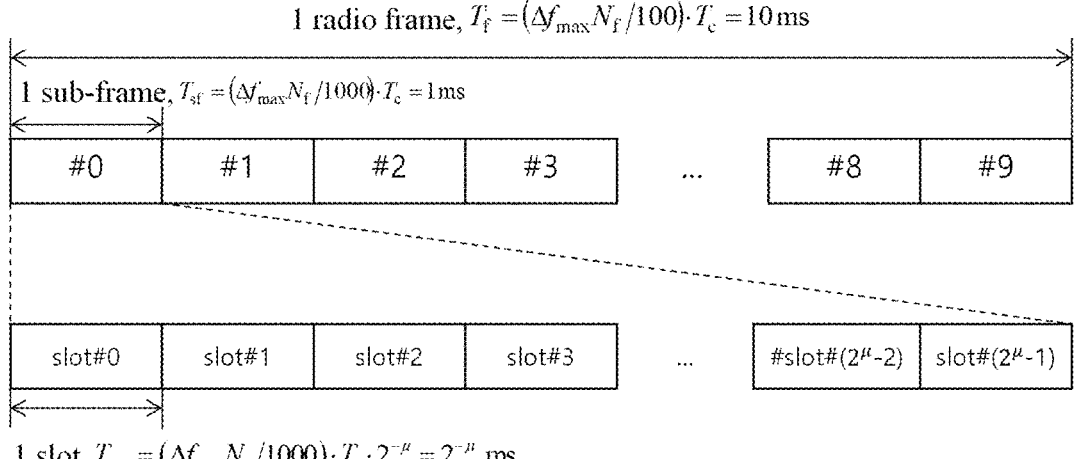
FIG. 1 illustrates an example of a wireless frame structure used in a wireless communication system.

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present invention is not limited thereto.

Unless otherwise specified in the present specification, a base station may include a next generation node B (gNB) defined in 3GPP NR. In addition, unless otherwise specified, the terminal may include user equipment (UE). Hereinafter, in order to help understanding the description, each content is divided into embodiments and described, but the respective embodiments may be used in combination with each other. In the present disclosure, the configuration of the terminal may indicate configuration by the base station. Specifically, the base station may transmit a channel or signal to the terminal to set an operation of the terminal or a parameter value used in a wireless communication system.

FIG. 1 illustrates an example of a wireless frame structure used in a wireless communication system.

Referring to FIG. 1, the wireless frame (or radio frame) used in the 3GPP NR system may have a length of 10 ms $(\Delta f_{max} N_f/100)^* T^c)$. In addition, the wireless frame includes 10 subframes (SFs) having equal sizes. Herein, $\Delta f_{max}=480*10^3$ Hz, $N_f=4096$, $T_c=1/(\Delta f_{ref}^* N_{f,ref})$, $\Delta f_{ref}=15*10^3$ Hz, and $N_{f,ref}=2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15*2^\mu$ kHz, and $\mu$ can have a value of $\mu=0, 1, 2, 3, 4$ as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^{-\mu}$ ms. Numbers from 0 to $2^\mu-1$ may be respectively allocated to $2^\mu$ slots within one wireless frame. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe index), and a slot number (or a slot index).

Figure 2:
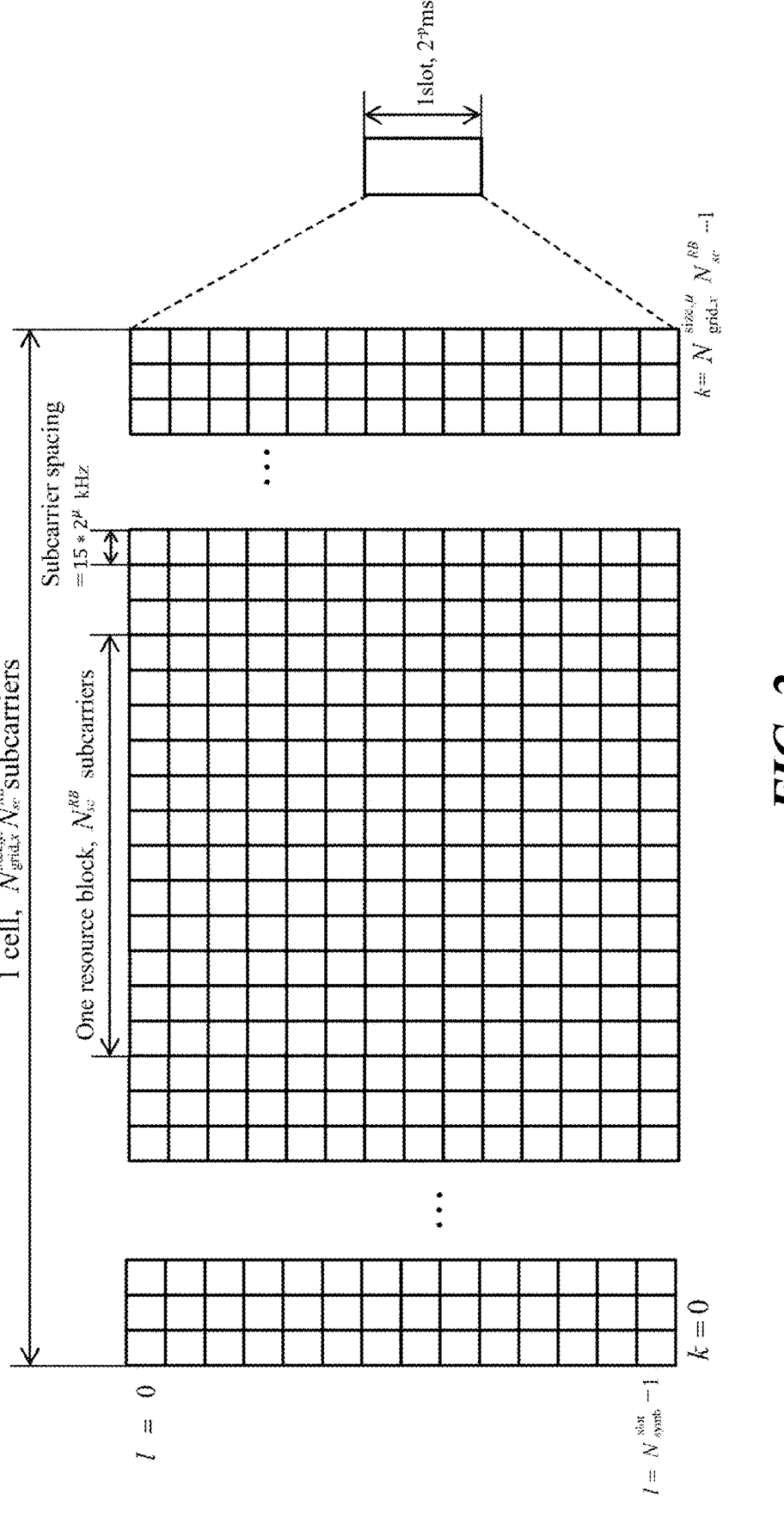
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{grid,x}*N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent $\mu$ (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x}*N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e. g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb}*N^{RB}_{sc}$ resource elements. Each resource element in the resource grid can be uniquely defined by a pair of indexes (k, l) in one slot. k may be an index assigned from 0 to $N^{size,\mu}_{grid,x}*N^{RB}_{sc}-1$ in the frequency domain, and l may be an index assigned from 0 to $N^{slot}_{symb}-1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated as a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

TABLE 1

| index | Symbol number in a slot | | | | | | | | | | | | | |
|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |

TABLE 1-continued

| index | Symbol number in a slot | | | | | | | | | | | | | |
|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | X | X | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | X | U | D | D | D | D | D | X | U |
| 47 | D | D | X | U | U | U | U | D | D | X | U | U | U | U |
| 48 | D | X | U | U | U | U | U | D | X | U | U | U | U | U |
| 49 | D | D | D | D | X | X | U | D | D | D | D | X | X | U |
| 50 | D | D | X | X | U | U | U | D | D | X | X | U | U | U |
| 51 | D | X | X | U | U | U | U | D | X | X | U | U | U | U |
| 52 | D | X | X | X | X | X | U | D | X | X | X | X | X | U |
| 53 | D | X | X | X | X | U | U | D | X | X | X | X | U | U |
| 54 | X | X | X | X | X | X | D | D | D | D | D | D | D | D |
| 55 | D | D | X | X | X | U | U | U | D | D | D | D | D | D |
| 56~ 255 | Reserved | | | | | | | | | | | | | |

In Table 1, D denotes a DL symbol, U denotes a UL symbol, and X denotes a flexible symbol. As shown in Table 1, up to two DL/UL switching in one slot may be allowed.

Figure 3:
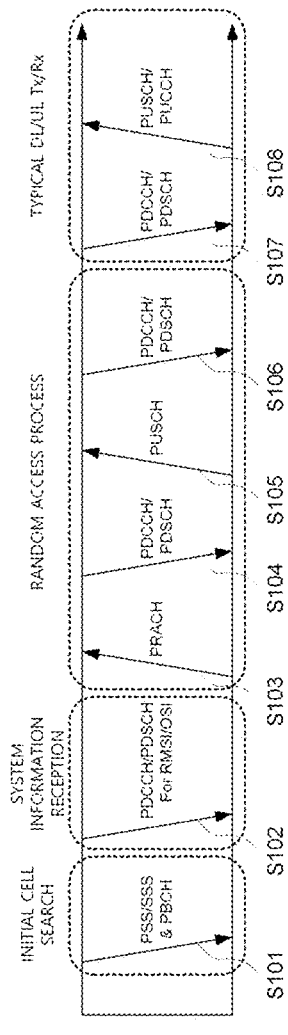
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (step S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (step S102). Herein, the system information received by the UE is cell-common system information for normal operating of the UE in a physical layer in radio resource control (RRC) and is referred to remaining system information, or system information block (SIB) 1 is called.

When the UE initially accesses the base station or does not have radio resources for signal transmission (i.e. the UE at RRC IDLE mode), the UE may perform a random access procedure on the base station (steps S103 to S106). First, the UE can transmit a preamble through a physical random access channel (PRACH) (step S103) and receive a response message for the preamble from the base station through the PDCCH and the corresponding PDSCH (step S104). When a valid random access response message is received by the UE, the UE transmits data including the identifier of the UE and the like to the base station through a physical uplink shared channel (PUSCH) indicated by the UL grant transmitted through the PDCCH from the base station (step S105). Next, the UE waits for reception of the PDCCH as an indication of the base station for collision resolution. If the UE successfully receives the PDCCH through the identifier of the UE (step S106), the random access process is terminated. The UE may obtain UE-specific system information for normal operating of the UE in the physical layer in RRC layer during a random access process. When the UE obtain the UE-specific system information, the UE enter RRC connecting mode (RRC_CONNECTED mode).

The RRC layer is used for generating or managing message for controlling connection between the UE and radio access network (RAN). In more detail, the base station and the UE, in the RRC layer, may perform broadcasting cell system information required by every UE in the cell, managing mobility and handover, measurement report of the UE, storage management including UE capability management and device management. In general, the RRC signal is not changed and maintained quite long interval since a period of an update of a signal delivered in the RRC layer is longer than a transmission time interval (TTI) in physical layer.

After the above-described procedure, the UE receives PDCCH/PDSCH (step S107) and transmits a physical uplink shared channel (PUSCH)/physical uplink control channel (PUCCH) (step S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and R777I may be included in channel state information (CSI). In the 3GPP NR system, the UE may transmit control information such as HARQ-ACK and CSI described above through the PUSCH and/or PUCCH.

Figure 4:
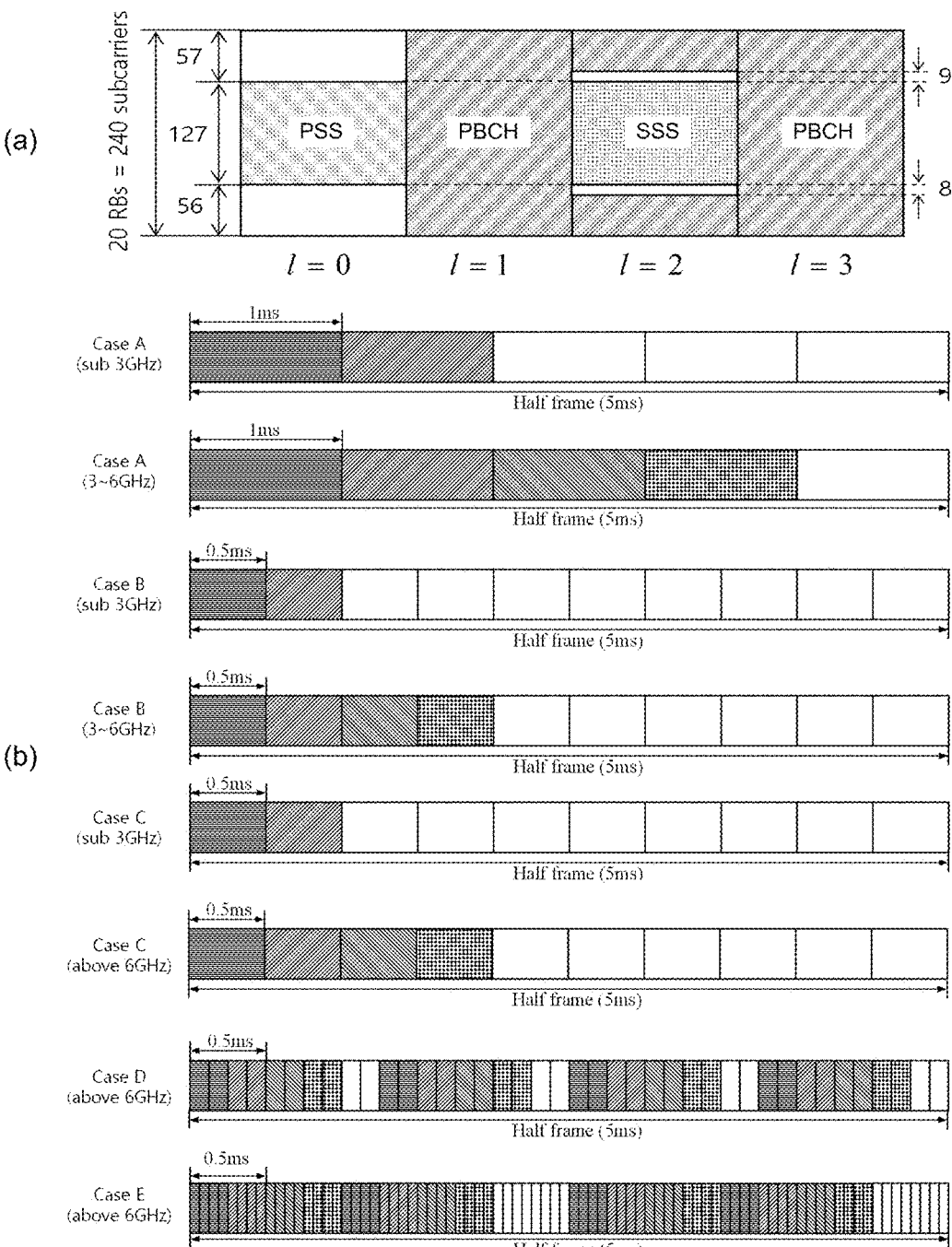
FIG. 4 illustrates an SS/PBCH block for initial cell access in a 3GPP NR system.

FIG. 4 illustrates an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity N"μm, of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4(a), a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4(a) and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

| Channel or signal | OFDM symbol number/ relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 239 |
| | 2 | 48, 49, . . . , 55, 183, 184, . . . , 191 |
| PBCH | 1, 3 | 0, 1, . . . , 239 |
| | 2 | 0, 1, . . . , 47, 192, 193, . . . , 239 |
| DM-RS for PBCH | 1, 3 | 0 + v, 4 + v, 8 + v, . . . , 236 + v |
| | 2 | 0 + v, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n) = 1 - 2x(m)$$

$$m = (n + 43N^{(2)}_{ID})\bmod 127$$

$$0 \le n < 127$$

Here, $x(i + 7) = (x(i + 4) + x(i))\bmod 2$ and is given as $$[x(6)\ x(5)\ x(4)\ x(3)\ x(2)\ x(1)\ x(0)] = [1\ 1\ 1\ 0\ 1\ 1\ 0]$$

Further, the sequence $d_{SSS}(n)$ of the SSS is as follows.

$$d_{SSS}(n) = [1 - 2x_0((n + m_0)\text{mod}127)][1 - 2x_1((n + m_1)\text{mod}127)]$$

$$m_0 = 15\left\lfloor \frac{N_{ID}^{(1)}}{112} \right\rfloor + 5N_{ID}^{(2)}$$

$$m_1 = N_{ID}^{(1)}\text{mod}112$$

$$0 \le n < 127$$

Here, $\begin{aligned}x_0(i + 7) &= (x_0(i + 4) + x_0(i))\text{mod}2 \\ x_1(i + 7) &= (x_1(i + 1) + x_1(i))\text{mod}2\end{aligned}$ and is given as $$[x_0(6)\ \ x_0(5)\ \ x_0(4)\ \ x_0(3)\ \ x_0(2)\ \ x_0(1)\ \ x_0(0)] = [0\ \ 0\ \ 0\ \ 0\ \ 0\ \ 0\ \ 1]$$

$$[x_1(6)\ \ x_1(5)\ \ x_1(4)\ \ x_1(3)\ \ x_1(2)\ \ x_1(1)\ \ x_1(0)] = [0\ \ 0\ \ 0\ \ 0\ \ 0\ \ 0\ \ 1]$$

A radio frame with a 10 ms length may be divided into two half frames with a 5 ms length. Referring to FIG. 4(b), a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5:
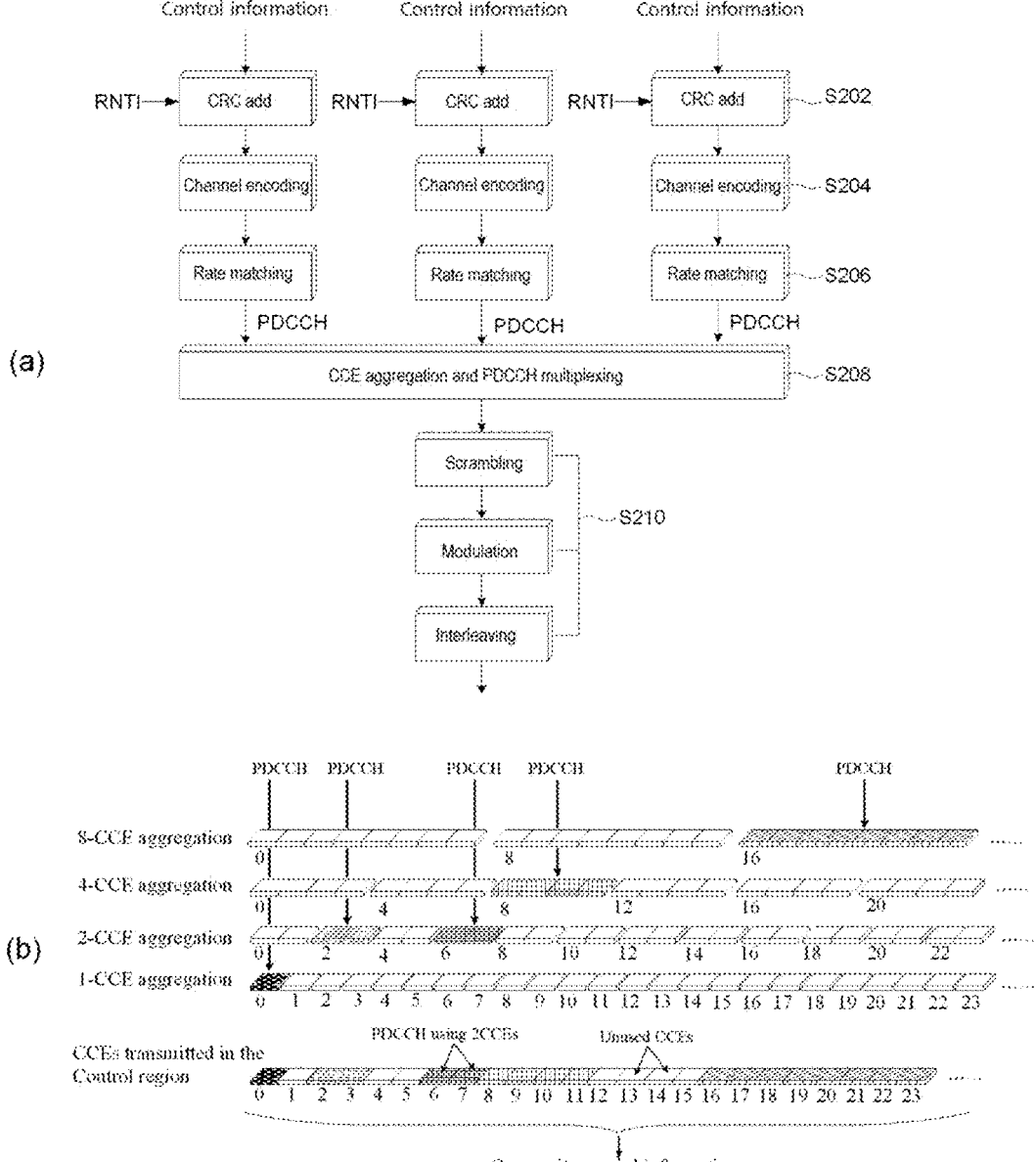
FIG. 5 illustrates a procedure for transmitting control information and a control channel in a 3GPP NR system.

FIG. 5 illustrates a procedure for transmitting control information and a control channel in a 3GPP NR system. Referring to FIG. 5(a), the base station may add a cyclic redundancy check (CRC) masked (e.g., an XOR operation) with a radio network temporary identifier (RNTI) to control information (e.g., downlink control information (DCI)) (step S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (step S206) according to the amount of resource(s) used for PDCCH transmission after performing channel encoding (e.g., polar coding) (step S204). Thereafter, the base station may multiplex the DCI(s) based on the control channel element (CCE) based PDCCH structure (step S208). In addition, the base station may apply an additional process (step S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5(b) is a diagram related to a CCE aggregation level and the multiplexing of a PDCCH and illustrates the type of a CCE aggregation level used for one PDCCH and CCE(s) transmitted in the control area according thereto.

Figure 6:
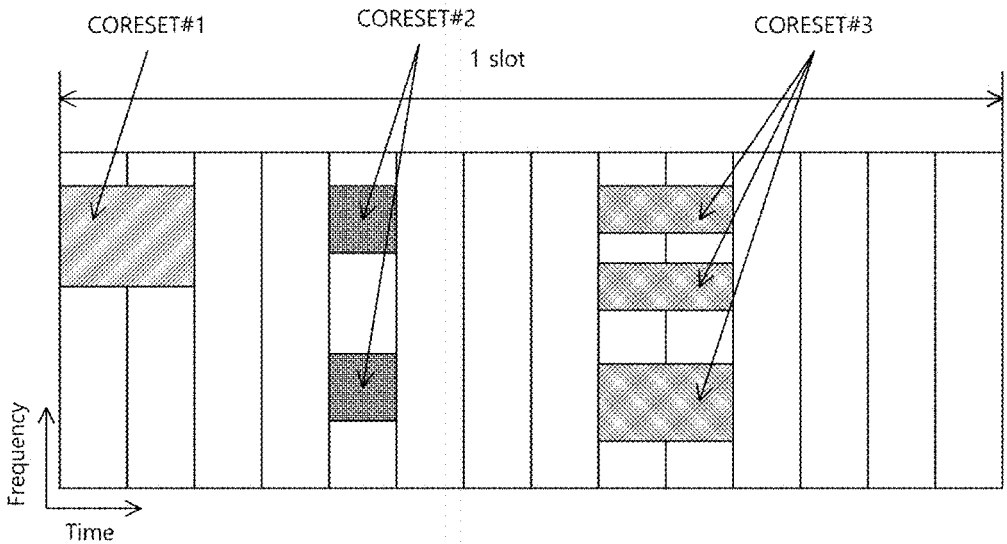
FIG. 6 illustrates a control resource set (CORESET) in which a physical downlink control channel (PUCCH) may be transmitted in a 3GPP NR system.

FIG. 6 illustrates a control resource set (CORESET) in which a physical downlink control channel (PUCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
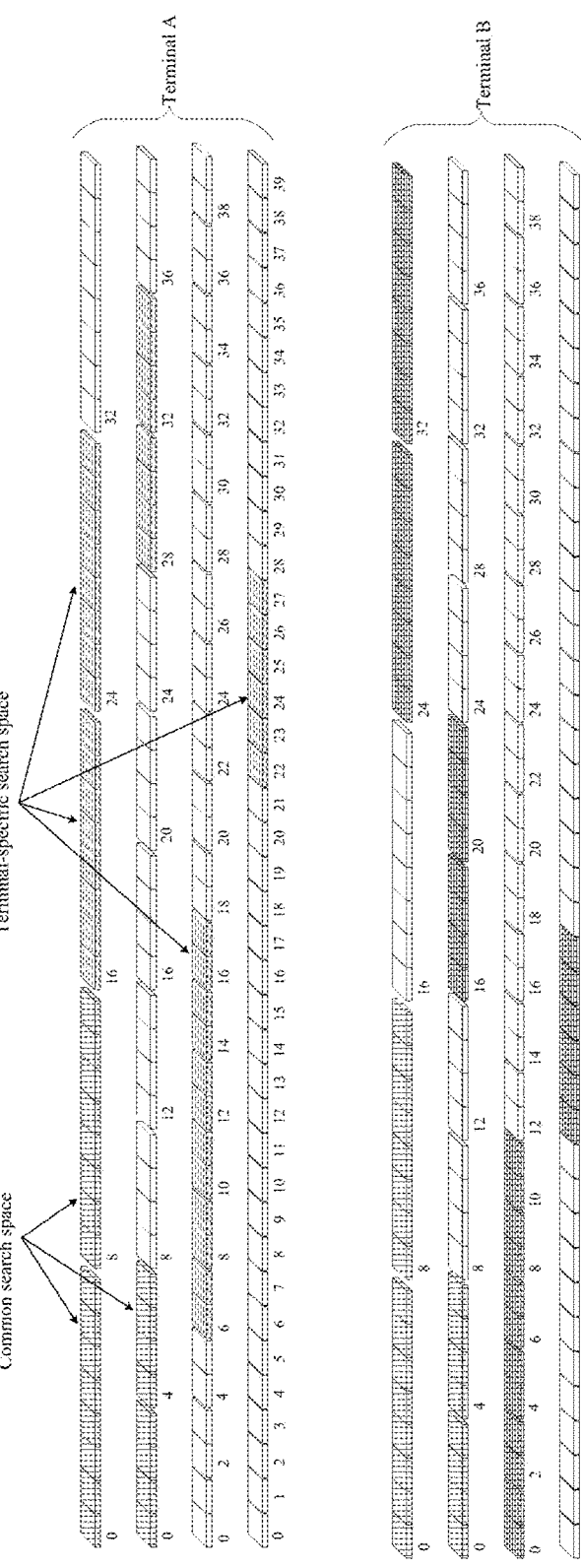
FIG. 7 illustrates a method for configuring a PDCCH search space in a 3GPP NR system.

FIG. 7 illustrates a method for setting a PDCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a UE-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to one or more UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a down-link-shared channel (DL-SCH) that are a transmission channel or information (i.e., UL grant) related to resource allocation of a uplink-shared channel (UL-SCH) and a hybrid automatic repeat request (HARD). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| PUCCH format | Length in OFDM symbols | Number of bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

The PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information successfully transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of delivering 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence on the two symbols may be transmitted through different RBs. In this case, the sequence may be a sequence cyclic shifted (CS) from a base sequence used in PUCCH format 0. Through this, the UE may obtain a frequency diversity gain. In more detail, the UE may determine a cyclic shift (CS) value $m_{cs}$ according to $M_{bit}$ bit UCI ($M_{bit}$=1 or 2). In addition, the base sequence having the length of 12 may be transmitted by mapping a cyclic shifted sequence based on a predetermined CS value $m_{cs}$ to one OFDM symbol and 12 REs of one RB. When the number of cyclic shifts available to the UE is 12 and $M_{bit}$=1, 1 bit UCI 0 and 1 may be mapped to two cyclic shifted sequences having a difference of 6 in the cyclic shift value, respectively. In addition, when $M_{bit}$=2, 2 bit UCI 00, 01, 11, and 10 may be mapped to four cyclic shifted sequences having a difference of 3 in cyclic shift values, respectively.

PUCCH format 1 may deliver 1-bit or 2-bit HARQ-ACK information or SR. PUCCH format 1 maybe transmitted through consecutive OFDM symbols on the time axis and one PRB on the frequency axis. Here, the number of OFDM symbols occupied by PUCCH format 1 may be one of 4 to 14. More specifically, UCI, which is $M_{bit}$=1, may be BPSK-modulated. The UE may modulate UCI, which is $M_{bit}$=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), . . . , d($M_{symbol}$–1). Here, $M_{symbol}$ may be $M_{bit}$/2. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI ($M_{bit}$>2) with π/2-Binary Phase Shift Keying (BPSK) or QPSK to generate a complex valued symbol d(0) to d($M_{symb}$−1). Here, when using π/2-BPSK, $M_{symb}$=$M_{bit}$, and when using QPSK, $M_{symb}$=$M_{bit}$/2. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, a UE may perform transmission/reception using a bandwidth equal to or less than the bandwidth of a carrier (or cell). For this, the UE may receive the Bandwidth part (BWP) configured with a continuous bandwidth of some of the carrier's bandwidth. A UE operating according to TDD or operating in an unpaired spectrum can receive up to four DL/UL BWP pairs in one carrier (or cell). In addition, the UE may activate one DL/UL BWP pair. A UE operating according to FDD or operating in paired spectrum can receive up to four DL BWPs on a DL carrier (or cell) and up to four UL BWPs on a UL carrier (or cell). The UE may activate one DL BWP and one UL BWP for each carrier (or cell). The UE may not perform reception or transmission in a time-frequency resource other than the activated BWP. The activated BWP may be referred to as an active BWP.

The base station may indicate the activated BWP among the BWPs configured by the UE through downlink control information (DCI). The BWP indicated through the DCI is activated and the other configured BWP(s) are deactivated. In a carrier (or cell) operating in TDD, the base station may include, in the DCI for scheduling PDSCH or PUSCH, a bandwidth part indicator (BPI) indicating the BWP to be activated to change the DL/UL BWP pair of the UE. The UE may receive the DCI for scheduling the PDSCH or PUSCH and may identify the DL/UL BWP pair activated based on the BPI. For a DL carrier (or cell) operating in an FDD, the base station may include a BPI indicating the BWP to be activated in the DCI for scheduling PDSCH so as to change the DL BWP of the UE. For a UL carrier (or cell) operating in an FDD, the base station may include a BPI indicating the BWP to be activated in the DCI for scheduling PUSCH so as to change the UL BWP of the UE.

Figure 8:
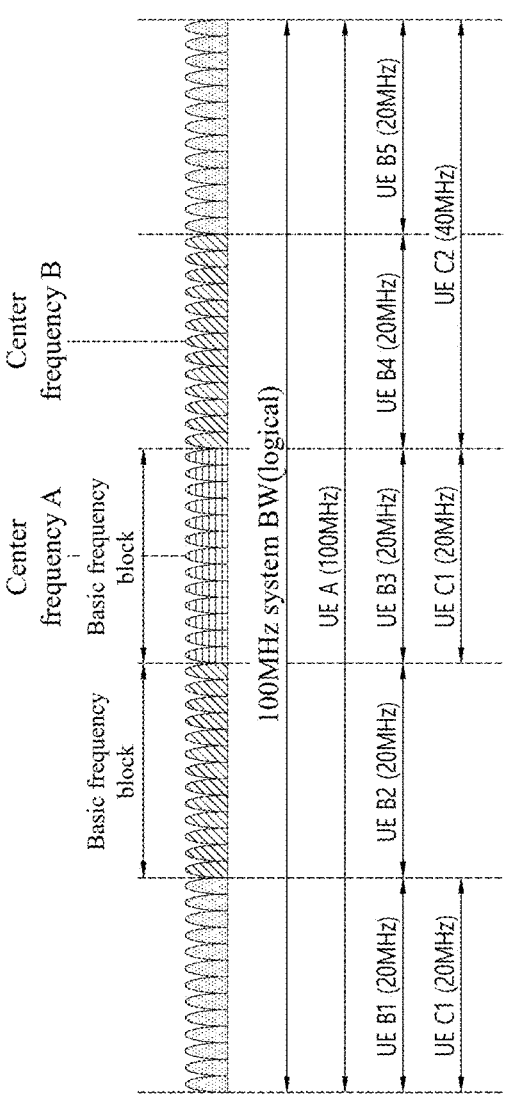
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs B1~B5 can use only a 20 MHz bandwidth and perform communication using one component carrier. UEs C1 and C2 may use a 40 MHz bandwidth and perform communication using two component carriers, respectively. The two component carriers may be logically/physically adjacent or non-adjacent. UE C1 represents the case of using two non-adjacent component carriers, and UE C2 represents the case of using two adjacent component carriers.

Figure 9:
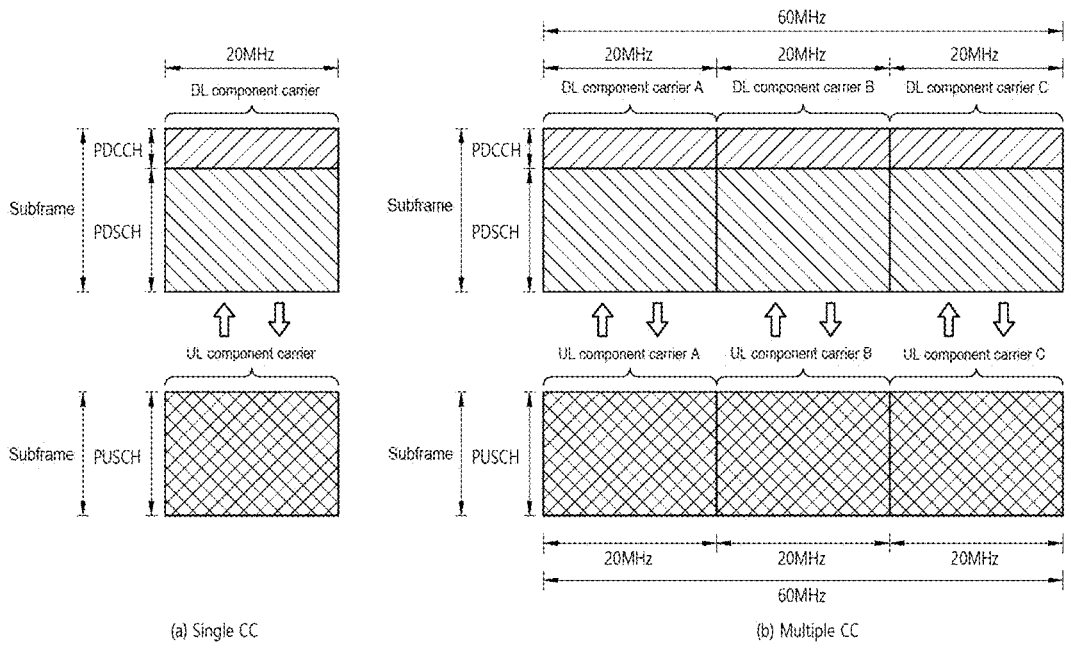
FIG. 9 is a diagram for explaining single carrier communication and multiple carrier communication.

FIG. 9 is a drawing for explaining single carrier communication and multiple carrier communication. Particularly, FIG. 9(a) shows a single carrier subframe structure and FIG. 9(b) shows a multi-carrier subframe structure.

Referring to FIG. 9(a), in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9(b), three 20 MHz component carriers (CCs) can be aggregated into each of UL and DL, so that a bandwidth of 60 MHz can be supported. Each CC may be adjacent or non-adjacent to one another in the frequency domain. FIG. 9(*b*) shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PS-cell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
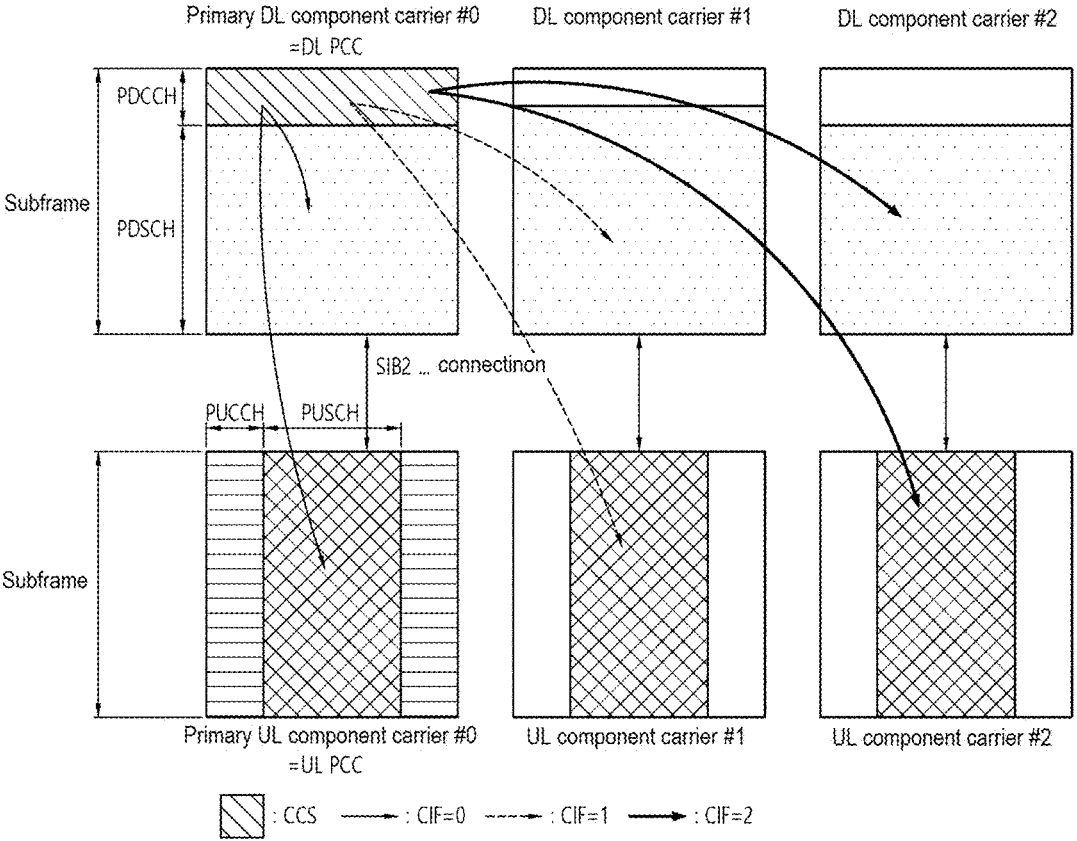
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

As described above, since the existing communication in the unlicensed band mostly operates based on LBT, a channel access in the NR-U system also performs LBT for coexistence with existing devices. Specifically, the channel access method on the unlicensed band in the NR may be classified into the following four categories according to the presence/absence of LBT/application method.

Category 1: No LBT

The Tx entity does not perform the LBT procedure for transmission.

Category 2: LBT without Random Backoff

The Tx entity senses whether a channel is idle during a first interval without random backoff to perform a transmission. That is, the Tx entity may perform a transmission through the channel immediately after the channel is sensed to be idle during the first interval. The first interval is an interval of a predetermined length immediately before the Tx entity performs the transmission. According to an embodiment, the first interval may be an interval of 25 µs length, but the present invention is not limited thereto.

Category 3: LBT Performing Random Backoff Using CW of Fixed Size

The Tx entity obtains a random value within the CW of the fixed size, sets it to an initial value of a backoff counter (or backoff timer) N, and performs backoff by using the set backoff counter N. That is, in the backoff procedure, the Tx entity decreases the backoff counter by 1 whenever the channel is sensed to be idle for a predetermined slot period. Here, the predetermined slot period may be 9 µs, but the present invention is not limited thereto. The backoff counter N is decreased by 1 from the initial value, and when the value of the backoff counter N reaches 0, the Tx entity may perform the transmission. Meanwhile, in order to perform back-off, the Tx entity first senses whether the channel is idle during a second interval (that is, a defer duration Td). According to an embodiment of the present invention, the Tx entity may sense (determine) whether the channel is idle during the second interval, according to whether the channel is idle for at least some period (e.g., one slot period) within the second interval. The second interval may be set based on the channel access priority class of the Tx entity, and consists of a period of 16 us and m consecutive slot periods. Here, m is a value set according to the channel access priority class. The Tx entity performs channel sensing to decrease the backoff counter when the channel is sensed to be idle during the second interval. On the other hand, when the channel is sensed to be busy during the backoff procedure, the backoff procedure is stopped. After stopping the backoff procedure, the Tx entity may resume backoff when the channel is sensed to be idle for an additional second interval. In this way, the Tx entity may perform the transmission when the channel is idle during the slot period of the backoff counter N, in addition to the second interval. In this case, the initial value of the backoff counter N is obtained within the CW of the fixed size.

Category 4: LBT Performing Random Backoff by Using CW of Variable Size

The Tx entity obtains a random value within the CW of a variable size, sets the random value to an initial value of a backoff counter (or backoff timer) N, and performs backoff by using the set backoff counter N. More specifically, the Tx entity may adjust the size of the CW based on HARQ-ACK information for the previous transmission, and the initial value of the backoff counter N is obtained within the CW of the adjusted size. A specific process of performing backoff by the Tx entity is as described in Category 3. The Tx entity may perform the transmission when the channel is idle during the slot period of the backoff counter N, in addition to the second interval. In this case, the initial value of the backoff counter N is obtained within the CW of the variable size.

In the above Category 1 to Category 4, the Tx entity may be a base station or a UE. According to an embodiment of the present invention, a first type channel access may refer to a Category 4 channel access, and a second type channel access may refer to a Category 2 channel access.

Figure 11:
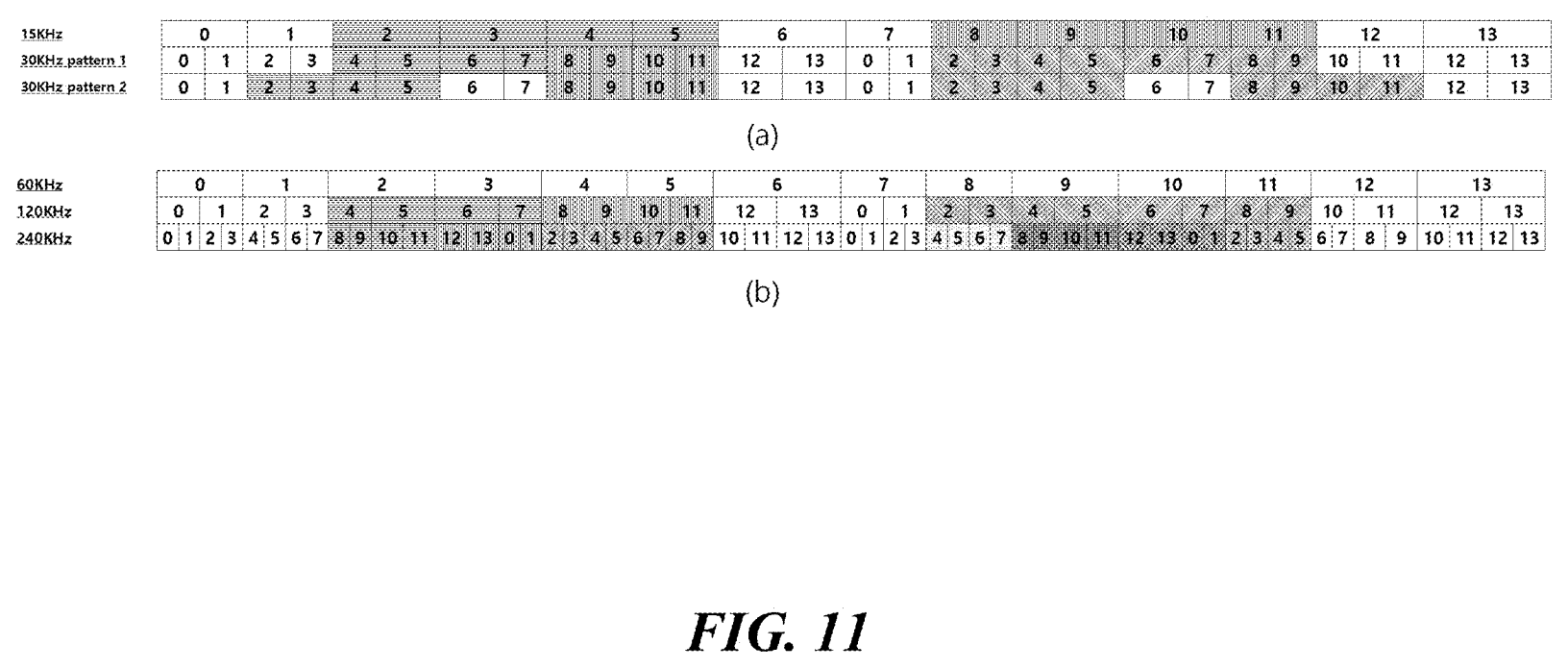

FIG. 11 is a diagram illustrating a position of an OFDM symbol occupied by SSB within a plurality of slots of a licensed band of an NR system according to an embodiment of the present invention.

The SSB may include four OFDM symbols and 20 RBs. In detail, PSS may occupy one OFDM symbol, SSS may occupy one OFDM symbol, and PBCH may occupy two OFDM symbols and one OFDM symbol multiplexed with SSS by FDM. The OFDM symbol position may be changed in a slot occupied by the SSB according to a subcarrier spacing (SCS). FIG. 11(A) shows SSB patterns when a value of the subcarrier spacing for SSB transmission is 15 kHz and 30 kHz. FIG. 11(B) shows SSB patterns when the value of the subcarrier spacing for SSB transmission is 120 kHz and 240 kHz. When the subcarrier spacing is 30 kHz, either the SSB pattern for eMBB transmission or the SSB pattern considering URLLC may be used. In FIG. 11, a hatched OFDM symbol indicates an OFDM symbol position in a slot occupied by the SSB. Furthermore, different hatching patterns indicate different SSB indices.

Figure 12:
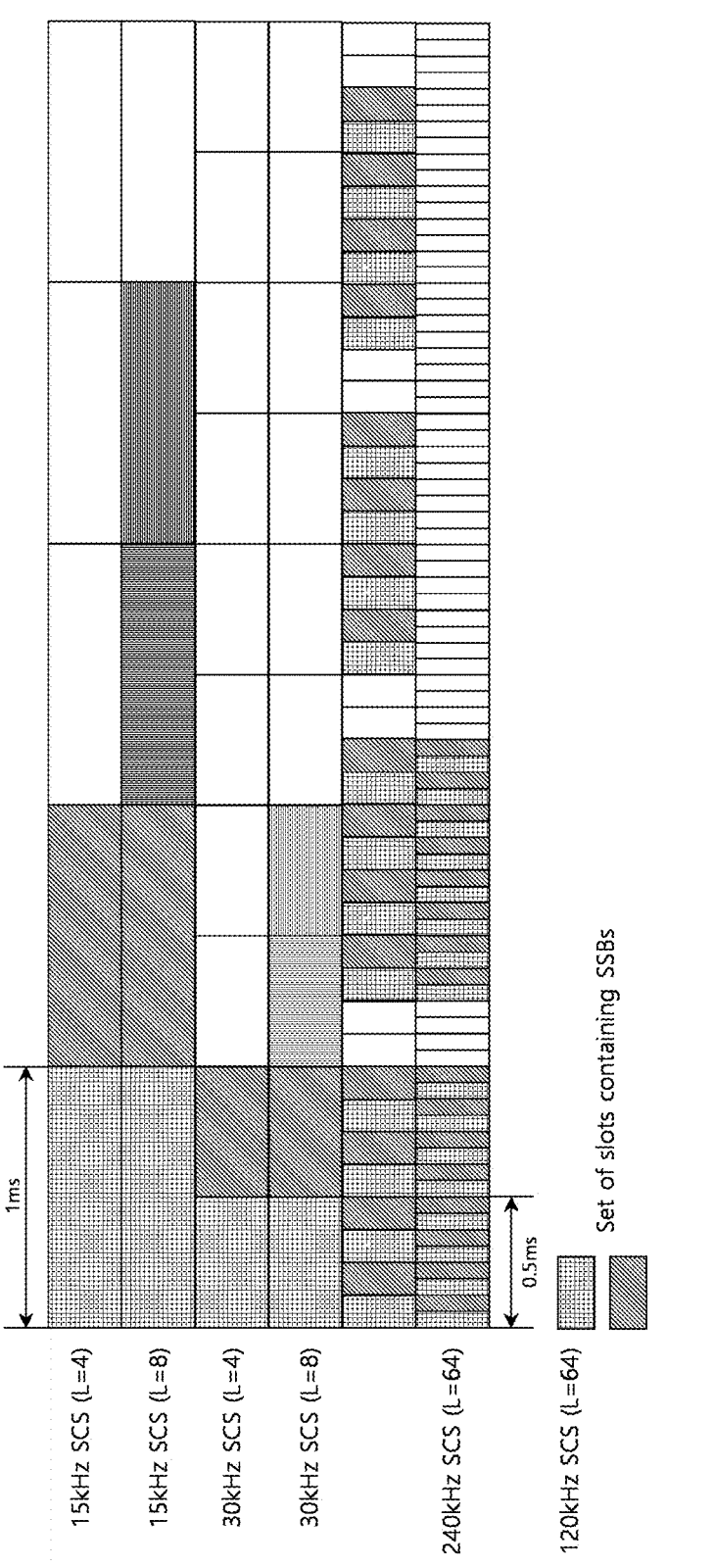
FIG. 12 is a diagram illustrating a position of a slot occupied by SSB within a half wireless frame, i.e., 5 ms, of a licensed band of an NR system according to an embodiment of the present invention.

FIG. 12 is a diagram illustrating a position of a slot occupied by SSB within a half wireless frame, i.e., 5 ms, of a licensed band of an NR system according to an embodiment of the present invention.

In FIG. 12, a hatched slot indicates a position of a slot including SSB within a half wireless frame. One slot may include two SSBs. Two SSBs in one slot may have different SSB indices. Furthermore, SSBs positioned in different slots may also have different SSB indices. The SSB index will be described later again. Furthermore, in FIG. 12, L denotes a maximum number of SSBs that may be transmitted by a base station in a half wireless frame.

The NR system regulates one subcarrier spacing defined for each frequency band so as to reduce complexity of searching for, by the UE, an SSB for initial cell access. Particularly, in a case where a below-6 GHz frequency band is used, the NR system regulates use of one subcarrier spacing among 15 KHz and 30 KHz for an SSB. In addition, in a case where an above-6 GHz frequency band is used, the NR system regulates use of one subcarrier spacing among 120 KHz and 240 KHz for an SSB.

In a case where a wireless communication device performs channel access in an unlicensed band, an LBT procedure may be used. Therefore, if a channel is not idle, the wireless communication device may fail in channel access. Even when the base station performs channel access in order to transmit an SSB, the channel access may fail. Therefore, SSB transmission may not be performed at a position configured by the base station. Eventually, even in a case where the base station configures, for the UE, a position at which an SSB is transmitted, so that the UE is able to assume a position at which an SSB is transmitted, the UE may fail to receive an SSB. An SSB is periodically transmitted. Therefore, even though the UE fails to receive an SSB at one time point, the UE may receive an SSB after one period from the corresponding time point. However, in a case where the UE receives an SSB as described above, latency may occur in RRM measurement and measurement for a neighbor cell. Eventually, latency may increase in the entire system.

In addition, an SSB is used for beam link configuration and beam management. Specifically, the base station transmits multiple SSBs corresponding to different SSB indexes in different time regions. The UE configures multiple beam links by using the multiple SSBs. The base station performs beam sweeping. The UE may configure beam links according to whether the UE has received SSBs transmitted through different beams in different time regions. If the base station fails in channel access and thus fails to transmit SSBs, a problem in that the UE is unable to configure beam links occurs. Eventually, latency for beam links may increase due to channel access failure. Therefore, a method by which the number of SSB transmission failures is reduced, and SSB transmission opportunities can be expanded is required.

In a case where the NR system is used in an unlicensed band, 60 KHz subcarrier spacing may be used for SSB transmission so as to increase channel access opportunities. 15 kHz or 30 kHz subcarrier spacing may be used for SSB transmission in a below-6 GHz licensed band. In addition, 15 kHz, 30 kHz, or 60 kHz subcarrier spacing may be used for data transmission in a below-6 GHz licensed band. In addition, 120 kHz or 240 KHz subcarrier spacing may be used for SSB transmission in an above-6 GHz licensed band. In addition, 60 KHz or 120 KHz subcarrier spacing may be used for data transmission in an above-6 GHz licensed band. When the NR system is used in a below-7 GHz (e.g., lower than 7.125 GHz) unlicensed band, 15 kHz or 30 kHz subcarrier spacing which is the same as that used in a below-6 GHz licensed band may be considered. However, if 60 KHz subcarrier spacing is used for SSB transmission in an unlicensed band, an OFDM symbol duration is ¼ of that in a case where 15 kHz subcarrier spacing is used. Therefore, in a case where 60 kHz subcarrier spacing is used for the NR system in an unlicensed band, the opportunities of transmission of SSBs and data channels in a unit of symbols after channel access may be increased. A time for transmission of a reservation signal when the base station succeeds in channel access in one OFDM symbol in a case where 60 kHz subcarrier spacing is used may be smaller than a time for transmission of a reservation signal in a case where 15 kHz subcarrier spacing and 30 kHz subcarrier spacing are used.

Configuration of NR-U DRS (or DRS)

In an unlicensed band of the NR system, the base station may transmit a signal including at least one SSB transmission or at least one SSB burst set transmission. An SSB burst set indicates that an SSB is consecutively transmitted in a predetermined time interval. In this case, the signal may correspond to a discovery signal burst (DRS burst). The base station may transmit a DRS burst according to the following principle. The base station may transmit a DRS burst such that a gap is not included in a time interval in which the DRS burst is transmitted in a beam. The base station may transmit a DRS burst to satisfy an occupied channel bandwidth (OCB) condition. However, the base station may transmit a DRS burst which does not satisfy the occupied channel bandwidth condition in some cases. In addition, the base station may consider a method for minimizing a channel occupancy time of a DRS burst and performing rapid channel access. For convenience of explanation, a DRS will be used instead of a DRS burst.

A DRS that is transmitted in an unlicensed band may include a PDSCH including SSB-associated remaining system information (RMSI), that is, a system information block 1 (SIB1). Furthermore, a DRS may include an RMSI-CORESET which is a time and frequency resource region related to transmission of a control channel for transmitting scheduling information of RMSI. That is, a DRS may include a CORESET which is a time and frequency region for transmission of a PDCCH scheduling a PDCSH including an SIB1. In addition, a DRS may include a CSI-RS. In addition, a DRS may include a different type of signal. Specifically, a DRS may include other system information (OSI) or paging. As described above, when the base station transmits a DRS in an unlicensed band, the base station may multiplex the DRS with a physical channel or a signal. In this case, a method by which the base station performs channel access is problematic. Particularly, which method the base station uses among various channel access methods described above, and a method by which a parameter used for channel access is configured are problematic. Furthermore, a DRS may include transmission of an SSB or an SSB burst set.

In an embodiment of the present disclosure, in a case where the base station multiplexes a DRS with unicast data, the base station may perform a channel access in which a random backoff is performed using a variable-size CW, and the size of the CW is determined according to a channel access priority class, in order to perform transmission of a DRS and unicast data which are multiplexed. The UE may perform a channel access according to a channel access priority class of the multiplexed unicast data. Specifically, a channel access method may correspond to a first type channel access described above.

In these embodiments, a case where the base station multiplexes a DRS with a signal or information other than unicast data will be described. A signal or information other than unicast data may indicate a signal or a channel which is not data traffic, and thus it is impossible to configure a channel access priority class for the signal or the channel. A signal or information other than unicast data may include a control message associated with initial access, random access, mobility, or paging. In addition, a signal or information other than unicast data may include transmission including only a reference signal. In addition, a signal or information other than unicast data may include transmission including only a PDCCH. The transmission including only a PDCCH may include at least one of an RACH message-4, a handover command, a group common PDCCH, a short paging message, other system information (OSI), paging, and a random access response (RAR) under a random access procedure. In addition, a signal or information other than unicast data may also be transmitted via a PDCCH and a PDSCH. For convenience of explanation, a signal or information other than unicast data will be called non-unicast data. In addition, in the present specification, a DRS and non-unicast data being multiplexed may indicate that unicast data is not included in corresponding transmission. In a detailed embodiment, in a case where the base station multiplexes a DRS with non-unicast data, the base station may perform a channel access in which only LBT based on a single time interval is performed, in order to perform transmission of a DRS and non-unicast data which are multiplexed. The channel access in which only LBT based on a single time interval is performed may be a second type channel access described above. The duration of the single time interval may be 25 us or 34 us.

In another detailed embodiment, in a case where the base station multiplexes a DRS with non-unicast data, the base station may perform a channel access in which a random backoff is performed using a variable-size CW, and the size of the CW is determined according to a channel access priority class, in order to perform transmission of a DRS and non-unicast data which are multiplexed. In this embodiment, it is considered that LBT based on a single time interval can be performed only when the entire duration of transmission including only a DRS is 1 ms or less, and a duty cycle of DRS transmission is ¹⁄₂₀ or less. In this embodiment, the base station may use a channel access priority class (e.g., channel access priority class #1) having the highest priority. Therefore, the base station may assign a higher channel access priority to non-unicast data compared to unicast data. In addition, the base station may use a channel access priority class having the highest priority, and use the smallest CW size among CW sizes allowed in the channel access priority class. In another detailed embodiment, the base station may use a channel access priority class having the highest priority, and use the largest CW size among CW sizes allowed in the channel access priority class.

In another detailed embodiment, in a case where the base station multiplexes a DRS with non-unicast data, the base station may perform a channel access in which a random backoff is performed using a fixed size CW, in order to perform transmission of a DRS and non-unicast data which are multiplexed. A channel access method may be a category-3 channel access described above. In this embodiment, the base station may use a channel access priority class (e.g., channel access priority class #1) having the highest priority. Therefore, the base station may assign a higher channel access priority to non-unicast data compared to unicast data. In addition, the base station may use a channel access priority class having the highest priority, and use the smallest CW size among CW sizes allowed in the channel access priority class. In another detailed embodiment, the base station may use a channel access priority class having the highest priority, and use the largest CW size among CW sizes allowed in the channel access priority class.

In a case where the base station transmits non-unicast data which has not been multiplexed with a DRS, the base station may perform a channel access for transmission of non-unicast data by using a channel access method that is used when non-unicast data and a DRS are multiplexed. Specifically, in a case where the base station transmits non-unicast data which has not been multiplexed with a DRS, the base station may use a channel access type and a channel access parameter that are used when non-unicast data and a DRS are multiplexed.

In another detailed embodiment, in a case where the base station transmits non-unicast data which has not been multiplexed with a DRS, the base station may perform a channel access in which a random backoff is performed using a variable-size CW, and the size of the CW is determined according to a channel access priority class, in order to perform the transmission of non-unicast data. Specifically, a channel access method may correspond to a first type channel access described above. In this embodiment, the base station may use a channel access priority class (e.g., channel access priority class #1) having the highest priority. Therefore, the base station may assign a higher channel access priority to non-unicast data compared to unicast data. In addition, the base station may use a channel access priority class having the highest priority, and use the smallest CW size among CW sizes allowed in the channel access priority class. In another detailed embodiment, the base station may use a channel access priority class having the highest priority, and use the largest CW size among CW sizes allowed in the channel access priority class.

In another detailed embodiment, in a case where the base station transmits non-unicast data which has not been multiplexed with a DRS, the base station may perform a channel access in which a random backoff is performed using a fixed size CW, in order to perform the transmission of non-unicast data. A channel access method may be a category-3 channel access described above. In this embodiment, the base station may use a channel access priority class (e.g., channel access priority class #1) having the highest priority. Therefore, the base station may assign a higher channel access priority to non-unicast data compared to unicast data. In addition, the base station may use a channel access priority class having the highest priority, and use the smallest CW size among CW sizes allowed in the channel access priority class. In another detailed embodiment, the base station may use a channel access priority class having the highest priority, and use the largest CW size among CW sizes allowed in the channel access priority class.

In the embodiments described above, the base station determines a channel access method for transmission of a DRS and non-unicast data or unicast data which are multiplexed, regardless of the duration of the transmission of a DRS and non-unicast data or unicast data which are multiplexed, and the duty cycle of DRS transmission. When the base station determines a channel access method, the base station may assume that transmission including only a DRS and transmission of a DRS and non-unicast data which are multiplexed are the same. Specifically, the base station may determine a channel access method for transmission of a DRS and non-unicast data or unicast data which are multiplexed, based on the duration of the transmission of a DRS and non-unicast data or unicast data which are multiplexed, and the duty cycle of DRS transmission. The base station may determine a channel access method for transmission of a DRS and non-unicast data or unicast data which are multiplexed, based on whether the duration of the transmission of a DRS and non-unicast data or unicast data which are multiplexed is 1 ms or less, and the duty cycle of DRS transmission is $\frac{1}{20}$ or less.

When the base station performs transmission of a DRS and non-unicast data which are multiplexed, the base station may select one of two channel access types according to whether both of two conditions are satisfied, the two conditions being that the duration of the transmission of a DRS and non-unicast data which are multiplexed is 1 ms or shorter, and that the duty cycle of DRS transmission is $\frac{1}{20}$ or less. One of the two channel access types indicates a channel access in which only LBT based on a single time interval is performed, and the other one indicates a channel access in which a random backoff is performed using a variable-size CW, and the size of the CW is determined according to a channel access priority class. In a detailed embodiment, if the duration of the transmission of a DRS and non-unicast data which are multiplexed is 1 ms or shorter, or the duty cycle of DRS transmission is $\frac{1}{20}$ or less, the base station may perform a channel access in which only LBT based on a single time interval is performed, in order to perform the transmission of a DRS and non-unicast data which are multiplexed. The duration of the single time interval may be 25 us. In addition, the LBT based on the single time interval may correspond to a second type channel access described above. In another detailed embodiment, if the duration of the transmission of a DRS and non-unicast data which are multiplexed is longer than 1 ms, or the duty cycle of DRS transmission is larger than $\frac{1}{20}$, the base station may perform a channel access in which a random backoff is performed using a variable-size CW, and the size of the CW is determined according to a channel access priority class, in order to perform the transmission of a DRS and non-unicast data which are multiplexed. In addition, the base station may select a random channel access priority class. The base station may randomly select one of channel access priority classes satisfying a condition of a MCOT length according to the duration of the transmission of a DRS and non-unicast data which are multiplexed. The base station may use a selected channel access priority class for a channel access for the transmission of a DRS and non-unicast data which are multiplexed. That is, the base station may use, for a channel access, a CW size according to the selected channel access priority class. For example, the base station may use a channel access priority class (e.g., channel access priority class #1) having the highest priority. Therefore, the base station may assign a higher channel access priority to non-unicast data compared to unicast data. In addition, the base station may use a channel access priority class having the highest priority, and use the smallest CW size among CW sizes allowed in the channel access priority class. In another detailed embodiment, the base station may use a channel access priority class having the highest priority, and use the largest CW size among CW sizes allowed in the channel access priority class.

In the above embodiments, in a case where the base station is able to determine whether the non-unicast data is received by the UE, and whether the same is successfully received, the base station may adjust a CW size, based on a ratio between an ACK and an NACK. Specifically, the base station may convert feedback information on non-unicast data, which is received from the UE according to the reception by the UE, into an ACK and an NACK, and may adjust a CW size, based on the ratio between the ACK and the NACK. A channel access method in which a random backoff is performed using a variable-size CW, and the size of the CW is determined according to a channel access priority class may correspond to a first type channel access.

As described above, the base station and the UE may control a CW size, based on a HARQ feedback at a time of a channel access using a CW. However, the base station and the UE may be unable to expect a HARQ feedback on the entirety or a part of non-unicast data. In addition, the base station and the UE may be unable to determine whether the UE or the base station has received the entirety or a part of non-unicast data. In addition, in a case where the base station and the UE are required to perform an initial access procedure, the base station and the UE may be unable to determine an HARQ-ACK feedback with respect to a part of a downlink signal and channel and an uplink signal and channel, which are used in the initial access procedure. In addition, the base station and the UE may not perform transmission related to a particular channel access priority class, and thus may be unable to determine an HARQ-ACK feedback corresponding to transmission related to the corresponding channel access priority class. In this case, a method for determining, by the base station and the UE, a CW to be used for a channel access at a time of transmission of a channel and a signal including the entirely or a part of non-unicast data, on which it is impossible to expect an HARQ feedback, will be described. For convenience of explanation, the base station is explained as a subject, but embodiments to be described below may also be applied to the UE in the same way.

When the base station is unable to determine an HARQ-ACK feedback related to transmission associated with a channel access priority class determining a CW size, the base station may perform a channel access in which a random backoff is performed in a CW corresponding to the channel access priority class. The base station may use the smallest CW size among CW sizes allowed in the corresponding channel access priority class. In another detailed embodiment, the base station may use a channel access priority class having the highest priority, and use the largest CW size among CW sizes allowed in the channel access priority class.

In addition, in a case where the base station is unable to determine whether the UE has received the entirety or a part of non-unicast data, on which it is impossible to expect an HARQ feedback, the base station may perform a channel access in which a random backoff is performed in a fixed CW size, in order to transmit the non-unicast data and a DRS which are multiplexed. Specifically, the base station may use a CW corresponding to one channel access priority class at a time of a first type channel access described above. In a detailed embodiment, the base station may use one of channel access priority classes satisfying a condition of a MCOT length according to the duration of transmission of a DRS and non-unicast data which are multiplexed, at a time of a first type channel access. The base station may use a channel access priority class having the highest priority. In a detailed embodiment, the base station may use a channel access priority class having the highest priority among channel access priority classes satisfying a condition of a MCOT length according to the duration of transmission of a DRS and non-unicast data which are multiplexed, at a time of a first type channel access. In addition, the base station may use a channel access priority class having the highest priority, and use the smallest CW size among CW sizes allowed in the channel access priority class. In another detailed embodiment, the base station may use a channel access priority class having the highest priority, and use the largest CW size among CW sizes allowed in the channel access priority class.

In another detailed embodiment, in a case where the base station is unable to determine whether the UE has received the entirety or a part of non-unicast data, on which it is impossible to expect an HARQ feedback, the base station may perform a category-3 channel access described above, in order to transmit the non-unicast data and a DRS which are multiplexed. The base station may use a channel access priority class having the highest priority. The base station may use a channel access priority class having the highest priority among channel access priority classes satisfying a condition of a MCOT length according to the duration of transmission of a DRS and non-unicast data which are multiplexed. In addition, the base station may use a channel access priority class having the highest priority, and use the smallest CW size among CW sizes allowed in the channel access priority class. In another detailed embodiment, the base station may use a channel access priority class having the highest priority, and use the largest CW size among CW sizes allowed in the channel access priority class.

The base station may be unable to transmit SSB due to a channel access (e.g., LBT) procedure failure. When the base station is unable to transmit SSB at a configured position, an SSB transmission window may be defined so that SSB may be transmitted at another position. The SSB transmission window is a time interval in which the base station may transmit SSB, and includes a plurality of SSB transmission position candidates. When the base station fails to start SSB transmission at a certain SSB transmission position candidate, the base station may attempt to transmit SSB at an SSB transmission position candidate that is later than the certain SSB transmission position candidate within the SSB transmission window. The SSB transmission position candidate is a point in time at which the base station may start transmission of SSB. When the user equipment fails to receive SSB at a certain SSB transmission position candidate within the SSB transmission window, the user equipment may receive SSB at an SSB transmission position candidate that is later than the certain SSB transmission position candidate within the SSB transmission window. Here, the user equipment may determine whether the base station was unable to start SSB transmission or SSB transmission of the base station has failed at an SSB transmission position candidate. In a specific embodiment, when the user equipment fails to receive SSB at a certain SSB transmission position candidate within the SSB transmission window, the user equipment may attempt to receive SSB at an SSB transmission position candidate next to the certain SSB transmission position candidate within the SSB transmission window. After completing reception of SSB after starting to receive SSB at a certain SSB transmission position candidate, the user equipment may not expect to receive additional SSB within the corresponding SSB transmission window. In detail, after completing reception of SSB after starting to receive SSB at a certain SSB transmission position candidate, the user equipment may not attempt to receive additional SSB within the corresponding SSB transmission window.

In another specific embodiment, when the user equipment fails to receive specific SSB at a certain SSB transmission position candidate within the SSB transmission window, the user equipment may attempt to receive the specific SSB at an SSB transmission position candidate next to the certain SSB transmission position candidate within the SSB transmission window. After completing reception of the specific SSB after starting to receive the specific SSB at a certain SSB transmission position candidate, the user equipment may not perform reception of the specific SSB within the corresponding SSB transmission window. In detail, after receiving the specific SSB at a certain SSB transmission position candidate, the user equipment may not additionally attempt to receive the specific SSB within the corresponding SSB transmission window.

In another specific embodiment, even after completing reception of the specific SSB at a certain SSB transmission position candidate, the user equipment may attempt to receive the specific SSB within the corresponding SSB transmission window. This is because the user equipment may additionally receive the specific SSB and may obtain a combining gain through the additionally received specific SSB. These embodiments may be applied not only to the case were a plurality of SSBs corresponding to different beam indices are transmitted for beam operation but also to the case were an omni-transmission (omni-TX) scheme is used. In detail, the embodiments may also be applied to the case where the same SSB is repeatedly transmitted.

In an NR-U system, a beam link between a base station and a UE is configured through beam sweeping of the base station, and the base station may efficiently transmit a downlink channel through beam forming. In this case, an SSB for a beam operation (e.g., beam sweeping, beam forming, and the like) of the base station is required to be configured. The SSB in this specification may refer to an SS/PBCH block. Hereinafter, in this specification, a method for increasing an SSB transmission opportunity in preparation for a case where LBT between a UE and a base station fails in an NR-U system will be described. In addition, hereinafter, in this specification, a method for configuring an SSB when a subcarrier spacing is 60 kHz will be described.

When an SSB is transmitted and a subcarrier spacing (SCS) of 15 KHz or 30 KHz is used in an unlicensed band, an SSB pattern described with reference to FIGS. 11 and 12 may be used as it is or partially modified and used. The SSB pattern in a case where a subcarrier spacing value for SSB transmission in the unlicensed band is 60 KHz will be described with reference to FIGS. 13 to 15.

A pattern of SSBs capable of being consecutively transmitted in time within one slot may be used. Through this, the base station may increase transmission efficiency. In this embodiment, when the base station consecutively transmits the same beam or different beams after successful channel access, the base station may consecutively occupy the corresponding channel. Through this, the base station may prevent other wireless communication devices that intend to use the corresponding channel from occupying the corresponding channel. As a result, the base station may transmit multiple SSBs through one successful channel access, and may increase the probability of performing other transmissions after SSB transmission. The base station may consecutively transmit SSBs within one slot. In addition, the base station may consecutively transmit multiple SSBs in time within one slot. Specifically, the base station may transmit SSBs by DL burst transmission. In a case where an SSB pattern enabling consecutive transmission is used, the base station may consecutively use a specific channel to prevent other wireless communication devices from accessing the corresponding channel. In this embodiment, the subcarrier spacing value for SSB transmission in the unlicensed band may be 60 KHz.

In addition, an SSB pattern in which transmission is terminated before a boundary between a slot in which SSBs are transmitted and a slot subsequent to the slot in which the SSBs are transmitted may be used. That is, a gap for an LBT procedure may be configured before starting of the subsequent slot after the SSB transmission. Specifically, the base station may terminate the SSB transmission before a time point preceding, by a predetermined time, a boundary between a slot in which SSBs are transmitted and a slot subsequent to the slot in which the SSBs are transmitted. Specifically, the base station may terminate the SSB transmission before at least one OFDM symbol from a boundary between a slot in which SSBs are transmitted and a slot subsequent to the slot in which the SSBs are transmitted. When such an SSB pattern is used, the base station may start an LBT procedure after the SSB transmission, thereby increasing the possibility of transmitting a PDCCH or a PDSCH from a start time point of the slot subsequent to the slot in which the SSBs are transmitted. In this embodiment, a subcarrier spacing value for SSB transmission in an unlicensed band may be 60 KHz.

Figure 13:
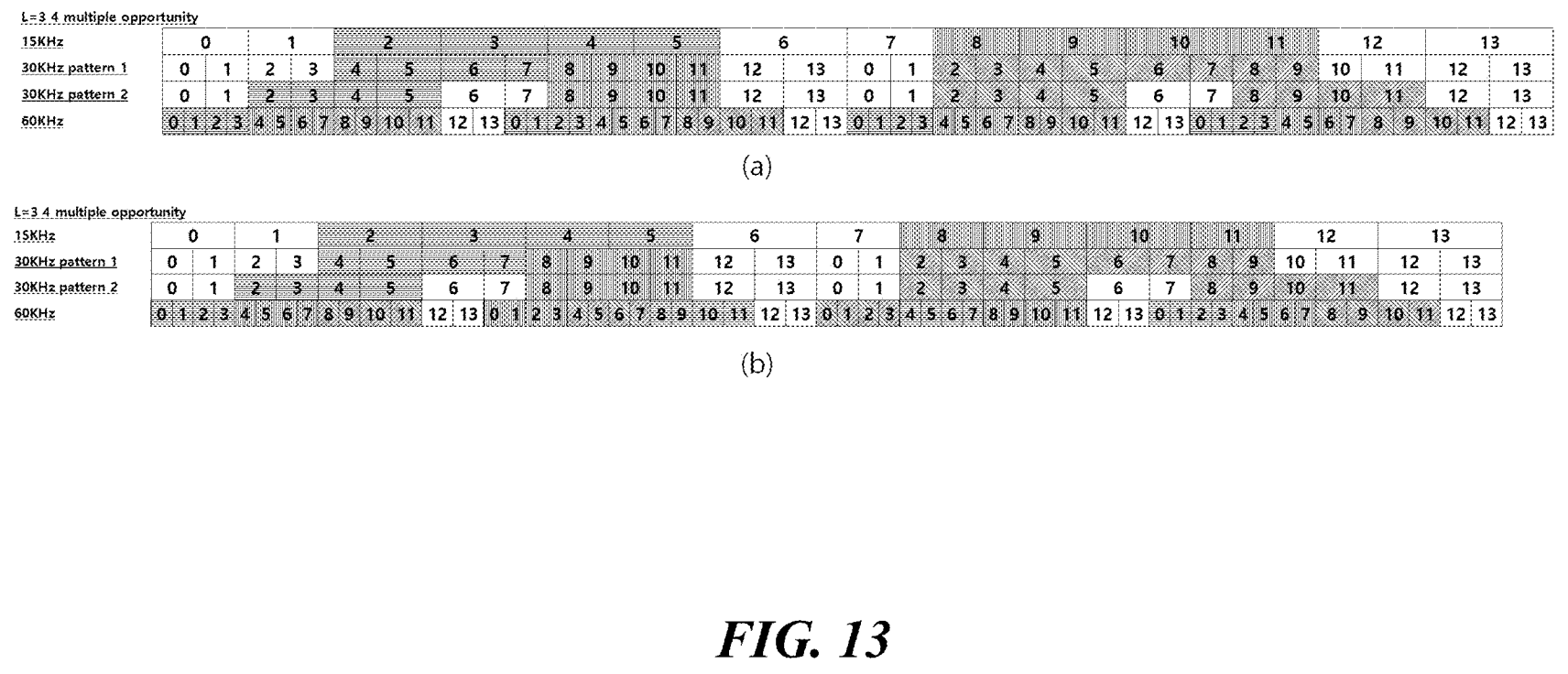
Figure 14:
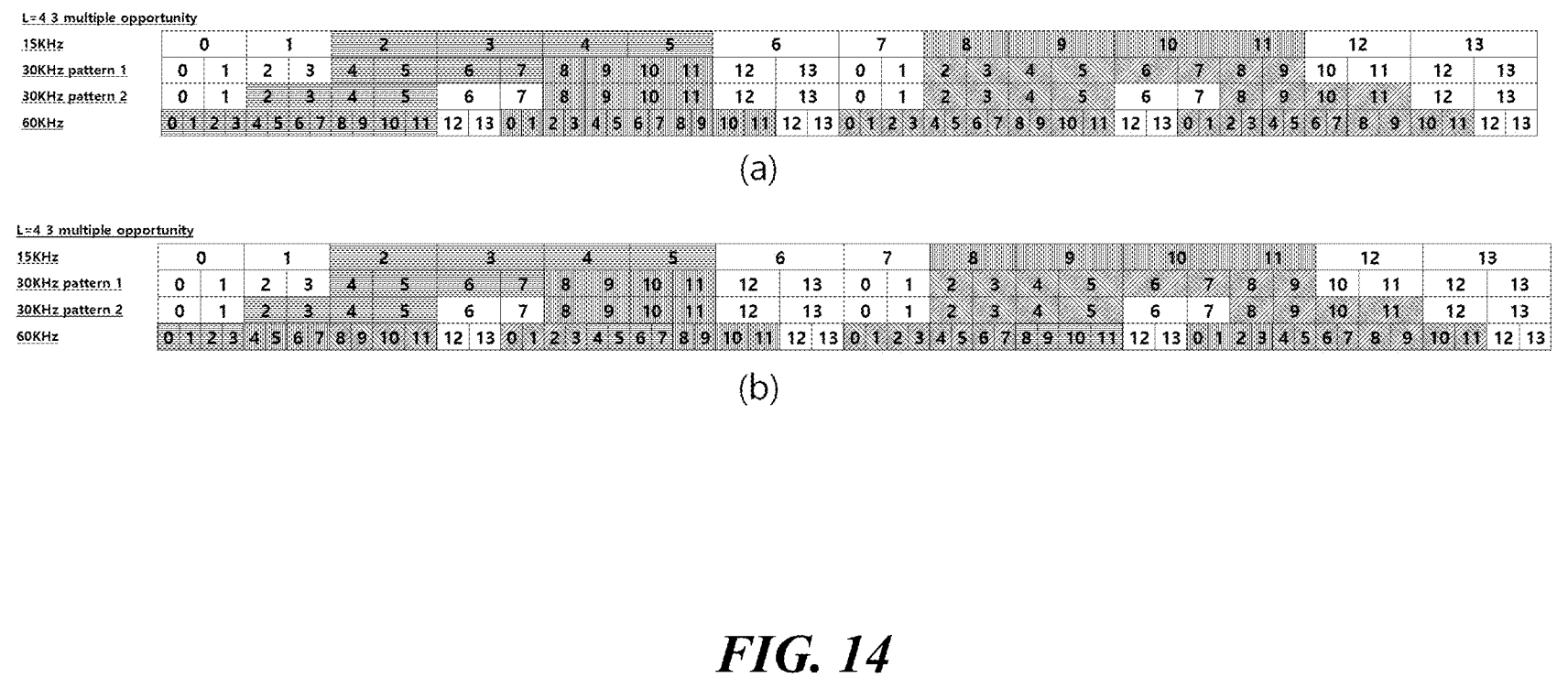
Figure 15:
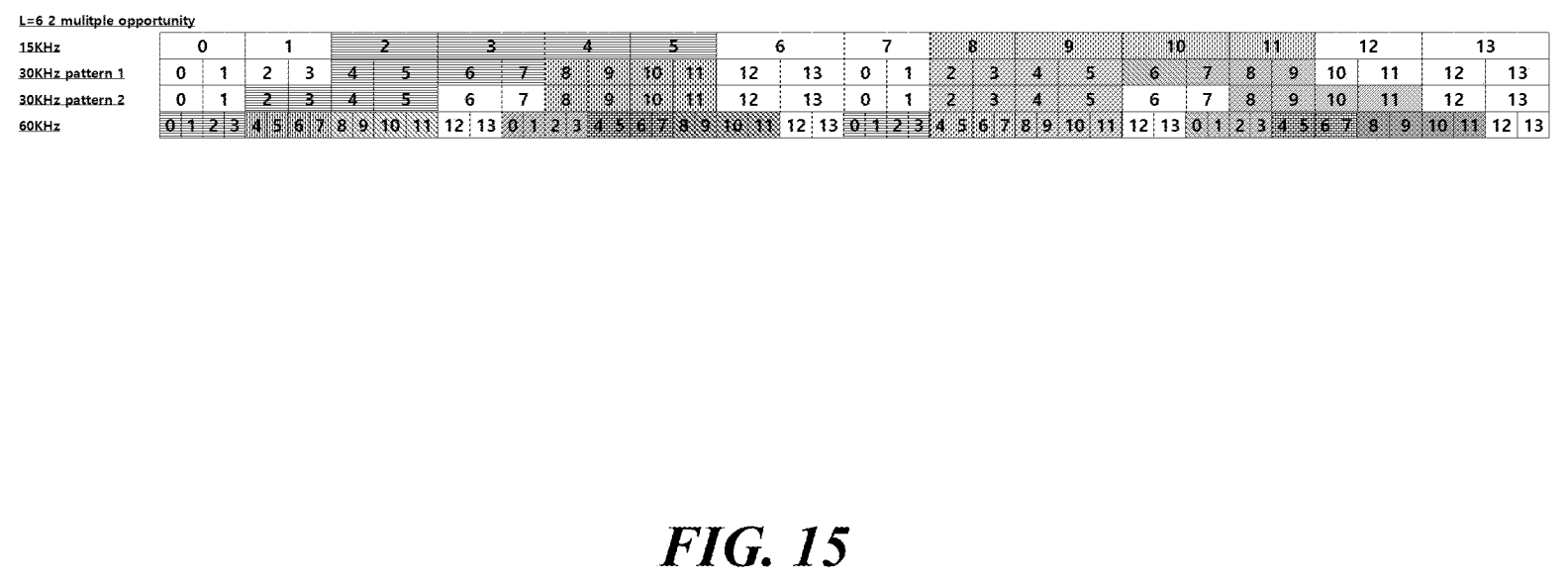

FIG. 13 shows a location of an OFDM symbol in which an SSB is transmitted within a time interval of 1 ms in a case where a subcarrier spacing of 60 KHz is used and the maximum number of SSBs is 3 according to an embodiment of the disclosure. FIG. 14 shows a location of an OFDM symbol in which an SSB is transmitted within a time interval of 1 ms in a case where a subcarrier spacing of 60 KHz is used and the maximum number of SSBs is 4 according to an embodiment of the disclosure. FIG. 15 shows a location of an OFDM symbol in which an SSB is transmitted within a time interval of 1 ms in a case where a subcarrier spacing of 60 KHz is used and the maximum number of SSBs is 6 according to an embodiment of the disclosure. In FIGS. 13 to 15, hatched OFDM symbols indicate OFDM symbols occupied by SSBs. In addition, different hatching patterns correspond to different SSB indexes. In FIGS. 13 to 15, the base station consecutively transmits SSBs within one slot. Through this, the base station may prevent another wireless communication device from accessing a corresponding channel in one slot after successful channel access for SSB transmission within the corresponding slot. In addition, in FIGS. 13 to 15, the base station terminates SSB transmission before a boundary between a slot in which SSBs are transmitted and a slot subsequent to the slot in which the SSBs are transmitted. Through this, the base station may increase the possibility of transmitting a PDCCH or a PDSCH from a start time point of the slot subsequent to the slot in which the SSBs are transmitted after SSB transmission. As a result, the base station may prevent delay in initial cell access, radio resource management (RRM) measurement, and radio link monitoring (RLM) measurement due to LBT failure through the embodiment described with reference to FIGS. 13 to 15.

The base station may transmit multiple SSBs through SSB transmission within a predetermined time interval for SSB transmission. In this case, the duration of the predetermined time interval for SSB transmission may be 5 ms. The multiple SSBs transmitted through SSB transmission may be referred to as an "SSB set". Each of the multiple SSBs included in the SSB set may be assigned an SSB index which is unique within the SSB set. The SSB index may be increased by 1 starting from 0. The SSBs having different hatchings in FIGS. 13 to 15 correspond to different SSB indexes. FIGS. 13(a), 14(a), and 15 show a case where a location of an OFDM symbol is fixed for each SSB index in a slot in which SSBs are transmitted. FIGS. 13(b) and 14(b) show a case where a location of an OFDM symbol is not fixed for each SSB index in a slot in which SSBs are transmitted. Specifically, the base station may cycle an SSB index corresponding to an SSB transmission location in every SSB transmission. Through this embodiment, it is possible to uniformly configure the probability of success in SSB transmission for each SSB index. This will be described in detail with reference to FIGS. 24 to 34.

FIG. 16 shows a location of an OFDM symbol in which an SSB is transmitted within a time interval of 1 ms in a case where a subcarrier spacing of 60 KHz is used for SSB transmission and the maximum number of SSBs is 8 according to an embodiment of the disclosure. In FIG. 16, a hatched OFDM symbol indicates an OFDM symbol occupied by an SSB. In addition, different hatching patterns correspond to different SSB indexes. FIG. 16 shows an embodiment of two SSB patterns which may be applied in a case where a subcarrier spacing of 60 KHz is used. A second SSB pattern (pattern #2) starts SSB transmission in an OFDM symbol preceding that of a first SSB pattern (pattern #1). The base station may increase the probability of success in an LBT procedure for PDSCH transmission or PDCCH transmission after SSB transmission by using the second SSB pattern (pattern #2) compared to the case of using the first SSB pattern (pattern #1). When the first SSB pattern (pattern #1) and the second SSB pattern (pattern #2) are used, a gap for LBT before a slot boundary may be secured for PDCCH or PDSCH transmission in the slot boundary after a slot in which SSBs are transmitted. In a case where data channel transmission is performed, Cat-4 LBT, that is, a channel access procedure in which random back-off is performed, is required. Accordingly, the SSB pattern in FIG. 16 may increase the possibility of data channel transmission when the data channel transmission is performed after SSB transmission. From this point of view, when the base station uses the first SSB pattern, transmission efficiency may be improved compared to the case of using the second SSB pattern (pattern #2).

In an unlicensed band, the base station may attempt to transmit an SSB from the earliest slot in a time domain of a time interval in which the SSB is able to be transmitted. Through this, the base station may prevent missing of an opportunity for SSB transmission or delay of SSB transmission due to failure of the LBT procedure. This will be described with reference to FIGS. 17 to 21. For convenience of description, the time interval in which the SSB is able to be transmitted is referred to as an "SSB transmission window".

Figure 17:
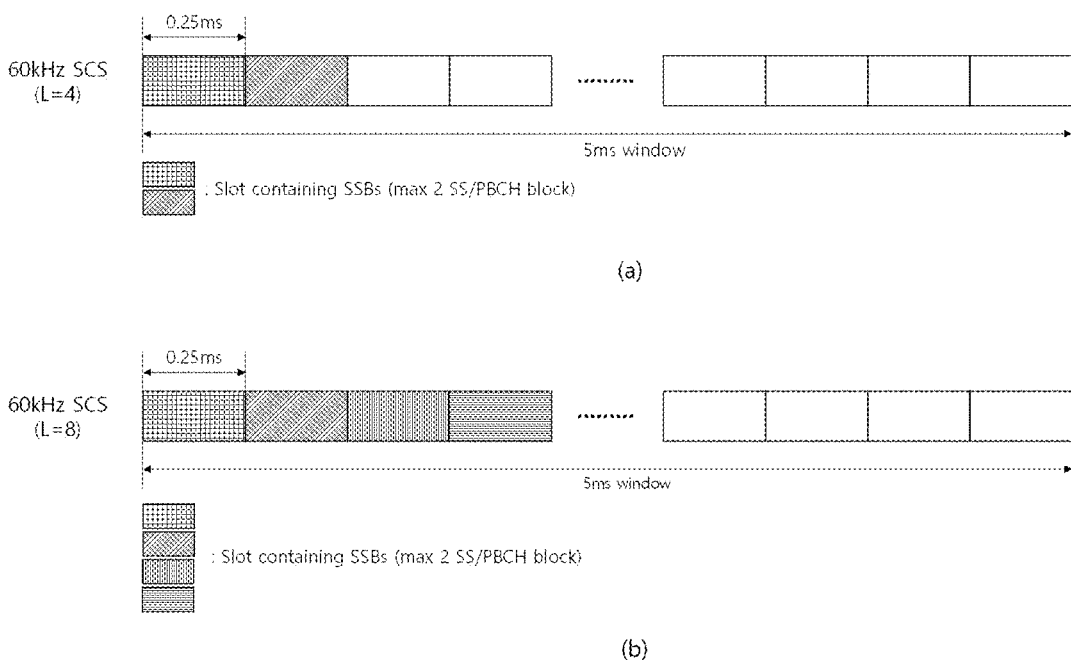
FIG. 17 shows a location of a slot in which an SSB is transmitted in an SSB transmission window in a case where a subcarrier spacing of 60 KHz is used for SSB transmission according to another embodiment of the disclosure.

FIG. 17 shows a location of a slot in which an SSB is transmitted in an SSB transmission window in a case where a subcarrier spacing of 60 KHz is used for SSB transmission according to another embodiment of the disclosure. Specifically, FIG. 17(*a*) shows a location of a slot in which an SSB is transmitted in an SSB transmission window in a case where the maximum number of SSBs capable of being transmitted in the SSB transmission window is 4. In addition, FIG. 17(*b*) shows locations of slots in which SSBs are transmitted in an SSB transmission window in a case where the maximum number of SSBs capable of being transmitted in the SSB transmission window is 8. In an embodiment, the SSB transmission window may have a duration of 5 ms.

In a specific embodiment, the base station may transmit the maximum number of SSBs capable of being transmitted in the SSB transmission window in every transmission opportunity. For example, when the base station obtains a transmission opportunity through an LBT procedure, the base station may transmit the maximum number of SSBs capable of being transmitted in the SSB transmission window. In this embodiment, a time interval in which an SSB set is transmitted may be configured based on the maximum number of SSBs capable of being transmitted in the SSB transmission window. Specifically, the time interval in which the SSB set is transmitted may be configured as slots corresponding to the maximum number of SSBs capable of being transmitted in the SSB transmission window.

Figure 18:
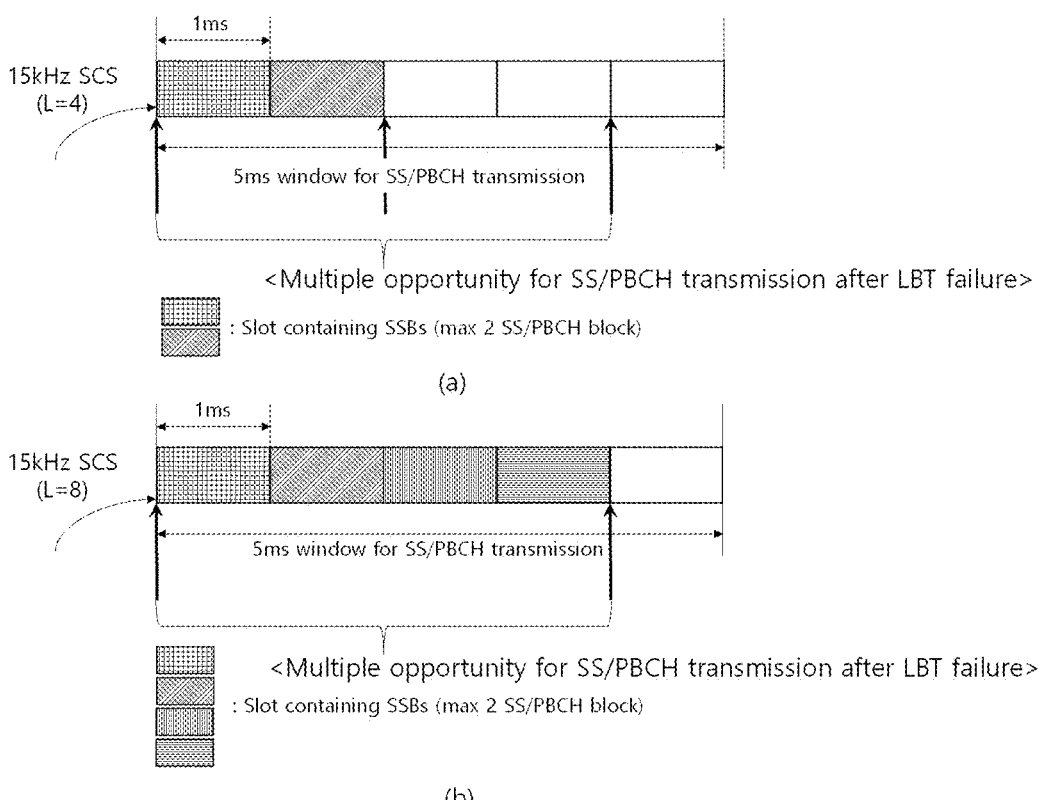
FIG. 18 shows a case where there are multiple locations of slots in which a base station may start transmission of SSBs according to the maximum number of SSBs capable of being transmitted within an SSB transmission window when a subcarrier spacing of 15 KHz is used for SSB transmission in an unlicensed band according to an embodiment of the disclosure.
Figure 19:
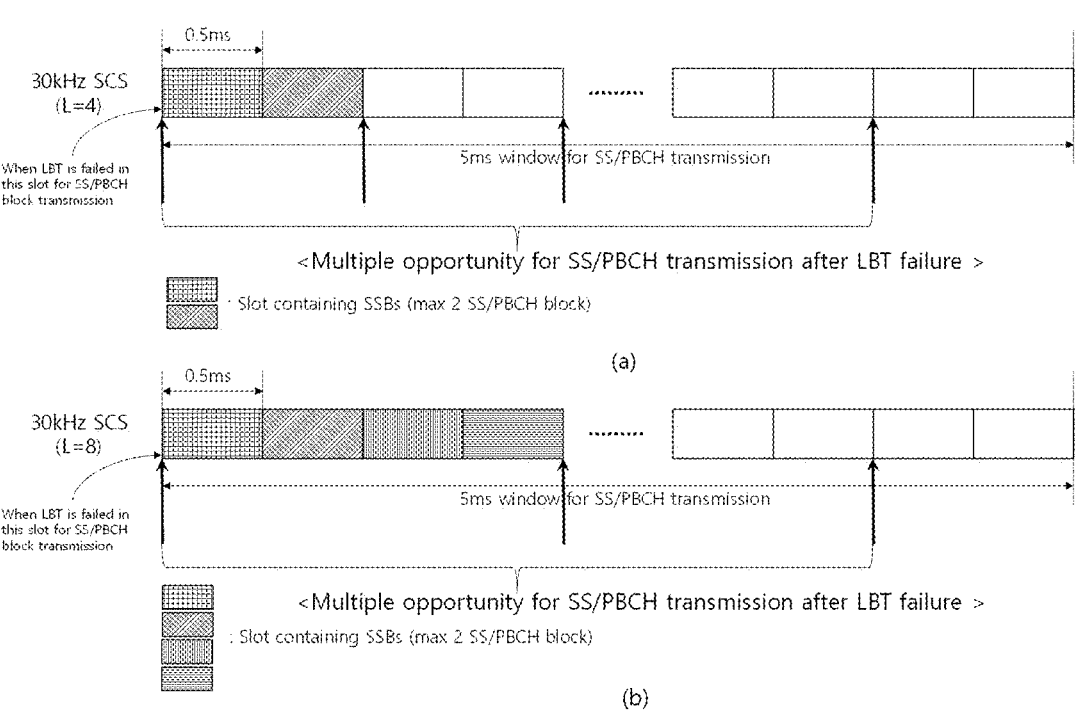
FIG. 19 shows a case where there are multiple locations of slots in which a base station may start transmission of SSBs according to the maximum number of SSBs capable of being transmitted within an SSB transmission window when a subcarrier spacing of 30 KHz is used for SSB transmission in an unlicensed band according to an embodiment of the disclosure.
Figure 20:
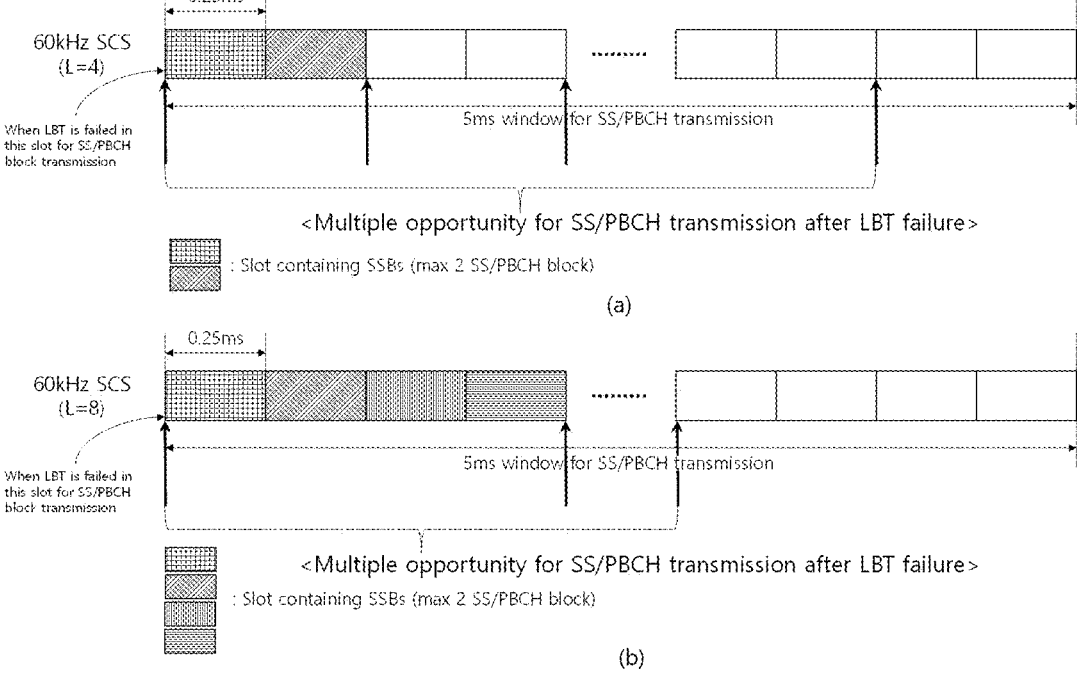
FIG. 20 shows a case where there are multiple locations of slots in which a base station may start transmission of SSBs according to the maximum number of SSBs capable of being transmitted within an SSB transmission window when a subcarrier spacing of 60 KHz is used for SSB transmission in an unlicensed band according to an embodiment of the disclosure.

FIGS. 18 to 20 show a case where there are multiple locations of slots in which a base station may start transmission of SSBs according to a preconfigured maximum number of SSBs in an SSB transmission window for SSB transmission in an unlicensed band. The base station may perform SSB transmission by configuring a location of a slot capable of starting SSB transmission in the SSB transmission window according to the maximum number of SSBs, and the UE may perform SSB reception from a location of a slot capable of transmitting an SSB, which is configured by the base station, within the SSB transmission window. When the base station fails in LBT in the slot capable of starting SSB transmission, the base station may perform LBT for starting transmission in a slot capable of starting subsequent SSB transmission, and may perform SSB transmission in the corresponding slot.

FIG. 18 shows a case where there are multiple locations of slots in which a base station may start transmission of SSBs according to the maximum number of SSBs capable of being transmitted within an SSB transmission window when a subcarrier spacing of 15 KHz is used for SSB transmission in an unlicensed band according to an embodiment of the disclosure. In FIG. 18(*a*), in a case where the duration of an SSB transmission window is configured to be 5 ms and the maximum number of SSBs capable of being transmitted in the SSB transmission window is configured to be 4, the base station may configure a first slot, a third slot, and a fifth slot as locations of slots capable of starting SSB transmission within the SSB transmission window. The UE receives an SSB from the location of the slot capable of starting SSB transmission, which is configured by the base station. In FIG. 18(*b*), in a case where the duration of an SSB transmission window is configured to be 5 ms and the maximum number of SSBs capable of being transmitted in the SSB transmission window is configured to be 8, the base station may configure a first slot and a fifth slot as locations of slots capable of starting SSB transmission within the SSB transmission window. The UE receives an SSB from the location of the slot capable of starting SSB transmission, which is configured by the base station.

FIG. 19 shows a case where there are multiple locations of slots in which a base station may start transmission of SSBs according to the maximum number of SSBs capable of being transmitted within an SSB transmission window when a subcarrier spacing of 30 KHz is used for SSB transmission in an unlicensed band according to an embodiment of the disclosure. FIG. 19(*a*) shows a case where the duration of an SSB transmission window is 5 ms and the maximum number of SSBs capable of being transmitted in the SSB transmission window is 4. FIG. 19(*b*) shows a case where the duration of an SSB transmission window is 5 ms and the maximum number of SSBs capable of being transmitted in the SSB transmission window is 8.

FIG. 20 shows a case where there are multiple locations of slots in which a base station may start transmission of SSBs according to the maximum number of SSBs capable of being transmitted within an SSB transmission window when a subcarrier spacing of 60 KHz is used for SSB transmission in an unlicensed band according to an embodiment of the disclosure. FIG. 20(*a*) shows a case where the duration of an SSB transmission window is 5 ms and the maximum number of SSBs capable of being transmitted in the SSB transmission window is 4. FIG. 20(*b*) shows a case where the duration of an SSB transmission window is 5 ms and the maximum number of SSBs capable of being transmitted in the SSB transmission window is 8.

In another specific embodiment, the base station may be configured to start SSB transmission in every slot within an SSB transmission window. A location of a slot in which SSB transmission starts may vary for each SSB transmission window depending on a result of channel access in the SSB transmission window. Therefore, failure in channel access may cause an imbalance in a transmission opportunity between multiple SSBs which have different SSB indexes and are transmitted using different beams. The base station may reduce an imbalance in a transmission opportunity for each of the SSBs through this embodiment. In this case, the base station may transmit SSBs corresponding to different SSB indexes in every location capable of SSB transmission, which is included in each slot. Accordingly, the SSBs corresponding to different SSB indexes may have equal opportunities for transmission.

Figure 21:
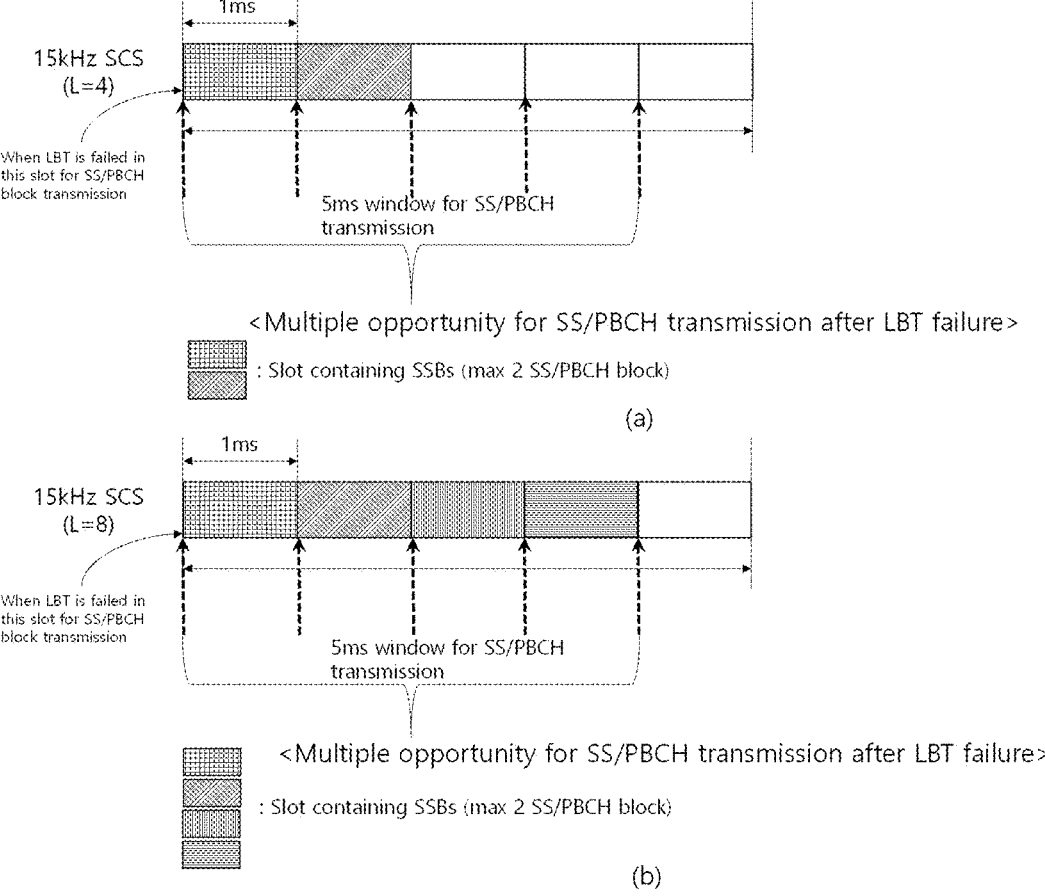
FIG. 21 shows a case where a base station has an SSB transmission starting opportunity in every slot within an SSB transmission window when a subcarrier spacing of 15 KHz is used for SSB transmission in an unlicensed band according to an embodiment of the disclosure.

FIG. 21 shows a case where a base station has an SSB transmission starting opportunity in every slot within an SSB transmission window when a subcarrier spacing of 15 KHz is used for SSB transmission in an unlicensed band according to an embodiment of the disclosure. FIG. 21(*a*) shows a case where the duration of an SSB transmission window is configured to be 5 ms and the maximum number of SSBs capable of being transmitted in the SSB transmission window is configured to be 4. FIG. 21(*b*) shows a case where the duration of an SSB transmission window is configured to be 5 ms and the maximum number of SSBs capable of being transmitted in the SSB transmission window is configured to be 8.

Figure 22:
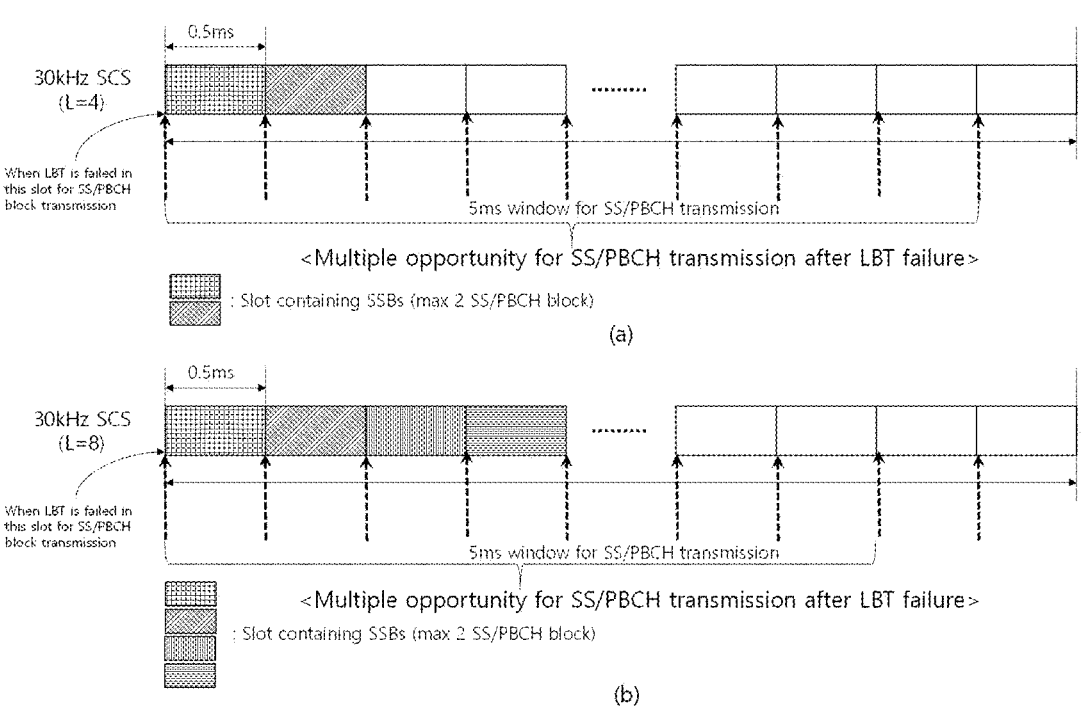
FIG. 22 shows a case where a base station has an SSB transmission starting opportunity in every slot within an SSB transmission window when a subcarrier spacing of 30 KHz is used for SSB transmission in an unlicensed band according to an embodiment of the disclosure.

FIG. 22 shows a case where a base station has an SSB transmission starting opportunity in every slot within an SSB transmission window when a subcarrier spacing of 30 KHz is used for SSB transmission in an unlicensed band according to an embodiment of the disclosure. FIG. 22(*a*) shows a case where the duration of an SSB transmission window is configured to be 5 ms and the maximum number of SSBs capable of being transmitted in the SSB transmission window is configured to be 4. FIG. 22(*b*) shows a case where the duration of an SSB transmission window is configured to be 5 ms and the maximum number of SSBs capable of being transmitted in the SSB transmission window is configured to be 8.

Figure 23:
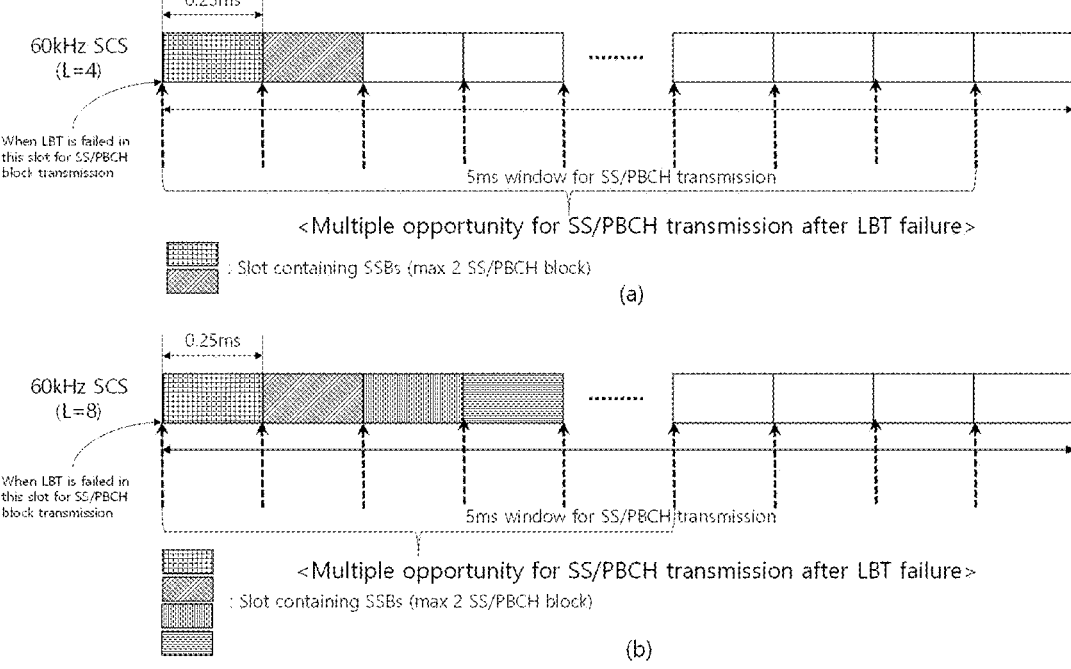
FIG. 23 shows a case where a base station has an SSB transmission starting opportunity in every slot within an SSB transmission window when a subcarrier spacing of 60 KHz is used for SSB transmission in an unlicensed band according to an embodiment of the disclosure.

FIG. 23 shows a case where a base station has an SSB transmission starting opportunity in every slot within an SSB transmission window when a subcarrier spacing of 60 KHz is used for SSB transmission in an unlicensed band according to an embodiment of the disclosure. FIG. 23(*a*) shows a case where the duration of an SSB transmission window is configured to be 5 ms and the maximum number of SSBs capable of being transmitted in the SSB transmission window is configured to be 4. FIG. 23(*b*) shows a case where the duration of an SSB transmission window is configured to be 5 ms and the maximum number of SSBs capable of being transmitted in the SSB transmission window is configured to be 8.

In still another specific embodiment, the base station may configure an SSB transmission starting opportunity in every specific time interval within an SSB transmission window, so as to transmit an SSB. Specifically, the base station may attempt to transmit an SSB in every specific time interval. In this case, the specific time interval may have a duration of an integer multiple of a slot. In addition, the specific time interval may be configured in the range of preconfigured candidates through RRC configuration of the base station. In addition, the specific time interval may be a fixed value agreed by the UE and the base station.

The base station may not be able to transmit the SSB due to failure of a channel access (e.g., LBT) procedure. When the base station is unable to transmit the SSB in a configured location, the SSB transmission window may be defined such that the SSB is to be transmitted in another location. The SSB transmission window is a time interval in which the base station is able to transmit an SSB, and includes multiple SSB transmission candidate locations. When the base station fails to start SSB transmission at one SSB transmission candidate location, the base station may attempt to transmit an SSB in an SSB transmission candidate location, which is later than the corresponding SSB transmission candidate location, within the SSB transmission window. The SSB transmission candidate location is a time point at which the base station is able to start SSB transmission. When the UE fails to receive an SSB at one SSB transmission candidate location in the SSB transmission window, the UE may receive the SSB at the SSB transmission candidate location, which is later than the corresponding SSB transmission candidate location, in the corresponding SSB transmission window. In this case, the UE may determine whether the base station has failed to start SSB transmission or whether the base station has failed to transmit an SSB at the SSB transmission candidate location. In a specific embodiment, when the UE fails to receive an SSB at one SSB transmission candidate location within the SSB transmission window, the UE may attempt to receive the SSB at the SSB transmission candidate location subsequent to the corresponding SSB transmission candidate location in the corresponding SSB transmission window. After the UE starts SSB reception at one SSB transmission candidate location and completes the SSB reception, the UE may not expect to further receive an SSB within the corresponding SSB transmission window. Specifically, after the UE starts SSB reception at one SSB transmission candidate location and completes the SSB reception, the UE may not attempt to further receive an SSB in the corresponding SSB transmission window.

In still another specific embodiment, when the UE fails to receive a specific SSB at one SSB transmission candidate location in an SSB transmission window, the UE may attempt to receive the specific SSB at an SSB transmission candidate location subsequent to the corresponding SSB transmission candidate location within the corresponding SSB transmission window. After the UE starts to receive a specific SSB at one SSB transmission candidate location and completes the reception of the specific SSB, the UE may not perform reception of the specific SSB within the corresponding SSB transmission window. Specifically, after the UE receives a specific SSB at one SSB transmission candidate location, the UE may not further attempt to receive the specific SSB within the corresponding SSB transmission window.

In still another specific embodiment, even after the UE completes reception of a specific SSB at one SSB transmission candidate location, the UE may attempt to receive the specific SSB within the corresponding SSB transmission window. In this case, this is due to the fact that the UE may further receive a specific SSB, and may obtain a combining gain through the specific SSB further received. Such the embodiments may be applied to a case where an omni-transmission (omni-TX) scheme is used, as well as a case where multiple SSBs corresponding to different beam indexes are transmitted for a beam operation. Specifically, the embodiments may also be applied to a case where the same SSB is repeatedly transmitted. The base station may transmit an SSB after an LBT procedure, and may not be able to transmit all SSBs of an SSB block set within a DRS transmission window due to failure of the LBT procedure. Therefore, the SSB transmission probability may vary for each SSB index depending on the sequence of SSB transmission. An embodiment for securing a uniform probability of transmitting SSBs corresponding to different SSB indexes may be required. This will be described with reference to FIGS. 24 to 34.

Each of the SSB transmission candidate locations in the SSB transmission window is mapped to one SSB of an SSB set, and the base station may transmit SSBs, based on the mapping between the SSB transmission candidate locations and the SSBs. In this case, the multiple SSBs in the SSB set may be identified by SSB indexes, which are unique values in the SSB set. In addition, multiple SSB transmission candidate locations within the SSB transmission window may be identified by SSB transmission candidate location indexes. Specifically, when the base station succeeds in channel access at a specific SSB transmission candidate location, the base station may start SSB transmission from the corresponding SSB transmission candidate location. In this case, the base station may transmit the SSBs mapped to the respective SSB transmission candidate locations. In a specific embodiment, the base station may transmit an SSB mapped to each of one or more SSB transmission candidate locations at each of one or more SSB transmission candidate locations located in a time interval from the SSB transmission candidate location in which channel access is successful until the transmission of the SSB set is terminated. In addition, the base station may transmit an SSB within the SSB transmission window, and may transmit the SSB within the maximum number of SSBs capable of being transmitted in the SSB transmission window.

The base station may transmit an SSB, based on a discovery reference signal (DRS) transmission periodicity. Specifically, the DRS transmission of the base station may include SSB transmission. In this case, the window for SSB transmission or the SSB transmission window described above may be replaced with a DRS transmission window. In addition, the DRS transmission window indicates a time interval in which a DRS can be transmitted. In addition, the magnitude of the duration of the DRS transmission window may be fixed. In addition, the DRS transmission window may be configured so as to repeat in a predetermined periodicity. In addition, the DRS transmission window may be configured for each UE.

Figure 24:
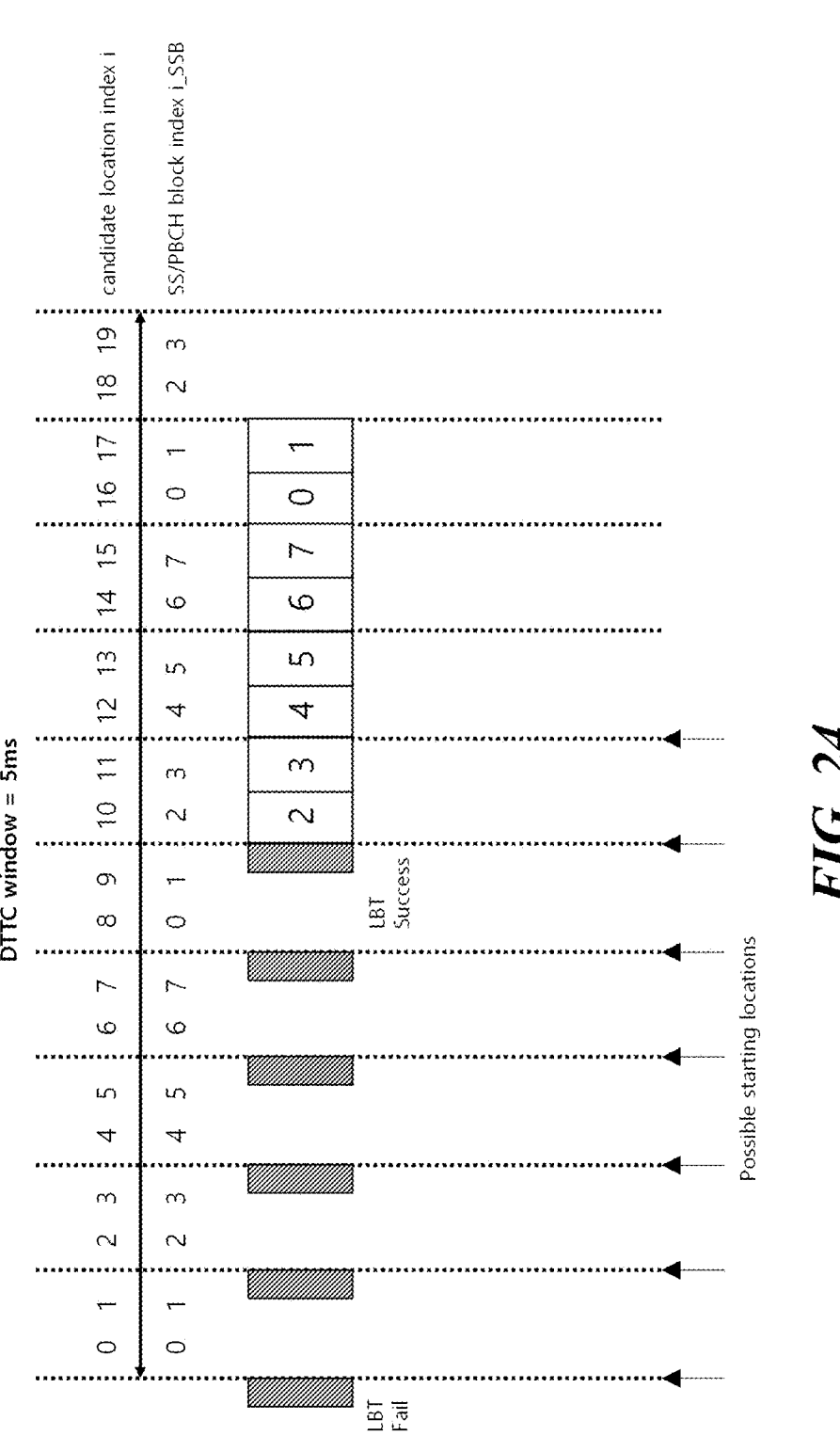
FIG. 24 shows a case where the mapping between SSB indexes and candidate location indexes is fixed within a DRS transmission window according to an embodiment of the disclosure.

FIG. 24 shows a case where the mapping between SSB indexes and SBS transmission candidate location indexes is fixed within a DRS transmission window according to an embodiment of the disclosure.

In FIG. 24, in a case where a subcarrier spacing of 30 KHz is used and the duration of a DRS transmission window is configured to be 5 ms, there may be 20 SSB transmission candidate locations within a DRS transmission window, and each of the 20 SSB transmission candidate locations may correspond to one SSB index. In this case, an SSB index corresponding to each of the 20 SSB transmission candidate locations may be static. That is, the SSB index corresponding to each of the 20 SSB transmission candidate locations may remain the same after being configured. For example, when the maximum number of SSBs capable of being transmitted is 8, the SSB transmission candidate location indexes and the SSB indexes may be mapped as follows. Since a subcarrier spacing of 30 KHz is used, a DRS transmission window having a duration of 5 ms includes SSB transmission candidate locations for transmission of a total of 20 SSBs. For convenience of explanation, each SSB transmission candidate location index is denoted as "i", and an SSB index corresponding to the SSB transmission candidate location "i" is denoted as "i_SSB". When the indexes of the SSB transmission candidate locations are 0 to 7, it may be given as i_SSB=i. In addition, when the indexes of the SSB transmission candidate locations are 8 to 15, it may be given as i_SSB=(i–8). In addition, when the indexes of the SSB transmission candidate locations are 16 to 19, it may be given as i_SSB=(i–16). The mapping between the SSB transmission candidate location indexes and the SSB indexes is maintained even in a DRS transmission window in the next periodicity. FIG. 24 shows a case to which this embodiment is applied. In this embodiment, assuming that the probability of success in LBT is the same at each of the SSB transmission candidate location indexes, SSBs corresponding to SSB index values 0 to 3 may have a probability of 3/20 for transmission opportunities, and SSBs corresponding to SSB index values 4 to 7 may have a probability of $\frac{1}{10}$ for transmission opportunities. The mapping between the SSB transmission candidate location indexes and the SSB indexes may be reconfigured for each DRS transmission window in order to secure a uniform transmission probability between SSBs corresponding to different SSB indexes. Specifically, a mapping relationship between SSB transmission candidate locations and SSBs in a second DRS transmission window may be different from a mapping relationship between SSB transmission candidate locations and SSBs in a first DRS transmission window.

Figure 25:
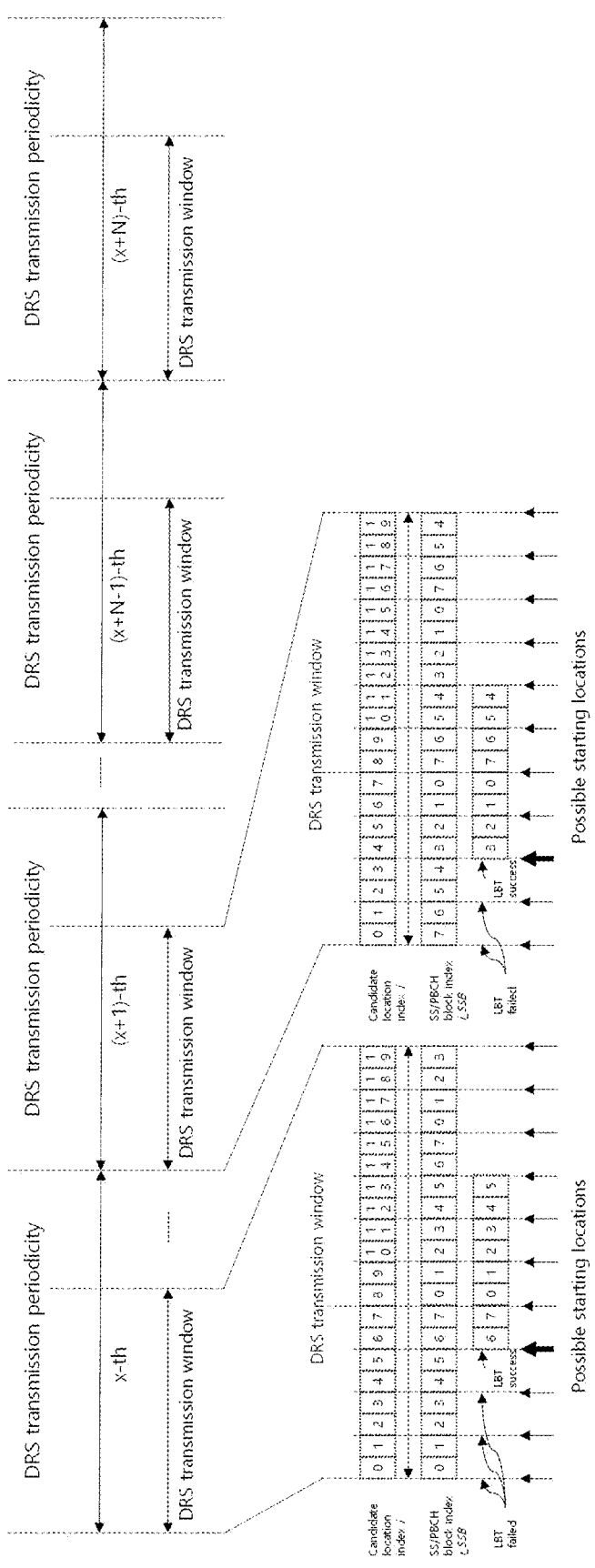
FIGS. 25 and 26 show a case where the mapping between SSB indexes and candidate location indexes is not fixed within a DRS transmission window according to an embodiment of the disclosure.
Figure 26:
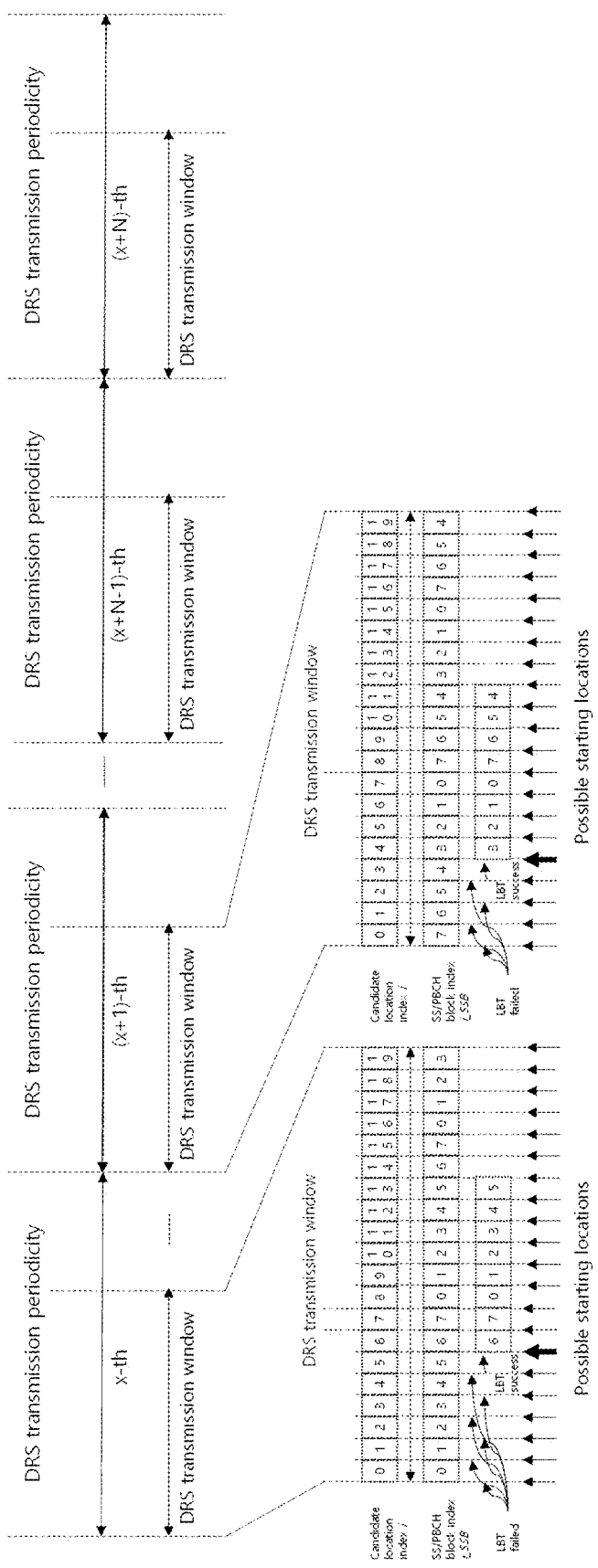

FIGS. 25 and 26 show a case where the mapping between SSB indexes and SSB transmission candidate location indexes is not fixed within a DRS transmission window according to an embodiment of the disclosure.

The base station may cyclically wrap around SSB indexes mapped to SSB transmission candidate location indexes in a previous DRS transmission window, and may map the same to the SSB transmission candidate location indexes. Specifically, the SSB indexes may be mapped to the SSB transmission candidate location indexes in the DRS transmission window in the reverse order of the SSB indexes mapped to the SSB transmission candidate location indexes in an immediately previous DRS transmission window. The base station may map the SSB indexes to the SSB transmission candidate location indexes in the DRS transmission window in the reverse order of the SSB indexes mapped to the SSB transmission candidate location indexes in the immediately previous DRS transmission window, and may transmit SSBs, based on the mapping between the SSB transmission candidate location indexes and the SSB indexes. In a specific embodiment, SSB indexes may be mapped to SSB transmission candidate location indexes in even-numbered DRS transmission windows as in the following equation.

$$i\_SSB = i \bmod L$$

In this case, "x mod y" represents the remainder obtained by dividing x by y. In addition, "L" is the maximum number of SSBs capable of being transmitted by the base station within the DRS transmission window.

In addition, SSB indexes may be mapped to SSB transmission candidate location indexes in odd-numbered DRS transmission windows as in the following equation.

$$i\_SSB = (L-1)-(i \bmod L)$$

For example, in a case where the maximum number of SSBs capable of being transmitted in a DRS transmission window is 8, the duration of the DRS transmission window is 5 ms, and a subcarrier spacing of 30 KHz is used for SSB transmission, the SSB transmission candidate location indexes and the SSB indexes may be mapped as follows. Since a subcarrier spacing of 30 KHz is used, a DRS transmission window having a duration of 5 ms includes SSB transmission candidate locations for transmission of a total of 20 SSBs. "X" is an even number. When the indexes of an X-th SSB transmission candidate location are 0 to 7, it may be given as i_SSB=i mod 8. In addition, when the indexes of the SSB transmission candidate locations are 8 to 15, it may be given as i_SSB=i mod 8. In addition, when the indexes of the SSB transmission candidate locations are 16 to 19, it may be given as i_SSB=i mod 8. In the case of an (X+1)th DRS transmission window, when the indexes of the SSB transmission candidate locations are 0 to 7, it may be given as i_SSB=7−(i mod 8). In addition, when the indexes of the SSB transmission candidate locations are 8 to 15, it may be given as i_SSB=7−(i mod 8). In addition, when the indexes of the SSB transmission candidate locations are 16 to 19, it may be given as i_SSB=7−(i mod 8). FIG. 25 shows SSB transmission to which this embodiment is applied.

In FIG. 25, the base station performs an LBT procedure in one slot for SSB transmission, that is, in the granularity of two SSB transmission candidate locations. As described above, the base station may perform channel access in one slot, that is, in the granularity of two SSB transmission candidate locations for SSB transmission. Specifically, the base station may perform an LBT procedure in one slot for SSB transmission, that is, in the granularity of two SSB transmission candidate locations for SSB transmission. In this case, when the base station fails in an LBT procedure for starting SSB transmission in an SSB transmission candidate location having index i, the base station may perform the LBT procedure for starting SSB transmission in an SSB transmission candidate location having index i+2, and the base station is unable to perform the LBT procedure for starting SSB transmission in an SSB transmission candidate location having index i+1. However, this embodiment is not limited thereto, and the base station may perform channel access for SSB transmission in the granularity of n SSB transmission candidate locations. In this case, "n" is a positive integer. Specifically, the base station may perform an LBT procedure for SSB transmission in the granularity of n SSB transmission candidate locations. Specifically, when the base station fails in the LBT procedure for starting SSB transmission in the SSB transmission candidate location having index i, the base station may perform the LBT procedure for starting SSB transmission in an SSB transmission candidate location having index i+n, and is unable to perform the LBT procedure for starting SSB transmission in an SSB transmission candidate location prior to the SSB transmission candidate location having index i+n. In a specific embodiment, "n" may be 1.

FIG. 26 shows a case where the base station performs an LBT procedure for SSB transmission in the granularity of one SSB transmission candidate location.

In the foregoing description, although the case where the number of SSB transmission candidate locations in the DRS transmission window is 20 and the maximum number of transmissions within 5 ms is 8 has been described as an example, the above embodiments are not limited to these values. The embodiments may also be applied to a case where the number of SSB transmission candidate locations in the DRS transmission window is P and the maximum number of transmissions within 5 ms is Q. In this case, "P" is a natural number greater than 0, and "Q" is a natural number greater than 0.

In the embodiments described with reference to FIGS. 25 and 26, two types of mapping between SSB transmission candidate locations and SSB indexes are alternately applied to the DRS transmission window. Four types of mapping between SSB transmission candidate locations and SSB indexes may be alternately applied to the DRS transmission window. This will be described with reference to FIGS. 27 and 28.

Figure 27:
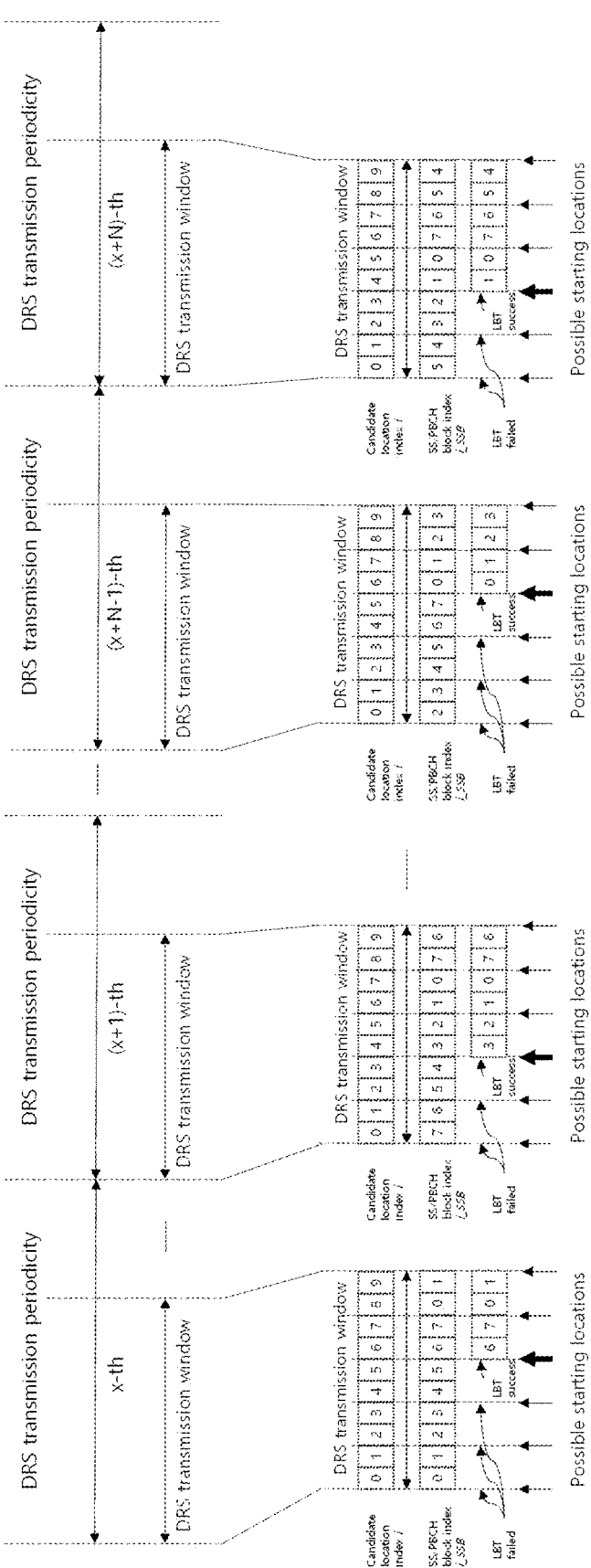
FIGS. 27 to 29 show a case where the mapping between SSB indexes and candidate location indexes is not fixed within a DRS transmission window according to another embodiment of the disclosure.
Figure 28:
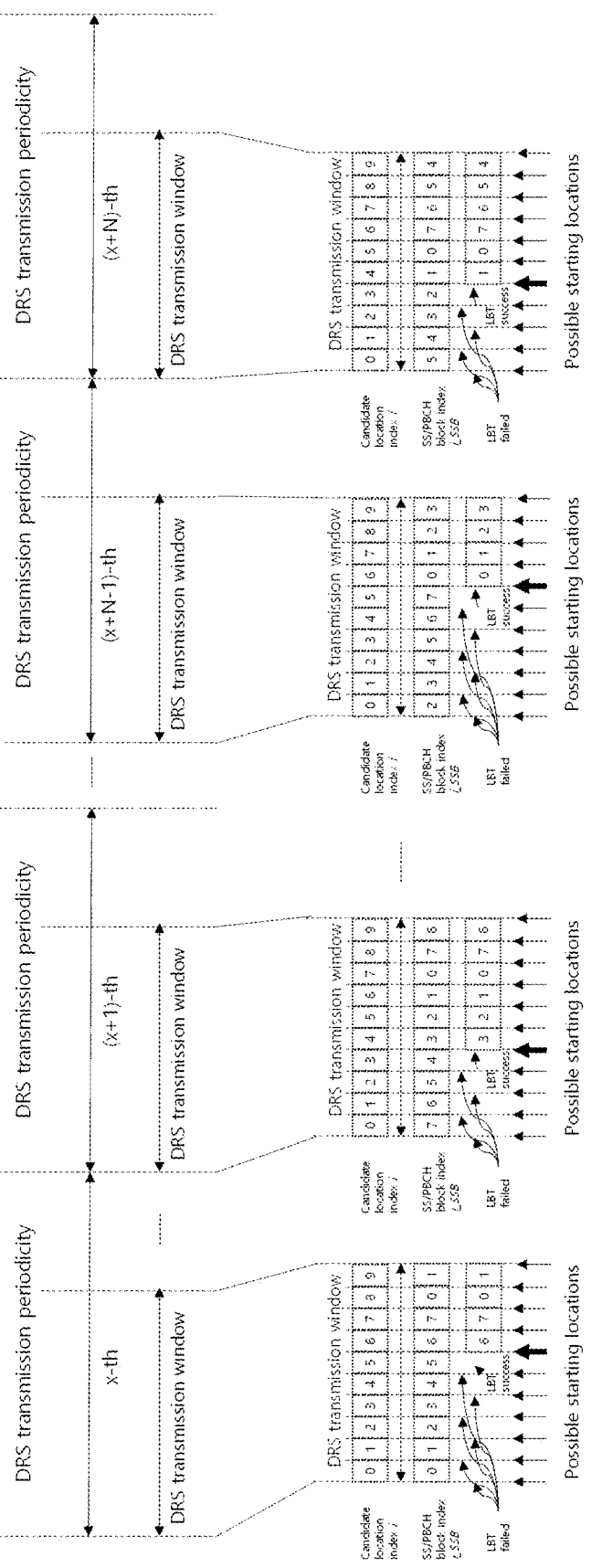
Figure 29:
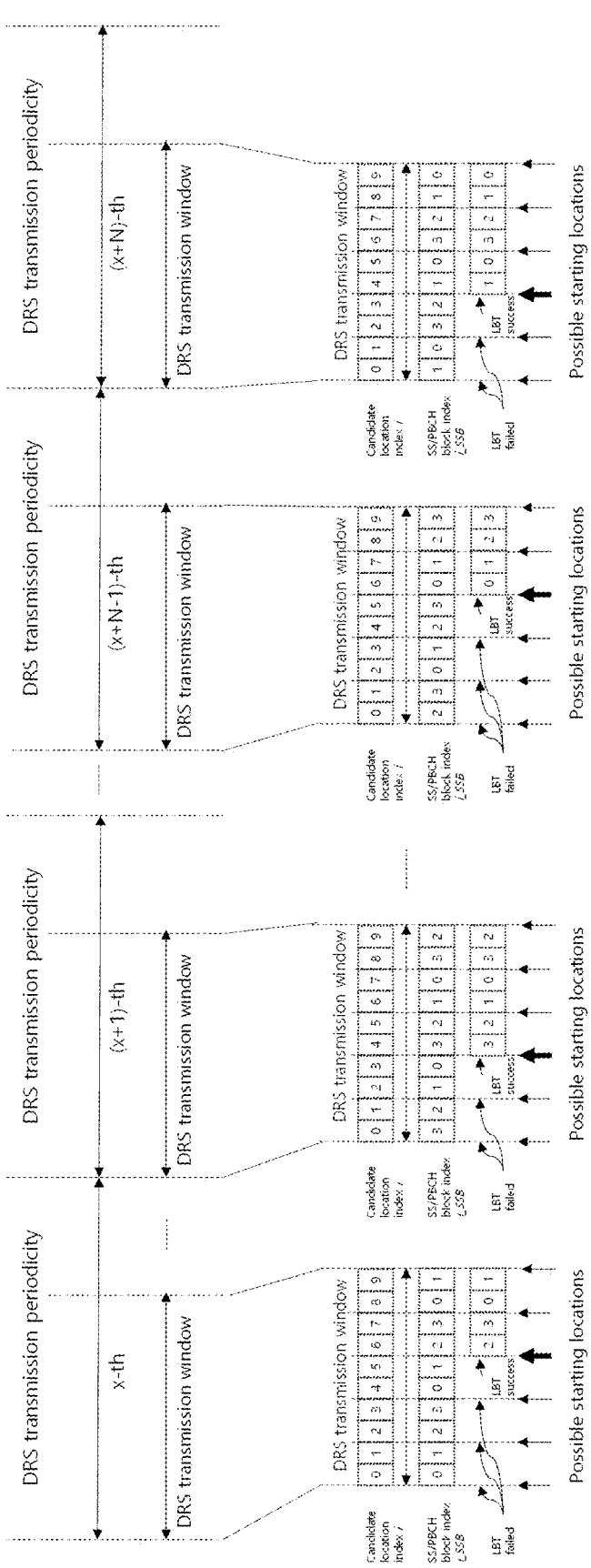

FIGS. 27 to 29 show a case where the mapping between SSB indexes and SSB transmission candidate location indexes is not fixed within a DRS transmission window according to another embodiment of the disclosure.

In a specific embodiment, when the remainder obtained by dividing N by 4 is 0 in an (x+N)th DRS transmission window, SSB indexes may be mapped to SSB transmission candidate location indexes as in the following equation.

$$i\_SSB = i \bmod L$$

In this case, "x mod y" represents the remainder obtained by dividing x by y. In addition, "L" is the maximum number of SSBs capable of being transmitted by the base station within the DRS transmission window.

In addition, when the remainder obtained by dividing N by 4 is 1 in the (x+N)th DRS transmission window, the SSB indexes may be mapped to the SSB transmission candidate location indexes as in the following equation.

$$i\_SSB = (L-1) - (i \bmod L)$$

In addition, when the remainder obtained by dividing N by 4 is 2 in the (x+N)th DRS transmission window, the SSB indexes may be mapped to the SSB transmission candidate location indexes as in the following equation.

$$i\_SSB = (i+2) \bmod L$$

In addition, when the remainder obtained by dividing N by 4 is 3 in the (x+N)th DRS transmission window, the SSB indexes may be mapped to the SSB transmission candidate location indexes as in the following equation.

$$i\_SSB = (L-1) - \{(i+2) \bmod L\}$$

For example, in a case where the maximum number of SSBs capable of being transmitted in a DRS transmission window is 8, the duration of the DRS transmission window is 5 ms, and a subcarrier spacing of 15 KHz is used for SSB transmission, SSB transmission candidate location indexes and SSB indexes may be mapped as follows. Since a subcarrier spacing of 15 KHz is used, a DRS transmission window having a duration of 5 ms includes SSB transmission candidate locations for transmission of a total of 10 SSBs. "X" is a multiple of 4. When the indexes of an X-th SSB transmission candidate location are 0 to 7, it may be given as i_SSB=i mod 8. In addition, when the indexes of the SSB transmission candidate locations are 8 to 9, it may be given as i_SSB=i mod 8. When the indexes of an (X+1)th SSB transmission candidate location are 0 to 7, it may be given as i_SSB=7−(i mod 8). In addition, when the indexes of the SSB transmission candidate locations are 8 to 9, it may be given as i_SSB=7−(i mod 8). When the indexes of an (X+2)th SSB transmission candidate location are 0 to 5, it may be given as i_SSB=(i+2) mod 8. In addition, when the indexes of the SSB transmission candidate locations are 6 to 9, it may be given as i_SSB=(i+2) mod 8. When the indexes of an (X+3)th SSB transmission candidate location are 0 to 5, it may be given as i_SSB=7−{(i+2) mod 8)}. In addition, when the indexes of the SSB transmission candidate locations are 6 to 9, it may be given as i_SSB=7−{(i+2) mod 8)}.

In FIG. 27, the base station performs an LBT procedure in one slot for SSB transmission, that is, in the granularity of two SSB transmission candidate locations. As described above, the base station may perform an LBT procedure in one slot, that is, in the granularity of two SSB transmission candidate locations for SSB transmission. In this case, when the base station fails in an LBT procedure for starting SSB transmission in an SSB transmission candidate location having index i, the base station may perform the LBT procedure for starting SSB transmission in an SSB transmission candidate location having index i+2, and the base station is unable to perform the LBT procedure for starting SSB transmission in an SSB transmission candidate location having index i+1. However, this embodiment is not limited thereto, and the base station may perform the LBT procedure for SSB transmission in the granularity of n SSB transmission candidate locations. In this case, "n" is a positive integer. Specifically, when the base station fails in the LBT procedure for starting SSB transmission in the SSB transmission candidate location having index i, the base station may perform the LBT procedure for starting SSB transmission in an SSB transmission candidate location having index i+n, and is unable to perform the LBT procedure for starting SSB transmission in an SSB transmission candidate location prior to the SSB transmission candidate location having index i+n.

FIG. 28 shows a case where the base station performs an LBT procedure for SSB transmission in the granularity of one SSB transmission candidate location.

In the foregoing description, although the case where the number of SSB transmission candidate locations in the DRS transmission window is 10 and the maximum number of transmissions within 5 ms is 8 has been described as an example, the above embodiments are not limited to these values. The embodiments may also be applied to a case where the number of SSB transmission candidate locations in the DRS transmission window is P and the maximum number of transmissions within 5 ms is Q. In this case, "P" is a natural number greater than 0, and "Q" is a natural number greater than 0.

In another specific embodiment, when the remainder obtained by dividing N by 4 is 0 in an (x+N)th DRS transmission window, SSB indexes may be mapped to SSB transmission candidate location indexes as in the following equation.

$$i\_SSB=i \bmod L$$

In this case, "x mod y" represents the remainder obtained by dividing x by y. In addition, "L" is the maximum number of SSBs capable of being transmitted by the base station within a half radio frame.

In addition, when the remainder obtained by dividing N by 4 is 1 in the (x+N)th DRS transmission window, the SSB indexes may be mapped to the SSB transmission candidate location indexes as in the following equation.

$$i\_SSB=(L-1)-\{(i+2)\bmod L\}.$$

In addition, when the remainder obtained by dividing N by 4 is 2 in the (x+N)th DRS transmission window, the SSB indexes may be mapped to the SSB transmission candidate location indexes as in the following equation.

$$i\_SSB=(i+2)\bmod L$$

In addition, when the remainder obtained by dividing N by 4 is 3 in the (x+N)th DRS transmission window, the SSB indexes may be mapped to the SSB transmission candidate location indexes as in the following equation.

$$i\_SSB=(L-1)-(i \bmod L)$$

FIG. 29 shows that the embodiment described with reference to FIG. 27 is applied to a case where the maximum number of SSBs capable of being transmitted in a DRS transmission window is 4.

FIGS. 30 to 34 show a case where the mapping between SSB indexes and SSB transmission candidate location indexes is not fixed within a DRS transmission window according to another embodiment of the disclosure.

The base station may differently configure the mapping between SSB transmission candidate location indexes and SSB indexes, in each of the DRS transmission windows from an x-th DRS transmission window to an (x+N)th DRS transmission window. Specifically, whenever the DRS transmission window is changed, the base station may cyclically wrap around and configure values of SSB indexes mapped to SSB transmission candidate location indexes. When the maximum number of SSBs capable of being transmitted by the base station in a half radio frame is 8, the base station may apply cyclical wrapping-around to the mapping between SSB transmission candidate locations and SSB indexes in the granularity of one of 4, 2, and 1. In addition, when the maximum number of SSBs capable of being transmitted by the base station in a half radio frame is 4, the base station may apply cyclical wrapping-around to the mapping between the SSB transmission candidate locations and the SSB indexes in the granularity of one of 2 and 1.

Figure 30:
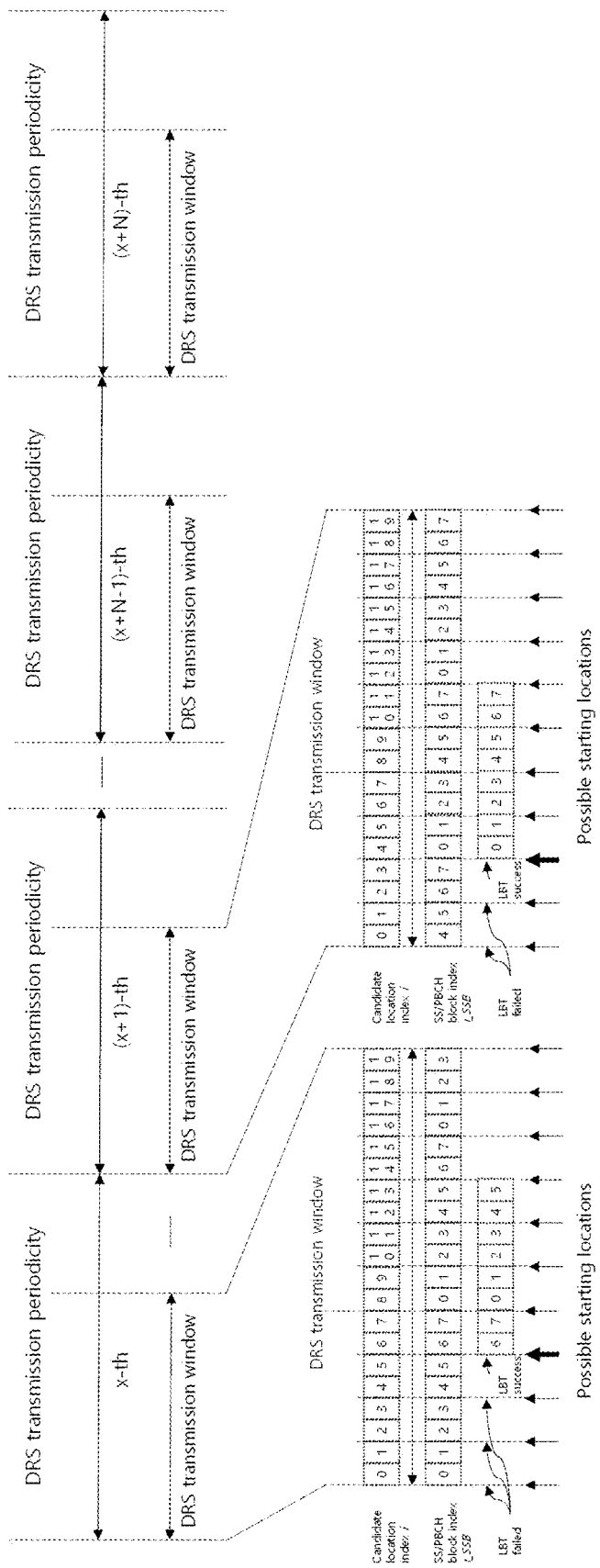
FIGS. 30 to 33 show a case where the mapping between SSB indexes and candidate location indexes is not fixed within a DRS transmission window according to still another embodiment of the disclosure.
Figure 31:
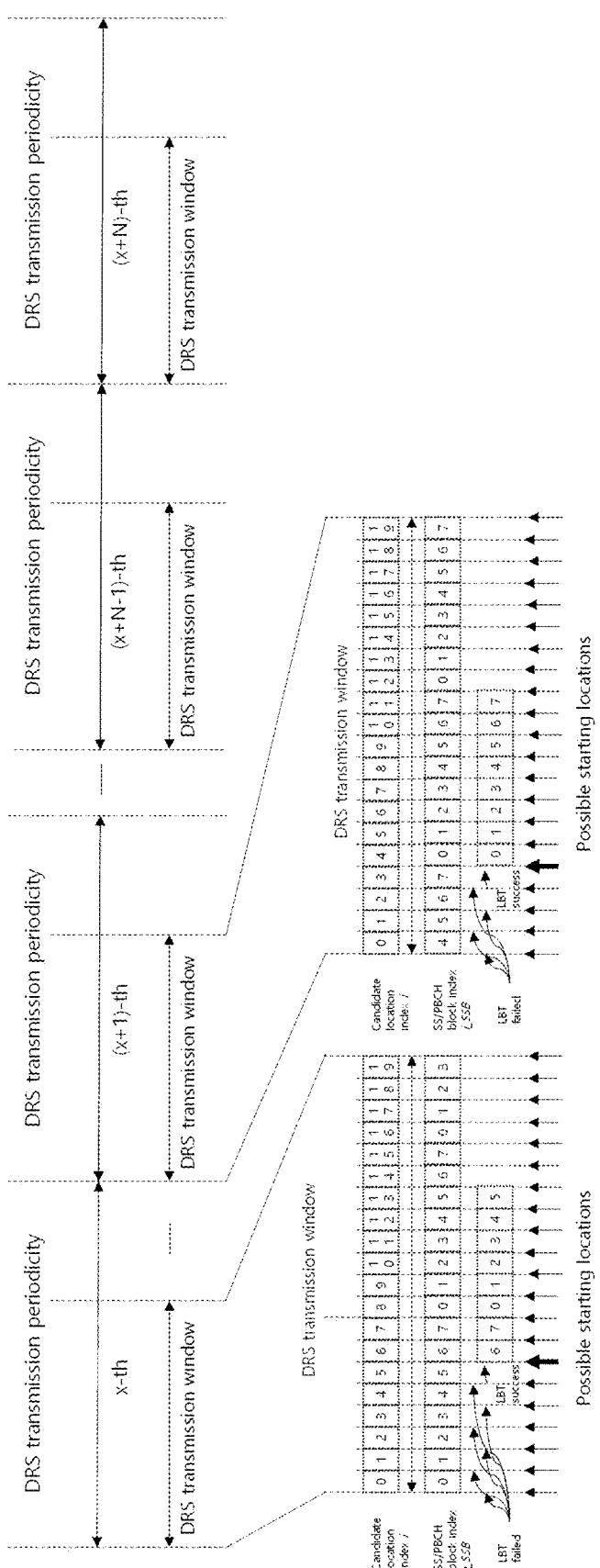

The base station may apply cyclical wrapping-around to the mapping between the SSB transmission candidate locations and the SSB indexes in the granularity of a value obtained by dividing the maximum number of SSBs capable of being transmitted by the base station in the DRS transmission window by 4. FIGS. 30 and 31 show cases of applying a cyclic extension to the mapping between SSB transmission candidate locations and SSB indexes in the granularity of a value obtained by dividing the maximum number of SSBs capable of being transmitted by the base station in a half radio frame by 4 according to an embodiment of the disclosure.

Specifically, SSB transmission candidate location indexes and SSB indexes may be mapped as follows.

When the remainder obtained by dividing N by 2 is 0 in an (x+N)th DRS transmission window, the SSB indexes may be mapped to the SSB transmission candidate location indexes as in the following equation.

$$i\_SSB=i \bmod L$$

In this case, "x mod y" represents the remainder obtained by dividing x by y. In addition, "L" is the maximum number of SSBs capable of being transmitted by the base station within the DRS transmission window.

In addition, when the remainder obtained by dividing N by 2 is 1 in the (x+N)th DRS transmission window, the SSB indexes may be mapped to the SSB transmission candidate location indexes as in the following equation.

$$i\_SSB=(i+L/2)\bmod L$$

FIG. 30 shows the mapping between SSB transmission candidate location indexes and SSB indexes in a case where the maximum number of SSBs capable of being transmitted in a DRS transmission window is 8 and a subcarrier spacing of 30 KHz is used for SSB transmission. Therefore, the DRS transmission window may include 20 SSB transmission candidate locations. In FIG. 30, although the case where the number of SSB transmission candidate locations in the DRS transmission window is 20, the maximum number of transmissions in the DRS transmission window is 8, and the duration of the DRS transmission window is 5 ms has been described as an example, the above embodiments are not limited to these values. The embodiments may also be applied to a case where the number of SSB transmission candidate locations in the DRS transmission window is P and the maximum number of transmissions in the DRS transmission window is Q. In this case, "P" is a natural number greater than 0, and "Q" is a natural number greater than 0.

In FIG. 30, the base station performs an LBT procedure for SSB transmission in one slot, that is, in the granularity of two SSB transmission candidate locations. As described above, the base station may perform an LBT procedure for SSB transmission in one slot, that is, in the granularity of two SSB transmission candidate locations. In this case, when the base station fails in an LBT procedure for starting SSB transmission in an SSB transmission candidate location having index i, the base station may perform the LBT procedure for starting SSB transmission in an SSB transmission candidate location having index i+2, and the base station is unable to perform the LBT procedure for starting SSB transmission in an SSB transmission candidate location having index i+1. However, this embodiment is not limited thereto, and the base station may perform the LBT procedure for SSB transmission in the granularity of n SSB transmission candidate locations. In this case, "n" is a positive integer. Specifically, when the base station fails in the LBT procedure for starting SSB transmission in the SSB transmission candidate location having index i, the base station may perform the LBT procedure for starting SSB transmission in an SSB transmission candidate location having index i+n, and is unable to perform the LBT procedure for starting SSB transmission in an SSB transmission candidate location prior to the SSB transmission candidate location having index i+n.

FIG. 31 shows a case where the base station performs an LBT procedure for SSB transmission in the granularity of one SSB transmission candidate location.

Figure 32:
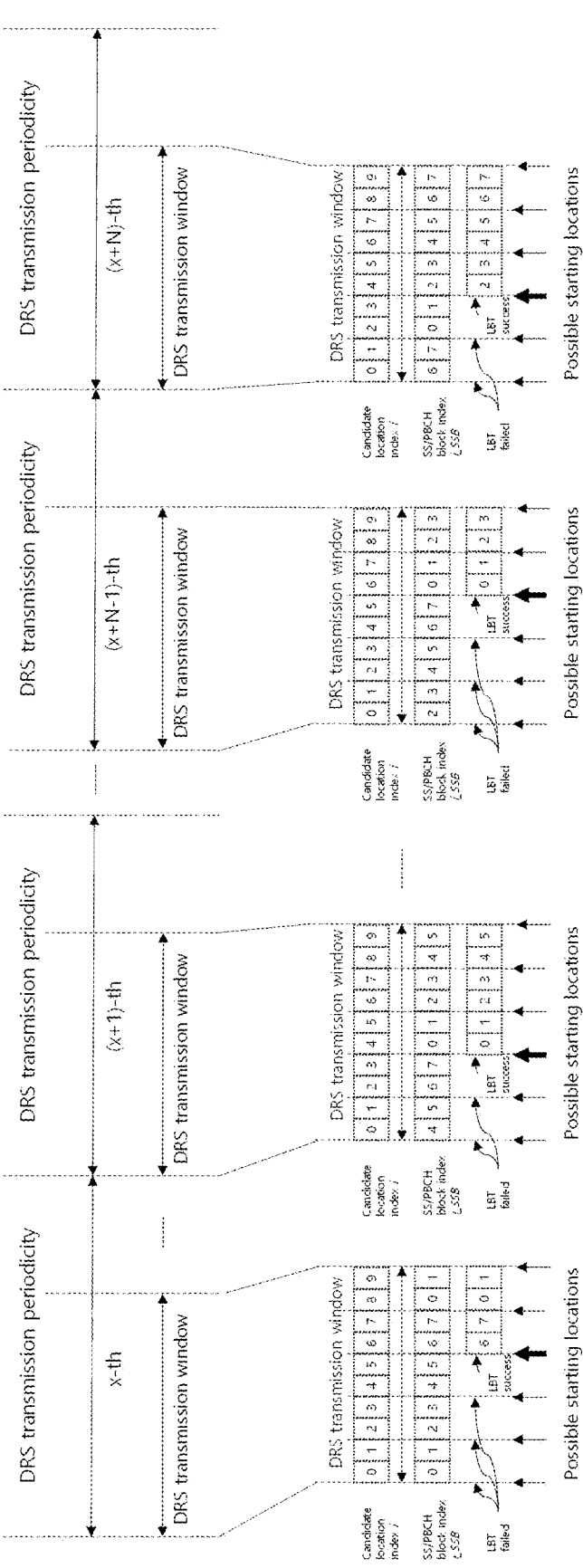
Figure 33:
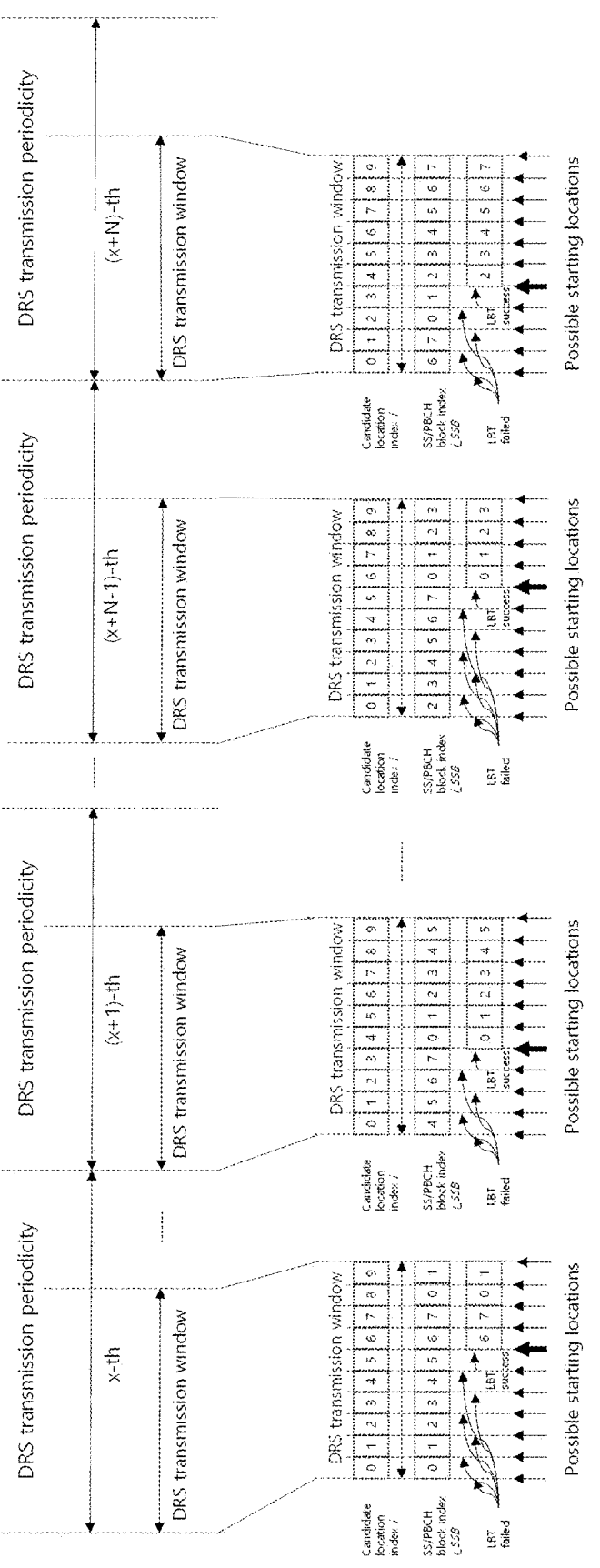
Figure 34:
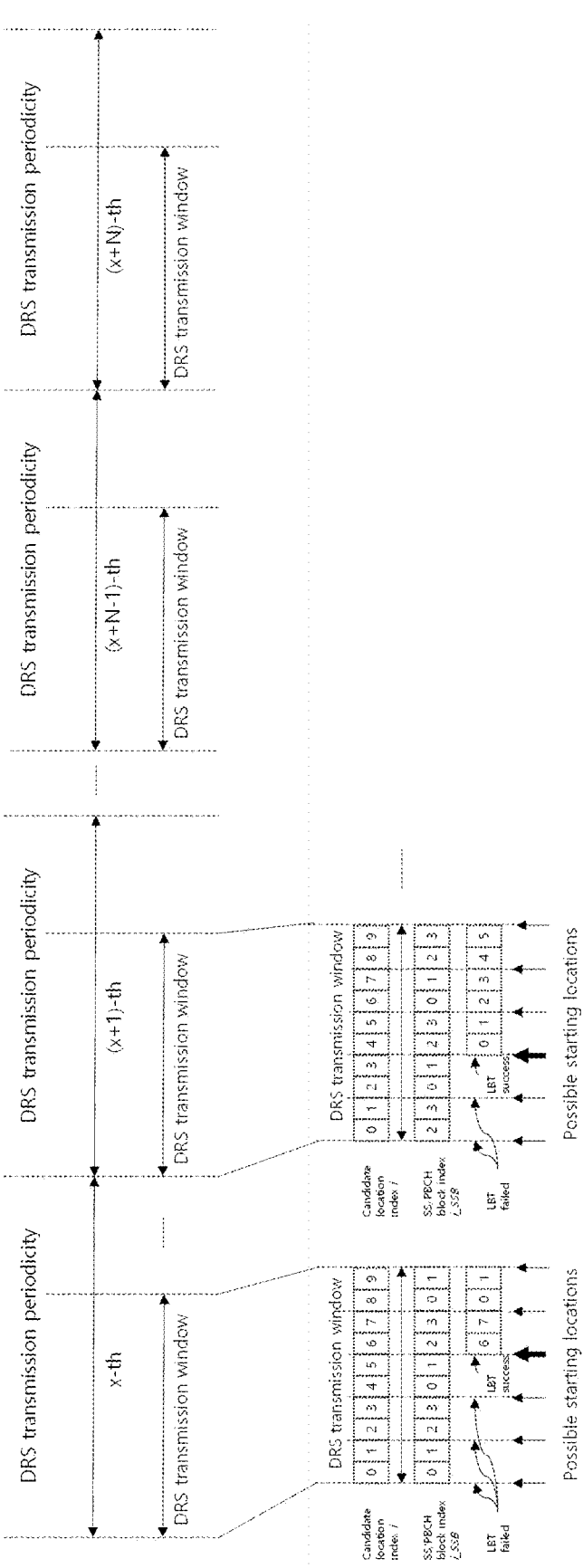
FIG. 34 shows a method for configuring a length of a PDSCH and a start time point of the PDSCH according to an embodiment of the disclosure.

The base station may apply a cyclic extension to the mapping between SSB transmission candidate locations and SSB indexes in the granularity of a value obtained by dividing the maximum number of SSBs capable of being transmitted by the base station in a half radio frame by 2. FIGS. 32 to 34 show cases of applying a cyclic extension to the mapping between SSB transmission candidate locations and SSB indexes in the granularity of a value obtained by dividing the maximum number of SSBs capable of being transmitted by the base station in a half radio frame by 2 according to an embodiment of the disclosure.

The base station may apply a cyclic extension in the granularity of a value obtained by dividing the maximum number of SSBs capable of being transmitted by the base station in a half radio frame by 2. Specifically, SSB transmission candidate location indexes and SSB indexes may be mapped as follows.

When the remainder obtained by dividing N by 4 is 0 in an (x+N)th DRS transmission window, the SSB indexes may be mapped to the SSB transmission candidate location indexes as in the following equation.

$$i\_SSB = i \bmod L$$

In this case, "x mod y" represents the remainder obtained by dividing x by y. In addition, "L" is the maximum number of SSBs capable of being transmitted by the base station within a half radio frame.

In addition, when the remainder obtained by dividing N by 4 is 1 in the (x+N)th DRS transmission window, the SSB indexes may be mapped to the SSB transmission candidate location indexes as in the following equation.

$$i\_SSB = (i + L/2) \bmod L$$

In addition, when the remainder obtained by dividing N by 4 is 2 in the (x+N)th DRS transmission window, the SSB indexes may be mapped to the SSB transmission candidate location indexes as in the following equation.

$$i\_SSB = (i + L/4) \bmod L$$

In addition, when the remainder obtained by dividing N by 4 is 3 in the (x+N)th DRS transmission window, the SSB indexes may be mapped to the SSB transmission candidate location indexes as in the following equation.

$$i\_SSB = (i + 3*L/4) \bmod L$$

FIG. 32 shows the mapping between SSB transmission candidate location indexes and SSB indexes in a case where the maximum number of SSBs capable of being transmitted in a DRS transmission window is 8 and a subcarrier spacing of 15 KHz is used for SSB transmission. Therefore, the DRS transmission window may include 10 SSB transmission candidate locations. In FIG. 32, although the case where the number of SSB transmission candidate locations in the DRS transmission window is 10, the maximum number of transmissions in the DRS transmission window is 8, and the duration of the DRS transmission window is 5 ms has been described as an example, the above embodiments are not limited to these values. The embodiments may also be applied to a case where the number of SSB transmission candidate locations in the DRS transmission window is P and the maximum number of transmissions in the DRS transmission window is Q. In this case, "P" is a natural number greater than 0, and "Q" is a natural number greater than 0.

In FIG. 32, the base station performs an LBT procedure for SSB transmission in one slot, that is, in the granularity of two SSB transmission candidate locations. As described above, the base station may perform an LBT procedure for SSB transmission in one slot, that is, in the granularity of two SSB transmission candidate locations. In this case, when the base station fails in an LBT procedure for starting SSB transmission in an SSB transmission candidate location having index i, the base station may perform the LBT procedure for starting SSB transmission in an SSB transmission candidate location having index i+2, and the base station is unable to perform the LBT procedure for starting SSB transmission in an SSB transmission candidate location having index i+1. However, this embodiment is not limited thereto, and the base station may perform the LBT procedure for SSB transmission in the granularity of n SSB transmission candidate locations. In this case, "n" is a positive integer. Specifically, when the base station fails in the LBT procedure for starting SSB transmission in the SSB transmission candidate location having index i, the base station may perform the LBT procedure for starting SSB transmission in an SSB transmission candidate location having index i+n, and is unable to perform the LBT procedure for starting SSB transmission in an SSB transmission candidate location prior to the SSB transmission candidate location having index i+n.

FIG. 33 shows a case where the base station performs an LBT procedure for SSB transmission in the granularity of one SSB transmission candidate location.

FIG. 34 shows a case where the maximum number of SSBs capable of being transmitted by the base station is 4 in a DRS transmission window. That is, when the remainder obtained by dividing N by 2 is 0 in an (x+N)th DRS transmission window, SSB indexes may be mapped to SSB transmission candidate location indexes as in the following equation.

$$i\_SSB=i \bmod L$$

In addition, when the remainder obtained by dividing N by 2 is 1 in the (x+N)th DRS transmission window, the SSB indexes may be mapped to the SSB transmission candidate location indexes as in the following equation.

$$i\_SSB=(i+L/2)\bmod L$$

In another specific embodiment, SSB transmission candidate location indexes and SSB indexes may be mapped as follows.

When the remainder obtained by dividing N by 4 is 0 in an (x+N)th DRS transmission window, the SSB indexes may be mapped to the SSB transmission candidate location indexes as in the following equation.

$$i\_SSB=i \bmod L$$

In this case, "x mod y" represents the remainder obtained by dividing x by y. In addition, "L" is the maximum number of SSBs capable of being transmitted by the base station within a half radio frame.

In addition, when the remainder obtained by dividing N by 4 is 1 in the (x+N)th DRS transmission window, the SSB indexes may be mapped to the SSB transmission candidate location indexes as in the following equation.

$$i\_SSB=(i+L/4)\bmod L$$

In addition, when the remainder obtained by dividing N by 4 is 2 in the (x+N)th DRS transmission window, the SSB indexes may be mapped to the SSB transmission candidate location indexes as in the following equation.

$$i\_SSB=(i+L/2)\bmod L$$

In addition, when the remainder obtained by dividing N by 4 is 3 in the (x+N)th DRS transmission window, the SSB indexes may be mapped to the SSB transmission candidate location indexes as in the following equation.

$$i\_SSB=(i+3*L/4)\bmod L$$

In this case, the remaining operations, excluding the mapping between the SSB transmission candidate location indexes and the SSB indexes, may be applied in the same manner to the embodiments described with reference to FIGS. 32 to 34.

The base station may transmit an SSB, based on the mapping between the SSB transmission candidate locations and the SSBs to which the embodiments described with reference to FIGS. 24 to 34 are applied. Specifically, when the base station succeeds in channel access in a specific SSB transmission candidate location, the base station starts to transmit an SSB from the corresponding SSB transmission candidate location. In this case, the base station may transmit an SSB mapped to each SSB transmission candidate location at each SSB transmission candidate location. In a specific embodiment, the base station may transmit an SSB mapped to each of one or more SSB transmission candidate locations at each of one or more SSB transmission candidate locations located in a time interval from the SSB transmission candidate location in which channel access is successful until the transmission of the SSB is terminated. In addition, the base station may transmit an SSB in a DRS transmission window, and may transmit the SSB within the maximum number of SSBs capable of being transmitted within the duration of the DRS transmission window. The UE may receive an SSB included in a DRS, and may perform at least one of initial access, cell detection, RRM, RLM, and RSSI measurement, based on the DRS.

Through the embodiments described with reference to FIGS. 25 to 34, the base station may guarantee the probability of transmitting an SSB corresponding to each SSB index as uniform as possible.

Through the embodiments described with reference to FIGS. 25 to 34, the UE is required to receive additional timing information after receiving an SSB. That is, the same SSB may be transmitted in multiple SSB transmission candidate locations within one DRS transmission window. For example, in FIG. 25, an SSB having a first SSB index (SSB index #0) may be transmitted in an SSB transmission candidate location corresponding to one of SSB transmission candidate location index values 0, 8, and 16 in an x-th DRS transmission window. When the UE receives the SSB having the first SSB index (SSB index #0), the UE is not aware of whether the SSB has been received in a first SSB transmission candidate location index (#0) or a ninth SSB transmission candidate location index (#8), or has been transmitted in a seventeenth SSB transmission candidate location index (#16). In addition, in FIG. 34, the SSB having the first SSB index (SSB index #0) may be transmitted in the first SSB transmission candidate location index (#0) or a fifth SSB transmission candidate location index (#4) in the x-th DRS transmission window. When the UE receives the SSB having the first SSB index (SSB index #0), the UE is not aware of whether the SSB has been received in the first SSB transmission candidate location index (#0) or the fifth SSB transmission candidate location index (#4). Therefore, the UE is required to obtain additional timing information in order to recognize an SSB transmission candidate location in which the SSB has been received. As a result, the UE is required to obtain additional timing information in order to configure SSB reception timing according to the SSB transmission candidate location. Therefore, the base station may indicate additional timing information to the UE through a PBCH during initial access. In this case, the base station may transmit a timing offset for the SSB transmission candidate location mapped to the same SSB index to the UE through a PBCH. Specifically, the base station may indicate timing information by using a value of offset_SSB=floor (i/L). In this case, "i" is an index of the SSB transmission candidate location, and "L" is the maximum number of SSBs capable of being transmitted by the base station within a DRS transmission window. The number of SSB transmission candidate locations included in a DRS transmission window and the maximum number of SSBs capable of being transmitted in the DRS transmission window may differ depending on an unlicensed band carrier frequency and a subcarrier spacing. In addition, the number of SSB transmission candidate locations included in a DRS transmission window and the maximum number of SSBs capable of being transmitted in the DRS transmission window may differ depending on the length of the DRS transmission window and the duration of DRS transmission. Although above descriptions have been made on the assumption that the length of the DRS transmission window is the same as the length of the SSB transmission window, the length of the SSB transmission window is 5 ms, and up to 2 SSBs are able to be transmitted in one slot, the embodiment of the disclosure is not limited thereto.

In addition, in an unlicensed band, the UE and the base station perform channel access in the granularity of 20 MHz. This is intended for coexistence with other radio access technologies (RATs) using the unlicensed band, such as Wi-Fi. Specifically, in the unlicensed band, the UE and the base station may perform an LBT procedure in the granularity of 20 MHz, and may perform transmission in a channel according to the result of the LBT procedure. The UE is required to perform random access for uplink synchronization with the base station. Specifically, random access is required to be performed when both a carrier of an unlicensed band and a carrier of a licensed band are used as well as when the UE operates in a stand-alone state in an unlicensed band. This is due to the fact that the UE may not be collocated with the base station, or may use non-ideal backhaul in an indoor environment or an outdoor environment with low coverage, which requires a random access procedure for uplink synchronization. In a case where a bandwidth including multiple 20 MHz bandwidths is configured for the UE as a bandwidth for uplink transmission, the UE may attempt to transmit a random access preamble by using a 20 MHz bandwidth, which is a part of the corresponding frequency bandwidth. When a frequency band corresponding to the frequency bandwidth, through which the random access preamble transmission is attempted, is busy, the UE is unable to transmit a random access preamble even when a frequency bandwidth other than the 20 MHz bandwidth through which the random access preamble transmission is attempted, among the bandwidths configured for the UE, is idle. This problem may degrade spectral efficiency. Therefore, a method for solving the problem is required.

The base station may configure a bandwidth part (BWP) to have a bandwidth of 20 MHz in an unlicensed band. Specifically, the base station may not be allowed to configure the bandwidth of the BWP of the unlicensed band to have a value other than 20 MHz. When a frequency bandwidth having a bandwidth of 20 MHz or more is used, multiple BWPs may be configured for the UE. In addition, the base station may configure a PRACH transmission occasion for each BWP. The UE may attempt PRACH transmission for each BWP. In this case, when the UE succeeds in channel access in one BWP, the UE may transmit a PRACH in the corresponding BWP.

Therefore, in this embodiment, the UE may secure a higher PRACH transmission probability compared to a case where the UE attempts PRACH transmission in a frequency bandwidth having one 20 MHz bandwidth. In addition, the base station may configure a PRACH transmission occasion for each 20 MHz bandwidth for the UE. The UE may attempt PRACH transmission for each 20 MHz bandwidth. In this case, when the UE succeeds in channel access in one 20 MHz bandwidth, the UE may transmit a PRACH in the corresponding 20 MHz bandwidth. Therefore, in this embodiment, the UE may secure a higher PRACH transmission probability compared to a case where the UE attempts PRACH transmission in a frequency bandwidth having one 20 MHz bandwidth.

However, when the UE succeeds in channel access in multiple BWPs or multiple 20 MHz bandwidths, it becomes a problem whether the UE is able to transmit a PRACH in all of the multiple BWPs or the multiple 20 MHz bandwidths. When the UE succeeds in channel access in the multiple BWPs or the multiple 20 MHz bandwidths and transmits a PRACH in the multiple BWPs or the multiple 20 MHz bandwidths, there may be frequent collisions in transmission between UEs in the PRACH occasion. This may lead to a contention resolution procedure, which may increase system latency. Therefore, even when the UE succeeds in channel access in multiple BWPs or multiple 20 MHz bandwidths, the UE may transmit a PRACH only in one BWP or 20 MHz bandwidth. In this case, one BWP or 20 MHz bandwidth in which PRACH transmission is performed may be configured according to an agreement between the UE and the base station. Specifically, the UE and the base station may negotiate priority for a BWP or a 20 MHz bandwidth to be used for transmission after channel access. When the UE succeeds in channel access in multiple BWPs or multiple 20 MHz bandwidths, the UE may select one of the multiple BWPs or the multiple 20 MHz bandwidths according to the priority. The UE may transmit a PRACH through the selected BWP. The base station may perform PRACH detection according to the priority. In this case, when the base station completes the PRACH detection in one or more BWPs or one or more 20 MHz bandwidths according to the priority, the base station may not perform additional PRACH detection. In this case, the number of one or more BWPs or one or more 20 MHz bandwidths may be determined according to an agreement between the UE and the base station. In addition, the priority may be configured based on a serving cell index. Specifically, the priority may be configured such that a BWP having a higher serving cell index or a 20 MHz bandwidth having a higher serving cell index has a higher priority. In another specific embodiment, the priority may be configured such that a BWP having a lower serving cell index or a 20 MHz bandwidth having a lower serving cell index has a higher priority. The priority may be configured based on an index of the BWP or a channel number occupied by the 20 MHz bandwidth. Specifically, the priority may be configured such that a BWP having a higher BWP index has a higher priority. In still another specific embodiment, the priority may be configured such that a BWP having a lower BWP index has a higher priority.

In a random access procedure for uplink synchronization, the UE and the base station are required to perform at least four processes. Specifically, the UE is required to transmit a PRACH to the base station, and the base station is required to transmit a RACH response (RAR) to the UE. The UE is required to transmit a PUSCH, that is, message-3, in response to the RAR. In addition, the base station is required to transmit message-4 to the UE. In the transmission by the base station and the UE, each of the base station and the UE is required to perform a channel access procedure. Therefore, the random access procedure is more likely to cause an excessive delay. Therefore, a method for preventing an excessive delay in a random access procedure is required. In particular, a method for preventing an excessive delay in relation to RACH transmission is required.

The UE may attempt to transmit a PRACH within a PRACH transmission window. Specifically, when the UE fails to transmit a PRACH in a PRACH occasion configured by the base station, the UE may attempt to transmit a PRACH within the PRACH transmission window. In a specific embodiment, when the UE fails to transmit a PRACH in a PRACH occasion configured by the base station, the UE may attempt channel access within a PRACH transmission window. When the UE succeeds in channel access, the UE may transmit a PRACH to the base station. In this case, the PRACH transmission window may be configured by the base station. Specifically, the PRACH transmission window may be configured by the base station through RRC configuration. In addition, the base station may indicate information on the PRACH transmission window through RMSI before the RRC configuration. When the UE fails to receive the information on the PRACH transmission window through the RMSI, the UE may use default parameters as the information on the PRACH transmission window, based on PRACH configuration information configured by the RMSI.

Hereinafter, a CORESET #0 configuration method and a remaining system information (RMSI) configuration method in an NR-U system will be described in this specification.

Figure 35:
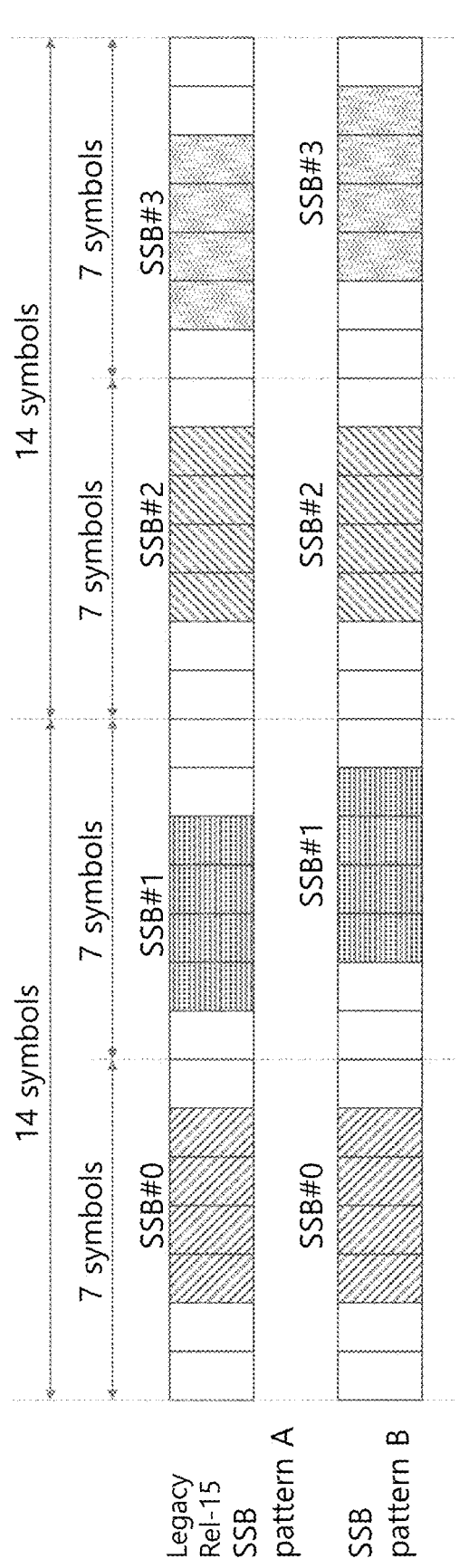
FIG. 35 shows a location of an OFDM symbol occupied by an SSB in a slot configured by 14 OFDM symbols according to an embodiment of the disclosure.

Specifically, a method for configuring a location of a symbol which may be occupied by CORESET #0 including a PDCCH for scheduling RMSI, a length of a PDSCH in which the RMSI is configured (assigned and configured), and a start time point of the PDSCH will be described with reference to FIG. 35. Specifically, the method may be a method for configuring a start and length indicator (SLIV) of RMSI. In FIG. 35, a slot may be configured by two half slots. In this specification, slot #n and symbol #n may mean an n-th slot and an n-th symbol, respectively.

Option-1) in the case of SSB pattern A of FIG. 35, for a first SSB in one slot, when a Type0-PDCCH supports CORESET #0 having a length of two symbols, the CORE-SET #0 may be mapped to symbols #0 and #1, and when the Type0-PDCCH supports CORESET #0 having a length of one symbol, the CORESET #0 may be mapped to symbol #0. For a second SSB in one slot, when the Type0-PDCCH supports CORESET #0 having a length of two symbols, the CORESET #0 may be mapped to symbols #6 and #7, and when the Type0-PDCCH supports CORESET #0 having a length of one symbol, the CORESET #0 may be mapped to symbol #6 or #7. Option-2) in the case of SSB pattern B of FIG. 35, for a first SSB in one slot, when a Type0-PDCCH supports CORESET #0 having a length of two symbols, the CORESET #0 may be mapped to symbols #0 and #1, and when the Type0-PDCCH supports CORESET #0 having a length of one symbol, the CORESET #0 may be mapped to symbol #0. For a second SSB in one slot, when the Type0-PDCCH supports CORESET #0 having a length of two symbols, the CORESET #0 may be mapped to symbols #7 and #8, and when the Type0-PDCCH supports CORESET #0 having a length of one symbol, the CORESET #0 may be mapped to symbol #7. Option-3) in the case of SSB pattern A of FIG. 35, for a first SSB in one slot, when a Type0-PDCCH supports CORESET #0 having a length of two symbols, the CORESET #0 may be mapped to symbols #0 and #1, and when the Type0-PDCCH supports CORESET #0 having a length of one symbol, the CORESET #0 may be mapped to symbol #0. For a second SSB in one slot, when the Type0-PDCCH does not support CORESET #0 having a length of two symbols and the Type0-PDCCH supports CORESET #0 having a length of one symbol, the CORE-SET #0 may be mapped to symbol #7.

A method for configuring a start symbol in which an RMSI-PDSCH is configured in a slot when the RMSI-PDSCH is configured by four symbols will be described.

In the case of option-1, a start symbol index of a start symbol in which an RMSI-PDSCH is configured may be symbol #1, #2, or #3 with respect to a first SSB of one slot, and may be symbol #7, #8, or #9 with respect to a second SSB of one slot. In addition, the last symbol of one slot may be configured as an LBT gap between slots. In the case of option-2, a start symbol index of a start symbol in which an RMSI-PDSCH is configured may be symbol #1, #2, or #3 with respect to a first SSB of one slot, and may be symbol #8, #9, or #10 with respect to a second SSB of one slot. In addition, an LBT gap may not be configured in one slot. In the case of option-3, a start symbol index of a start symbol in which an RMSI-PDSCH is configured may be symbol #2 or #3 with respect to a first SSB of one slot, and may be symbol #8 or #9 with respect to a second SSB of one slot. In addition, the last symbol of one slot may be configured as an LBT gap between slots. When an RMSI-PDSCH is configured by four symbols regardless of the configuration of the RMSI-PDSCH according to options 1 to 3, the last symbol of a slot may be configured as an LBT gap. In this case, a start symbol index may be symbol #2 with respect to a first SSB of one slot and may be symbol #8 or #9 with respect to a second SSB of one slot, regardless of the length of CORESET #0.

A method for configuring a start symbol in which an RMSI-PDSCH is configured in a slot when the RMSI-PDSCH is configured by five symbols will be described.

In the case of option-1, a start symbol index of a start symbol in which an RMSI-PDSCH is configured may be symbol #1 or #2 with respect to a first SSB of one slot, and may be symbol #7 or #8 with respect to a second SSB of one slot. In addition, the last symbol of one slot may be configured as an LBT gap between slots. In the case of option-2, a start symbol index of a start symbol in which an RMSI-PDSCH is configured may be symbol #1 or #2 with respect to a first SSB of one slot, and may be symbol #8 or #9 with respect to a second SSB of one slot. In addition, an LBT gap may not be configured in one slot. In the case of option-3, a start symbol index of a start symbol in which an RMSI-PDSCH is configured may be symbol #2 with respect to a first SSB of one slot, and may be symbol #8 with respect to a second SSB of one slot. In addition, the last symbol of one slot may be configured as an LBT gap between slots. When an RMSI-PDSCH is configured by five symbols regardless of the configuration of the RMSI-PDSCH according to options 1 to 3, the last symbol of a slot may be configured as an LBT gap. In this case, a start symbol index may be symbol #2 with respect to a first SSB of one slot and may be symbol #8 with respect to a second SSB of one slot, regardless of the length of CORESET #0.

A method for configuring a start symbol in which an RMSI-PDSCH is configured in a slot when the RMSI-PDSCH is configured by six symbols will be described.

When an RMSI-PDSCH is configured by six symbols, only CORESET #0 having a length of one symbol may be supported. In options 1 to 3, a start symbol index of a start symbol in which an RMSI-PDSCH is configured may be symbol #1 with respect to a first SSB, and may be symbol #8 with respect to a second SSB. In this case, an LBT gap may not be configured.

When the LBT gap is required to be configured, the RMSI-PDSCH configured by six symbols may not be used and the RMSI-PDSCH configured by four or five symbols may be used.

In the NR-U system, the base station may transmit one or more SS/PBCH blocks having up to L SS/PBCH block indexes to the UE. In this case, "L" is a value which varies depending on a frequency band range. For example, when a frequency band is 3 GHz or less, "L" may be 4, when the frequency band is 3 GHz to 6 GHz or less, "L" may be 8, and when the frequency band is 6 GHz or greater, "L" may be 64. Depending on an outcome of LBT performed by the base station, the base station may transmit one or more SS/PBCH blocks having an SS/PBCH block index at a time point when the LBT succeeds or at a time point thereafter, rather than at a fixed time point. In this case, since the UE is unable to know information on the outcome of the LBT performed by the base station, the UE cannot determine a time point when transmission of one or more SS/PBCH blocks from the base station is actually performed. Therefore, it is necessary to define a UE behavior of performing a predefined behavior with respect to candidate SS/PBCH block resources in which SS/PBCH blocks may be transmitted. For example, the base station considers transmission of up to L SS/PBCH blocks, but the UE assumes that only one SS/PBCH block having the same SS/PBCH block index is transmitted within a specific window (e.g., a discovery burst transmission window (TBTW) or a DRS window), and thus it is necessary to define a UE behavior for determining a transmission time point.

UE Behavior

1. UE Behavior Regarding PDSCH Rate-Matching and Resource Configuration for Downlink Transmission For rate-matching of a PDSCH transmitted to the UE, the base station may inform the UE of a location of a resource in which an SS/PBCH block actually transmitted is actually transmitted, through information (parameter) included in RRC signaling. For example, the base station may inform of the location of the resource through an RRC parameter called ssb-PositionInBurst included in SIB1 or ServingCell-ConfigCommon. However, the UE having received information from a licensed carrier may determine that an SS/PBCH block has been transmitted at the location of the resource indicated by ssb-PositionInBurst. On the other hand, when a resource to which PDSCH transmission is allocated overlaps with a PRB in which an SS/PBCH block is transmitted, the UE may assume that the SS/PBCH block is transmitted on the overlapping resource, and perform rate-matching. That is, the UE may assume that a PRB of a symbol in which an SS/PBCH block is transmitted is not used for transmission of the PDSCH.

However, when transmission of an SS/PBCH block is performed in an unlicensed carrier or a shared spectrum, even when the base station informs of a location where the SS/PBCH block is transmitted, through ssb-PositionInBurst, a location of the SS/PBCH block actually transmitted by the base station may vary depending on the LBT outcome. However, since the UE is unable to know whether LBT of the base station is successful, it should be assumed that the SS/PBCH block is transmitted at a location of a candidate SS/PBCH block indicated by ssb-PositionInBurst. In this case, the location indicated by ssb-PositionInBurst may include all candidate SS/PBCH block locations in which SS/PBCH blocks may be transmitted.

Figure 36:
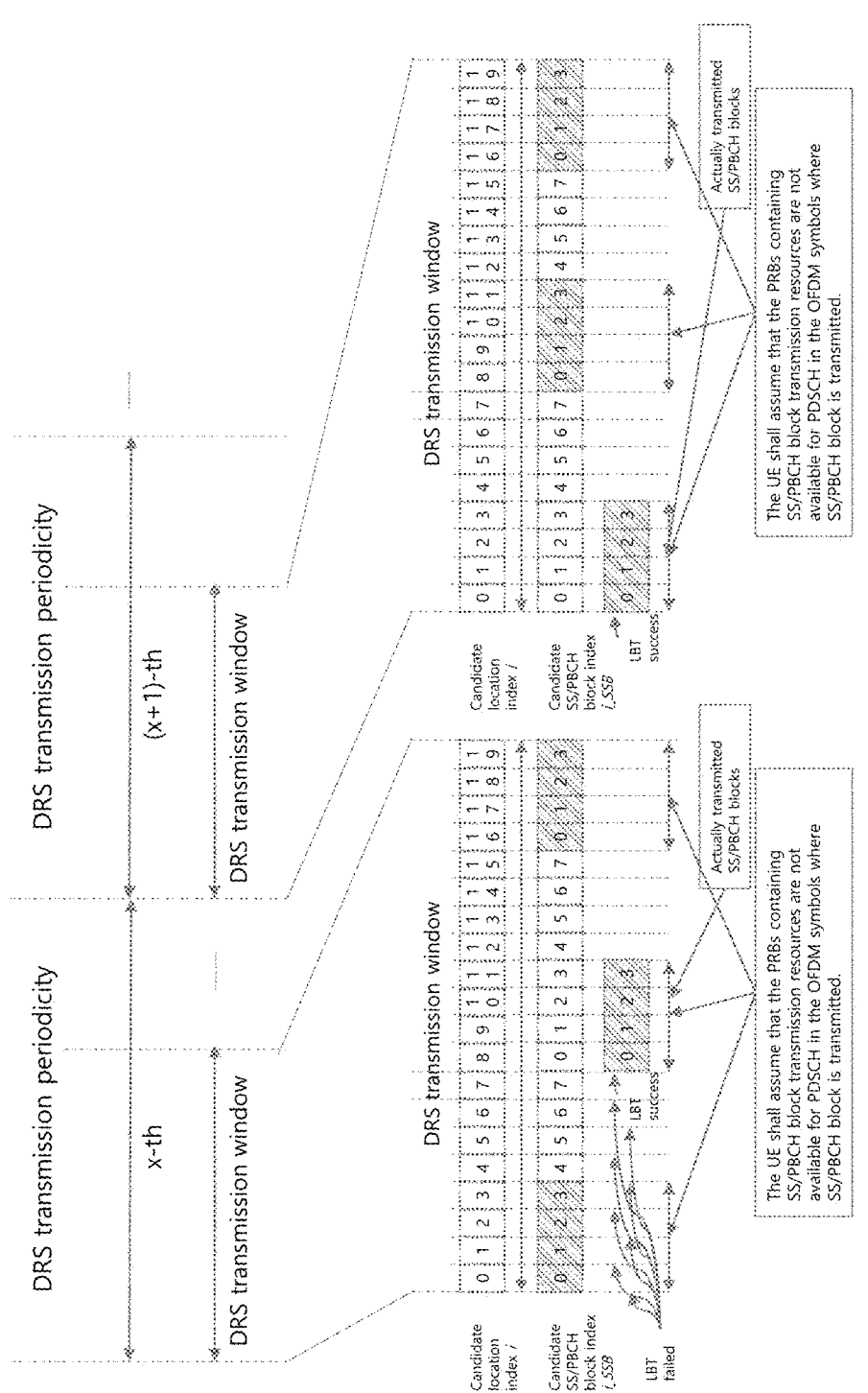
FIG. 36 shows a pattern in which SSBs are configured in a time domain considering at least one symbol (gap) according to an embodiment of the disclosure.

FIG. 36 shows a method for transmitting an SS/PBCH block having an SS/PBCH block index according to an embodiment of the disclosure.

Referring to FIG. 36, the base station may transmit SS/PBCH block indexes of 0, 1, 2, and 3 when a subcarrier spacing is 30 kHz, a discovery burst transmission window is 5 ms, and "L" is 8. The base station may inform the UE of an SS/PBCH block index (e.g., 0, 1, 2, or 3) through ssb-PositionInBurst, and the UE may perform PDSCH rate-matching in a resource in which a candidate SS/PBCH block index of a candidate SS/PBCH block corresponding to the SS/PBCH block index (e.g., 0, 1, 2, or 3) within a DBTW may be transmitted. When a resource to which PDSCH transmission is allocated overlaps with a PRB in which an SS/PBCH block (including a candidate SS/PBCH block corresponding thereto) is transmitted, the UE may assume that the SS/PBCH block is transmitted on the overlapping resource and perform rate-matching. That is, the UE may assume that a PRB of a symbol in which an SS/PBCH block is transmitted is not used for transmission of a PDSCH.

When transmission of an SS/PBCH block is performed in an unlicensed carrier or a shared spectrum, the base station may inform of a location where the SS/PBCH block is transmitted, through ssb-PositionInBurst. However, the UE may assume that transmission of more than one SS/PBCH block having the same SS/PBCH block index as an SS/PBCH block index firstly transmitted in the DBTW is not performed. In this case, when the UE detects one specific SS/PBCH block index, the UE may assume that the same SS/PBCH block index as the one specific SS/PBCH block index firstly transmitted in the DBTW is not transmitted. The UE may not perform PDSCH rate-matching with respect to a candidate SS/PBCH block index transmitted after the firstly transmitted one specific SS/PBCH block index.

For example, referring to FIG. 36, when the UE has detected index 0 of SS/PBCH block indexes transmitted by the base station in a first DBTW, the UE may not perform PDSCH rate-matching with respect to transmission of a PDSCH (candidate location index 16 in FIG. 36) having index 0 after the detected index 0 in the DBTW. As another example, when the UE has detected all indexes 0, 1, 2, and 3, the UE may not perform PDSCH rate-matching with respect to transmission (candidate location indexes 16, 17, 18, and 19 in FIG. 36) of a PDSCH having index 0 after the detected indexes 0, 1, 2, and 3 in the DBTW.

When transmission of an SS/PBCH block is performed in an unlicensed carrier or a shared spectrum, the base station may inform the UE of a location of a resource in which an SS/PBCH block transmitted by the base station is configured, through ssb-PositionInBurst, but the UE may perform PDSCH rate-matching with respect to PDSCH transmission of all candidate SS/PBCH block indexes in the DBTW. The UE may perform PDSCH rate-matching with respect to PDSCH transmission of all candidate SS/PBCH block indexes in the DBTW, based on the maximum number (L) of SS/PBCH blocks which may be transmitted by the base station.

2. Resource Configuration for an Uplink (Resource Configuration for a Random Access Preamble, a PUCCH, Repeated Transmission of a PUCCH, a PUSCH, and Repeated Transmission of a PUSCH)

An SS/PBCH block may be transmitted in a DL symbol and a flexible symbol set as well as a semi-statically configured UL symbol. Even when transmission of an SS/PBCH block or a candidate SS/PBCH block is configured for a resource semi-statically configured as DL, ambiguity does not occur since the resource configured as DL is excluded when a resource for uplink transmission is configured. However, when the flexible symbol set is included in a resource configured to transmit an SS/PBCH block or a candidate SS/PBCH block, the resource for uplink transmission may be configured differently depending on whether transmission of the SS/PBCH block actually occurs at a location of the candidate SS/PBCH block. In particular, in an unlicensed carrier or a shared spectrum, the base station may inform of a location of a resource of an SS/PBCH block transmitted from the base station, through ssb-PositionInBurst, but the location of the resource in which an SS/PBCH block is actually transmitted may vary depending on the LBT outcome.

For example, when a flexible symbol set is included in a resource in which an SS/PBCH block or a candidate SS/PBCH block is transmitted, the UE may assume that the SS/PBCH block is to be transmitted at a location of the candidate SS/PBCH block corresponding to the SS/PBCH block index indicated through ssb-PositionInBurst. This may be independent of whether the base station actually transmits the SS/PBCH block at the location of the candidate SS/PBCH block. When an SS/PBCH block is not transmitted in a location of a candidate SS/PBCH block indicated to the UE, the flexible symbol set may be configured as a resource for an uplink (a resource for a random access preamble, a PUCCH, repeated transmission of a PUCCH, a PUSCH, and repeated transmission of a PUSCH). The flexible symbol set may not be configured as a resource for an uplink and may be excluded when configuring the resource for an uplink. Referring to FIG. 36, when a flexible symbol set is included in a resource in which an SS/PBCH block or a candidate SS/PBCH block is transmitted, the UE may exclude resources of candidate SS/PBCH block indexes corresponding to SS/PBCH block indexes 0, 1, 2, and 3 indicated through ssb-PositionInBurst when configuring a resource for uplink transmission. When a candidate SS/PBCH block to which an SS/PBCH block may be transmitted and a resource for which uplink transmission (scheduled through a higher layer) is configured partially or entirely overlap, the UE may drop uplink transmission or may not perform uplink transmission.

In a case where a flexible symbol set is included in a resource in which an SS/PBCH block or a candidate SS/PBCH block is transmitted, when transmission of the SS/PBCH block is performed in an unlicensed carrier or a shared spectrum, the base station may inform of a location where the SS/PBCH block is transmitted, through ssb-PositionInBurst. However, the UE may assume that transmission of more than one SS/PBCH block having the same SS/PBCH block index as an SS/PBCH block index firstly transmitted in a DBTW is not performed. In this case, when the UE detects one specific SS/PBCH block index, the UE may assume that the same SS/PBCH block index as the one specific SS/PBCH block index firstly transmitted in the DBTW is not transmitted. The UE may use, for configuration for uplink transmission, a resource for which a candidate SS/PBCH block index included in the flexible symbol set after the firstly transmitted one specific SS/PBCH block index is configured. For example, referring to FIG. 36, when the UE has detected index 0 of SS/PBCH block indexes transmitted by the base station in the first DBTW, the UE may perform uplink transmission configured by a higher layer or scheduled uplink transmission on candidate location index 16 having index 0 after the detected index 0. As another example, when the UE has detected all indexes 0, 1, 2, and 3, the UE may perform uplink transmission configured by a higher layer or scheduled uplink transmission on candidate location indexes 16, 17, 18, and 19 having indexes 0, 1, 2, and 3 after the detected indexes 0, 1, 2, and 3.

As another example, when a flexible symbol set is included in a location of an SS/PBCH block or a candidate SS/PBCH block, the UE may exclude a resource for which all candidate SS/PBCH block indexes in a DBTW are configured when configuring a resource for uplink transmission. The UE may drop or may not perform uplink transmission.

Resource Configuration for a Random Access Preamble a. In order to transmit an SS/PBCH block in an unlicensed carrier or a shared spectrum, the base station may configure a PRACH occasion of a PRACH slot for transmitting a random access preamble. The UE may assume that an SS/PBCH block is transmitted at a location of a candidate SS/PBCH block corresponding to an index of an SS/PBCH block transmitted from the base station through ssb-PositionInBurst, and determine whether the PRACH occasion is valid. This may be independent of whether the base station has actually transmitted the SS/PBCH block at the location of the candidate SS/PBCH block. b. When transmission of an SS/PBCH block is performed in an unlicensed carrier or a shared spectrum, the base station may inform of a location where the SS/PBCH block is transmitted, through ssb-PositionInBurst. However, the UE may assume that transmission of more than one SS/PBCH block having the same SS/PBCH block index as an SS/PBCH block index firstly transmitted in a DBTW is not performed. In this case, when the UE detects one specific SS/PBCH block index, the UE may assume that the same SS/PBCH block index as the one specific SS/PBCH block index firstly transmitted in the DBTW is not transmitted. The UE may determine the validity of a PRACH occasion without assuming that the SS/PBCH block is transmitted for an index of a candidate SS/PBCH block corresponding to the one specific SS/PBCH block index in a resource after the detection of the one specific SS/PBCH block index. A location of the candidate SS/PBCH block corresponding to the SS/PBCH block index may be used only until the UE detects the SS/PBCH block at the location of the candidate SS/PBCH block. After the detection, the UE may determine the validity of the PRACH occasion without making an assumption for the SS/PBCH block at a location of the index of the candidate SS/PBCH block. For example, when tdd-UL-DL-ConfigurationCommon is not provided to the UE, the UE may determine that the PRACH occasion is valid when the PRACH occasion starts at a location which is not prior to the location of the candidate SS/PBCH block corresponding to the index of the SS/PBCH block transmitted by the base station through ssb-PositionInBurst, and is separated by at least N_gap symbol after the last symbol of the index of the candidate SS/PBCH block. When tdd-UL-DL-ConfigurationCommon is provided to the UE, the UE may determine that the PRACH occasion is valid when the PRACH occasion starts at a location which is not prior to the location of the candidate SS/PBCH block and is separated by at least N_gap symbol after the last DL symbol, and starts at a location which is separated by at least N_gap symbol after the last symbol in which the index of the candidate SS/PBCH block is received. The length of an N_gap symbol is configured to be 0 in preamble format B4, and may be determined based on a subcarrier spacing used by a random access preamble in other cases. For example, when the subcarrier spacing used by the random access preamble is 1.25 kHz or 5 kHz, the length of the N_gap symbol may be 0, and when the subcarrier spacing is 15 kHz, 30 kHz, 60 kHz, or 120 kHz, the length of the N_gap symbol may be 2.

In addition, the UE may determine the validity of the PRACH occasion by assuming that SS/PBCH blocks are transmitted at locations of all candidate SS/PBCH blocks in the DBTW.

Resource Configuration for Repeated Transmission of a PUCCH

When transmission of an SS/PBCH block is performed in an unlicensed carrier or a shared spectrum, the number of repeated transmission slots (N^repeat_PUCCH slots) for repeated PUCCH transmission performed by the UE is required to be configured. The UE may assume that an SS/PBCH block is transmitted at a location of a candidate SS/PBCH block regardless of whether the SS/PBCH block has been actually transmitted at a location of a candidate SS/PBCH block corresponding to an index of an SS/PBCH block transmitted by the base station through ssb-PositionInBurst. In this case, the number of repeated transmission slots (N^repeat_PUCCH slots) may be configured in consideration of a UL symbol and a flexible symbol other than a symbol for which the location of the candidate SS/PBCH block is configured.

When transmission of an SS/PBCH block is performed in an unlicensed carrier or a shared spectrum, the base station may inform of a location where the SS/PBCH block is transmitted, through ssb-PositionInBurst. However, the UE may assume that transmission of more than one SS/PBCH block having the same SS/PBCH block index as an SS/PBCH block index firstly transmitted in a DBTW is not performed. In this case, when the UE detects one specific SS/PBCH block index, the UE may assume that the same SS/PBCH block index as the one specific SS/PBCH block index firstly transmitted in the DBTW is not transmitted. The UE may not assume that the SS/PBCH block is transmitted for an index of a candidate SS/PBCH block corresponding to the one specific SS/PBCH block index in a resource after the detection of the one specific SS/PBCH block index. Before the detection, the number of repeated transmission slots (N^repeat_PUCCH slots) for repeated PUCCH transmission may be configured in consideration of a UL symbol and a flexible symbol other than a symbol including a location of the candidate SS/PBCH block index. After the detection, the number of repeated transmission slots (N^repeat_PUCCH slots) may be configured in consideration of a UL symbol and a flexible symbol regardless of the location of the candidate SS/PBCH block.

The UE may determine the number of repeated transmission slots (N^repeat_PUCCH slots) by assuming that SS/PBCH blocks are transmitted at locations of all candidate SS/PBCH blocks in the DBTW.

Resource Configuration for Repeated Transmission of a PUSCH

When transmission of an SS/PBCH block is performed in an unlicensed carrier or a shared spectrum, a resource for repeated PUSCH transmission performed by the UE is required to be configured. The UE may assume that an SS/PBCH block is transmitted at a location of a candidate SS/PBCH block regardless of whether the SS/PBCH block has been actually transmitted at a location of a candidate SS/PBCH block corresponding to an index of an SS/PBCH block transmitted by the base station through ssb-PositionInBurst. In this case, the resource for repeated PUSCH transmission may be configured in consideration of a UL symbol and a flexible symbol other than a symbol for which the location of the candidate SS/PBCH block is configured.

When transmission of an SS/PBCH block is performed in an unlicensed carrier or a shared spectrum, the base station may inform of a location where the SS/PBCH block is transmitted, through ssb-PositionInBurst. However, the UE may assume that transmission of more than one SS/PBCH block having the same SS/PBCH block index as an SS/PBCH block index firstly transmitted in a DBTW is not performed. In this case, when the UE detects one specific SS/PBCH block index, the UE may assume that the same SS/PBCH block index as the one specific SS/PBCH block index firstly transmitted in the DBTW is not transmitted. The UE may not assume that the SS/PBCH block is transmitted for an index of a candidate SS/PBCH block corresponding to the one specific SS/PBCH block index in a resource after the detection of the one specific SS/PBCH block index. Before the detection, a resource for repeated PUSCH transmission may be configured in consideration of a UL symbol and a flexible symbol other than a symbol including a location of the candidate SS/PBCH block index. After the detection, the resource for repeated PUSCH transmission may be configured in consideration of a UL symbol and a flexible symbol regardless of the location of the candidate SS/PBCH block.

The UE may configure the resource for repeated PUSCH transmission by assuming that SS/PBCH blocks are transmitted at locations of all candidate SS/PBCH blocks in the DBTW.

An SSB (SS/PBCH Block) for a Frequency Band Exceeding 52.6 GHz

In the NR system, one subcarrier spacing may be defined for each frequency band to transmit an SSB. Accordingly, complexity of detecting an SSB by the UE for initial cell access can be reduced. A subcarrier spacing of 15 kHz or 30 kHz may be used for the SSB in a frequency band of 6 GHz or less, and a subcarrier spacing of 120 kHz or 240 kHz may be used for the SSB in a frequency band of 6 GHz or greater. For a frequency band of 52.6 GHz or greater, a subcarrier spacing of 480 kHz, 960 kHz, or 1920 kHz, which is greater than the subcarrier spacing used in the existing NR system, may be additionally used. Hereinafter, a method for configuring an SSB for an NR system in a frequency band of 52.6 GHz or greater will be described in this specification. When the subcarrier spacing increases by an exponential power of 2, a symbol length in a time domain may decrease by an exponential power of 2, and accordingly, a length of a CP may also be reduced. However, in order to use different beamformings, beam link connection is required, and beam sweeping is required for the connection. That is, beam switching may be performed through beam sweeping, and beam switching times for different beam transmissions may be required to perform beam sweeping. When transmitting an SSB for performing initial access, the base station may map different beam indexes to different SSB indexes and transmit SSBs having different SSB indexes to the UE through beam sweeping. In this case, for the existing frequency band of 6 GHz or greater, a beam switching time during beam sweeping is required to be guaranteed up to 100 ns. In this case, since 100 ns is a time smaller than the length of the CP, the base station has been able to guarantee the time. However, since a subcarrier spacing of 480 kHz, 960 kHz, or 1920 kHz, which is greater than the existing subcarrier spacing, may be used in the NR for a frequency band of 52.6 GHz or greater, a case where the length of the CP is smaller than 100 ns may occur. Specifically, when a subcarrier spacing of 960 kHz is used, the length of the CP may be smaller than 100 ns. Therefore, when the length of the CP is smaller than 100 ns, there is a problem in that the base station cannot perform beam sweeping.

Table 4 shows a length of a CP for each subcarrier spacing (for each numerology (u)).

TABLE 4

| u | SCS[kHz] | CP type | CP length [ns] |
|---|----------|---------|----------------|
| 0 | 15 | Normal | 4687.5 |
| 1 | 30 | Normal | 2343.75 |
| 2 | 60 | Normal | 1171.88 |
| 3 | 120 | Normal | 585.94 |
| 4 | 240 | Normal | 292.97 |
| 5 | 480 | Normal | 146.48 |
| 6 | 960 | Normal | 73.24 |

At least one symbol (gap) may be configured between SSBs having different SSB indexes for beam switching for transmission of SSBs having different SSB indexes.

Figure 37:
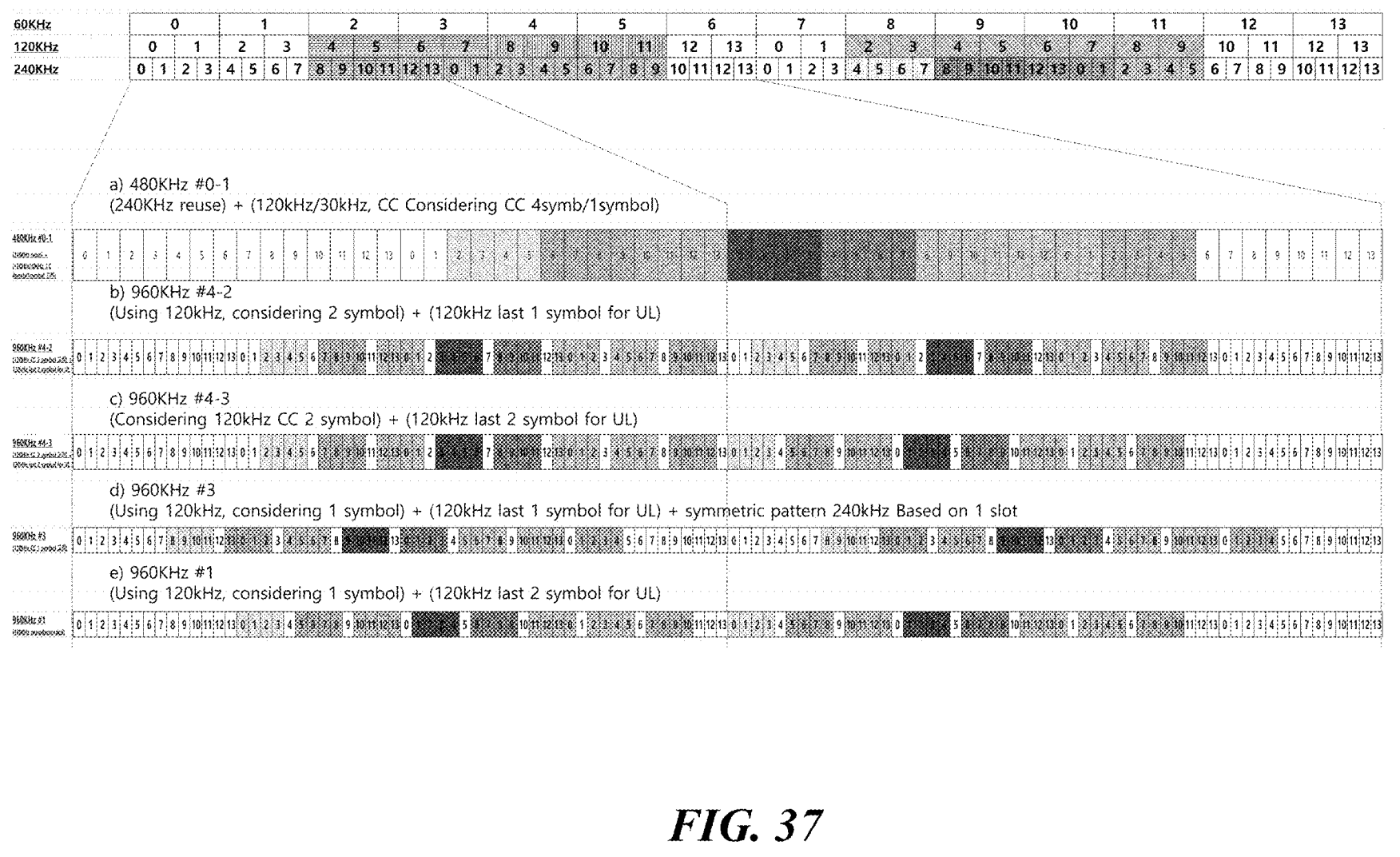

FIG. 37 shows a pattern in which SSBs are configured in a time domain considering at least one symbol (gap) according to an embodiment of the disclosure. Specifically, FIG. 37 shows a pattern in which SSBs are configured in a time domain when subcarrier spacings of 480 kHz and 960 kHz is used.

Referring to FIG. 37, i) when a beam switching time is not guaranteed within a CP length, at least one symbol (gap) may be configured between SSBs having different SSB indexes. ii) When different subcarrier spacings are supported between different signals and channels in one band, multiplexing between signals or channel(s) using a subcarrier spacing of 120 kHz or 240 kHz may be performed. To this end, when configuring SSBs transmitted using subcarrier spacings of 480 kHz and 960 kHz so as to be used by signals transmitted using a subcarrier spacing of 120 kHz or 240 kHz, at least one or two symbols may be emptied. In this case, the symbol to be emptied may be configured with reference to a subcarrier spacing of 120 kHz or 240 kHz. Accordingly, an SSB transmitted using a subcarrier spacing of 480 kHz or 960 kHz and signals or channels transmitted using a subcarrier spacing of 120 kHz or 240 kHz may be TDM-multiplexed. iii) When different subcarrier spacings are used between different signals or channels of a downlink and an uplink within one slot of one frequency band, at least one symbol from the last may be emptied when configuring SSBs using a subcarrier spacing of 480 kHz or 960 kHz for signals using a subcarrier spacing of 120 kHz or 240 kHz. In this case, the symbol to be emptied may be configured with reference to a subcarrier spacing of 120 kHz or 240 kHz. Accordingly, an SSB transmitted using a subcarrier spacing of 480 kHz or 960 kHz and signals or channels transmitted using a subcarrier spacing of 120 kHz or 240 kHz may be TDM-multiplexed. In addition, when an uplink channel and a downlink channel are transmitted in one slot, an uplink control channel may be transmitted to one or more last symbols in one slot.

FIG. 37 shows locations where SSBs configured by four symbols in slots of subcarrier spacings of 480 kHz and 960 kHz are mapped with reference to one slot of a subcarrier spacing of 120 kHz, and with reference to two slots of a subcarrier spacing of 240 kHz. For example, when the maximum number of SSBs which can be configured by the base station is 64, SSBs may be mapped in a consecutive time domain with reference to one slot in a subcarrier spacing of 120 kHz and with reference to two slots in a subcarrier spacing of 240 kHz.

Hereinafter, a method for configuring a discovery burst (DB) including an SSB in a frequency band of 52.6 GHz or greater and a method for configuring a discovery burst transmission window (DBTW) will be described. In addition, hereinafter, a method for configuring time synchronization by using an SSB within a DBTW or between multiple DBTWs and a method for configuring a QCL of candidate SSB indexes will be described. In the NR system, one subcarrier spacing is defined for each band to transmit an SSB, and thus complexity of detecting an SSB by the UE for initial cell access can be reduced.

FIGS. 38 to 42 show a method for configuring an SSB for each of multiple subcarrier spacings.

In order to perform a beam operation between the base station and the UE in an unlicensed carrier or a shared spectrum, beam links using different beams may be established using SSB indexes transmitted in different time domains, and a beam management may be performed. When the base station fails to perform SSB transmission due to channel access failure through LBT, there is a problem in that latency increases to establish a beam link between the base station and the UE through beam sweeping. Therefore, a method in which the base station configures a DB including an SSB to increase an opportunity of channel access, and configures transmission opportunities of the SSB included in the DB within a DBTW as many as possible, so that the UE efficiently configures time and frequency synchronization is necessary. Hereinafter, in this specification, a method for configuring an SSB in a time domain in a DB and a DBTW according to LBT failure of the base station, a method for configuring a candidate SSB location, and a method for configuring a QCL relationship with a candidate SSB index will be described. A signal and a channel included in a DB including an SSB may include at least one of CORESET #0, a Type0-PDCCH (for RMSI), an RMSI-PDSCH, a Type0A-PDCCCH (for OSI), a Paging channel, and a CSI-RS.

When a subcarrier spacing of 120 kHz is used, the duration of a DBTW may not be greater than 5 ms. A PBCH payload size included in the SSB may not be larger than a payload size used in a frequency band exceeding 6 GHz in the existing NR system. The number of sequences of a PBCH DMRS may be the same as the number of sequences used in the frequency band exceeding 6 GHz in the existing NR system.

1) A location of an SSB in a slot and an SSB location in a half frame may be configured in the same manner as the configuration used in the frequency band exceeding 6 GHz in the existing NR system. In addition, within a DBTW, additional candidate SSB locations according to LBT failure may be configured.

Figure 38A:
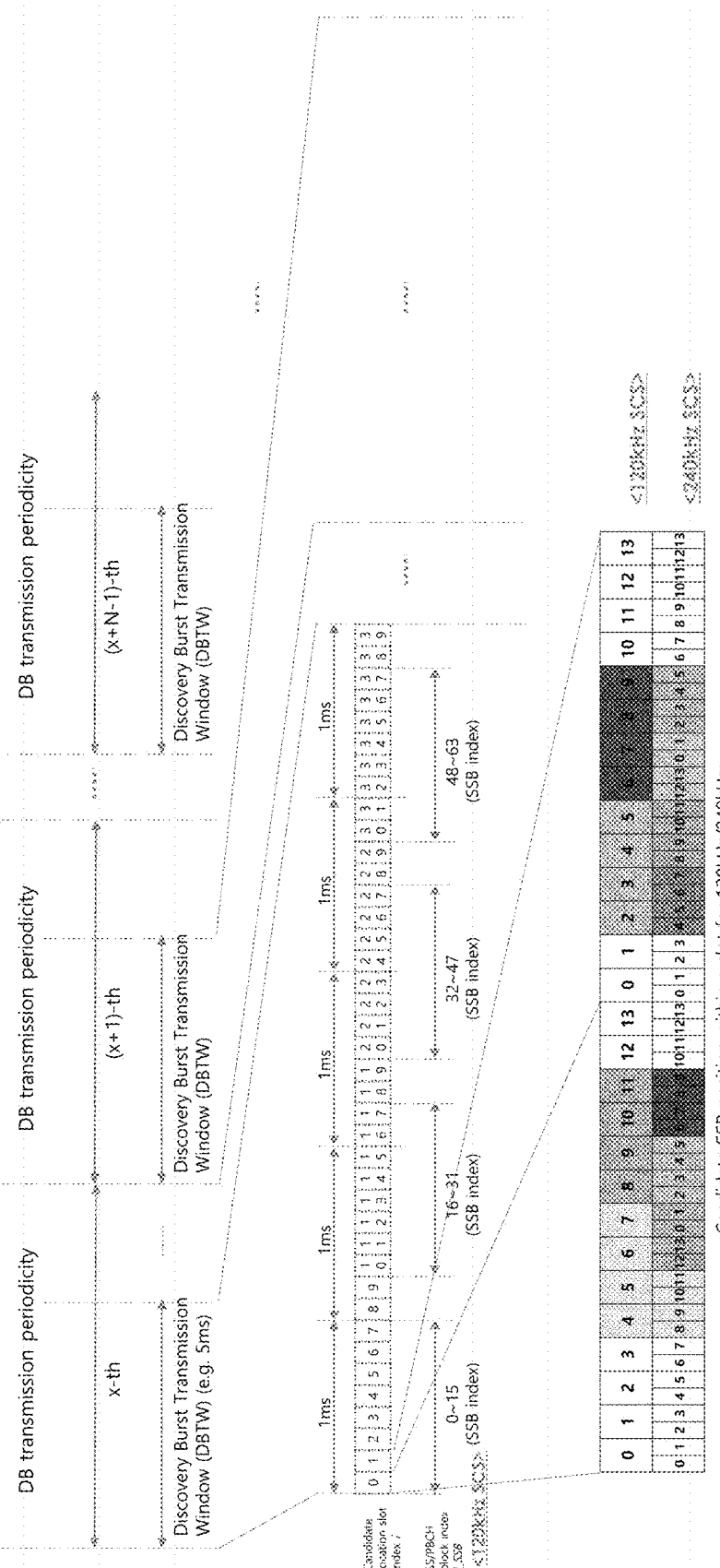
Figure 38B:
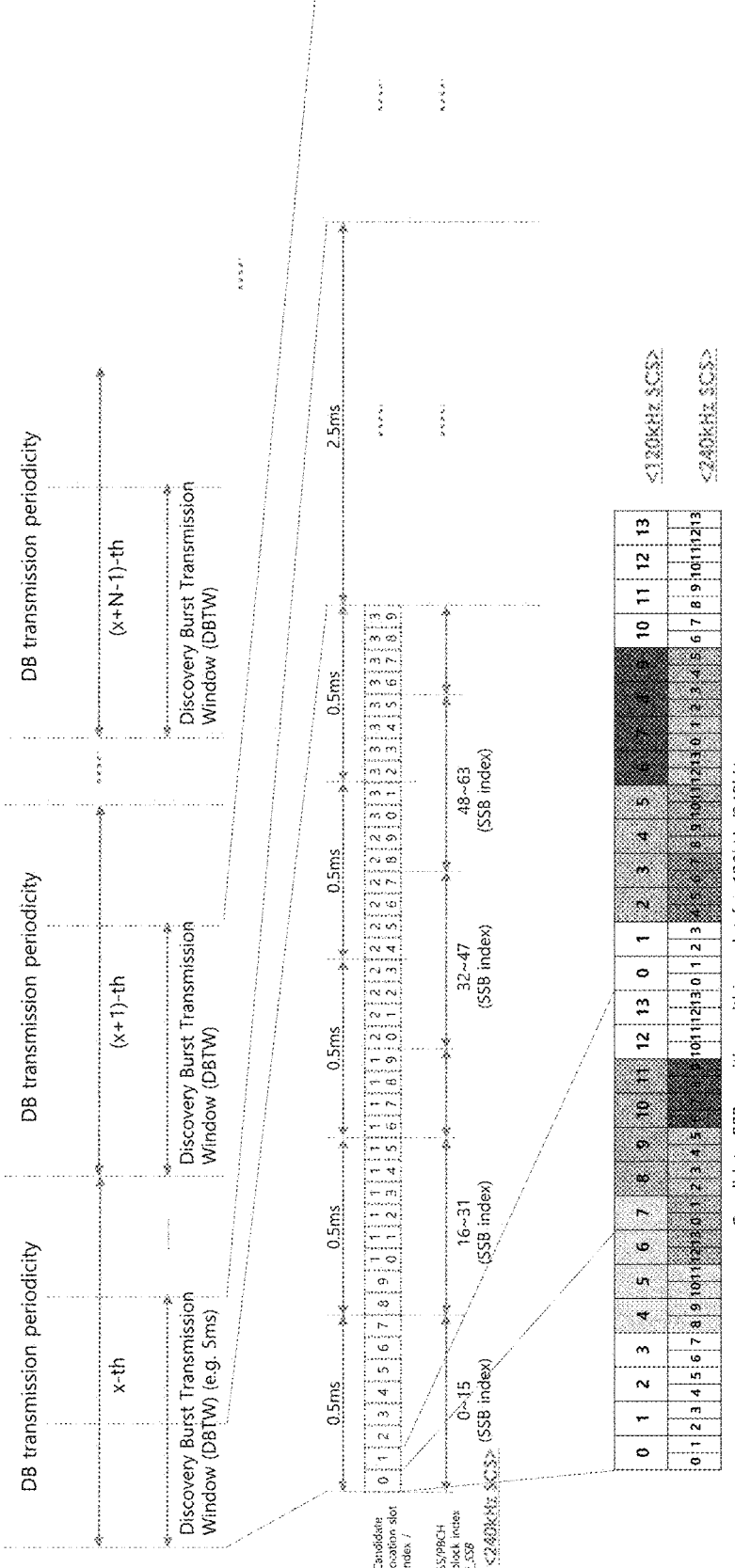

When a subcarrier spacing of 120 kHz or 240 kHz is supported in a frequency band of 52.6 GHz or greater, SSB configuration (SSBs in a slot, mapping locations of SSBs in a half frame, etc.) may be the same as SSB configurations configured when a subcarrier spacing of 120 KHz and a subcarrier spacing of 240 KHz are used in a frequency band exceeding 6 GHz in the existing NR system for each subcarrier spacing. FIG. 38(*a*) shows that an SSB at a subcarrier spacing of 120 kHz is configured, and FIG. 38(*b*) shows that an SSB at a subcarrier spacing of 240 kHz is configured.

Figure 39A:
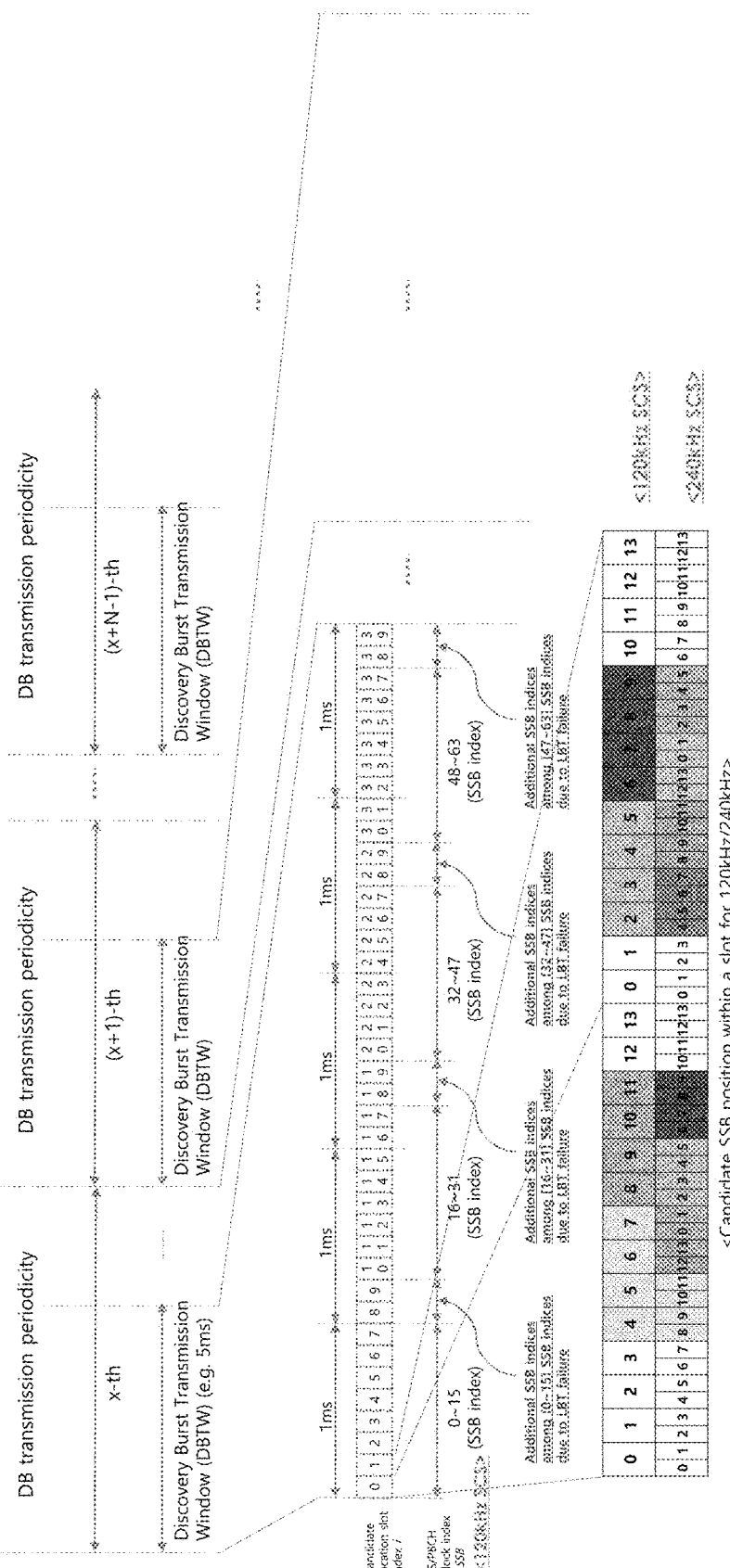
Figure 39B:
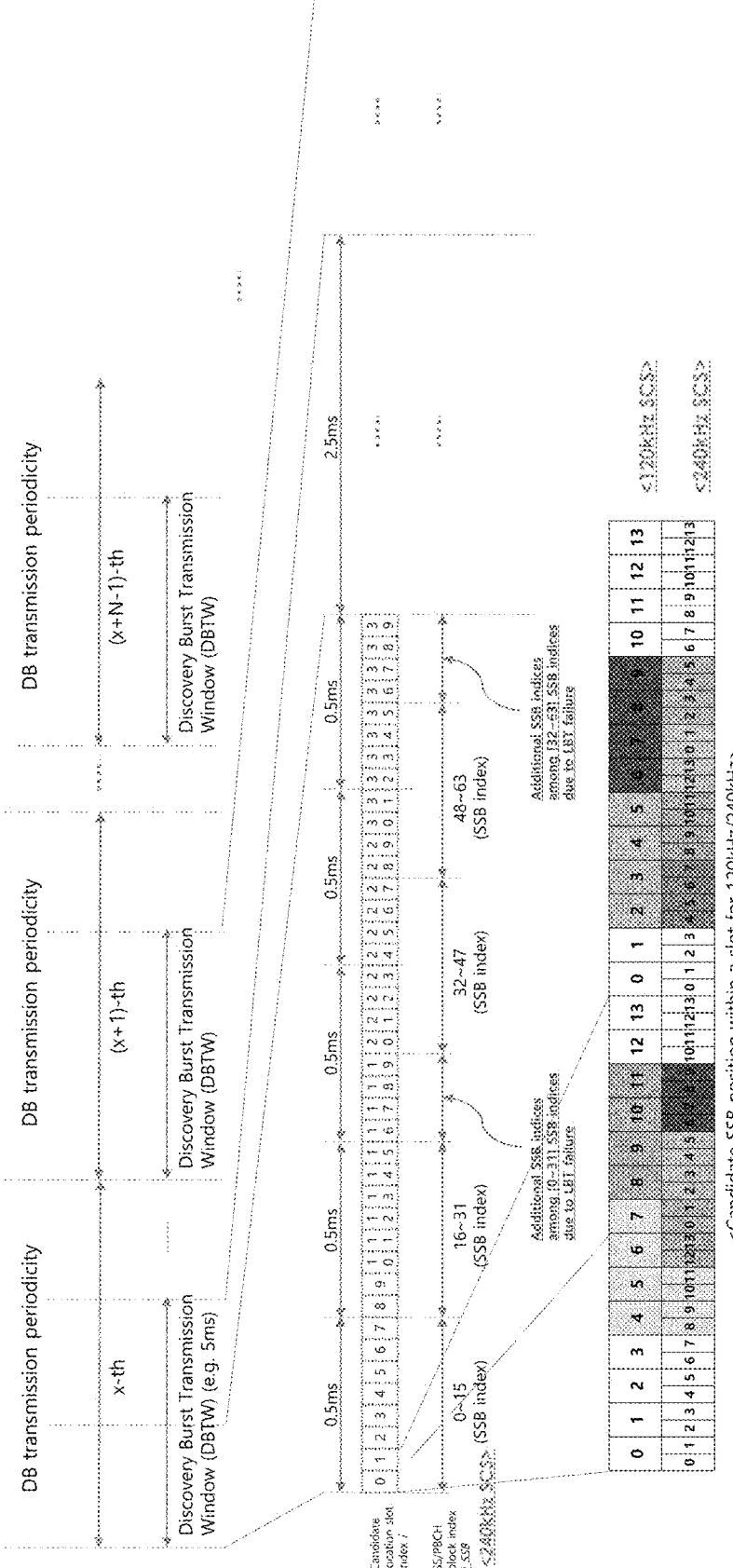

Additional candidate SSB locations within the DBTW may be configured to transmit an SSB which is failed to be transmitted within the DBTW due to failure of channel access by the base station in a shared band or an unlicensed band. When the UE receives an SSB that the base station failed to transmit at a candidate SSB location, the UE may configure time synchronization with reference to the candidate SSB location. FIG. 39(*a*) shows an additional candidate SSB location in a subcarrier spacing of 120 kHz, and FIG. 39(*b*) shows an additional candidate SSB location in a subcarrier spacing of 240 kHz.

Additional candidate SSB locations may not be configured in a licensed band. Therefore, when frequency bands in the licensed band and the unlicensed band overlap, a method for configuring an SSB when LBT exemption is possible even for the frequency bands in the unlicensed band is necessary. Even when LBT exemption is possible, a method in which the above-described SSB configuration used in a frequency band exceeding 6 GHz in the existing NR system is equally applied to SSB configuration in a frequency band of 52.6 GHz or greater may be used.

FIG. 39(*a*) shows a method for configuring an additional candidate SSB location in a subcarrier spacing of 120 kHz, and FIG. 39(*b*) shows a method for configuring an additional candidate SSB location in a subcarrier spacing of 240 kHz. Additional candidate SSBs may be mapped to consecutive slots excluding slots used for SSB transmission in a frequency band exceeding 6 GHz in the existing NR system.

An SSB index which is failed to be transmitted due to LBT failure in consecutive slots may be transmitted.

Referring to FIG. 39(*a*), when candidate location slot index i in a DBTW is 0 to 7, two SSB indexes may be transmitted per slot. Accordingly, up to 16 SSB indexes may be transmitted. The base station may transmit SSB indexes (up to 16 SSB indexes) having indexes of 0 to 15 at a location where the candidate location slot index i is 8 or 9. The UE may perform SSB detection by assuming that four specific SSB indexes may be transmitted from the base station at a location where the candidate location slot index i is 8 or 9. The four specific SSB indexes may be four indexes among SSB indexes transmittable at locations where the candidate location slot index i is 0 to 7. Similarly, the UE may perform SSB detection by assuming that four specific SSB indexes among SSB indexes transmittable at locations where the candidate location slot index i is 10 to 17 are transmitted at a location where the candidate location slot index i is 18 or 19. Similarly, the UE may perform SSB detection by assuming that four specific SSB indexes among SSB indexes transmittable at locations where the candidate location slot index i is 20 to 27 are transmitted at a location where the candidate location slot index i is 28 or 29. Similarly, the UE may perform SSB detection by assuming that four specific SSB indexes among SSB indexes transmittable at locations where the candidate location slot index i is 30 to 37 are transmitted at a location where the candidate location slot index i is 38 or 39.

Hereinafter, a method for configuring four specific SSB indexes without ambiguity between a base station and a UE will be described.

i) Referring to FIG. 39 (*a*), since LBT is performed before a time point at which the base station intends to transmit, LBT failure is more likely to occur at a starting part of a DB. Accordingly, the four specific SSB indexes may be four indexes from start time points of blocks of candidate location slot indexes. For example, block 0 of the candidate location slot indexes may be a set of slots in which the candidate location slot index i is 0 to 7, block 1 of the candidate location slot indexes may be a set of slots in which the candidate location slot index i is 10 to 17, block 2 of the candidate location slot indexes may be a set of slots in which the candidate location slot index i is 20 to 27, and block 3 of the candidate location slot indexes may be a set of slots in which the candidate location slot index i is 30 to 37. In this case, four specific SSB indexes at a start time point of each block may be transmitted for each block. For example, the base station may transmit four SSB indexes, configured such that the candidate location slot index i of block 0 is transmitted in slots 0 and 1, in slots in which the candidate location slot index i is 8 and 9. The base station may transmit four SSB indexes, configured such that the candidate location slot index i of block 1 is transmitted in slots 10 and 11, in slots in which the candidate location slot index i is 18 and 19. The base station may transmit four SSB indexes, configured such that the candidate location slot index i of block 0 is transmitted in slots 20 and 21, in slots in which the candidate location slot index i is 28 and 29. The base station may transmit four SSB indexes, configured such that the candidate location slot index i of block 0 is transmitted in slots 30 and 31, in slots in which the candidate location slot index i is 38 and 39. The UE may perform SSB detection by assuming that SSBs are to be transmitted in slots in which the candidate location slot index i is 18, 19, 28, 29, 38, and 39.

ii) When a symbol (gap) exists between different SSBs, LBT may fail due to interference of the same or different RAT, and the base station may not be able to transmit an SSB. Accordingly, a first SSB index after a symbol (gap) between different SSBs may be configured as an additional candidate SSB index. Referring to FIG. 39(*a*), a first SSB index of each of slots in which the candidate location slot index i is 0 to 3, that is, four SSB indexes may be additional candidate SSB indexes. The UE may start SSB detection by assuming that four SSB indexes are transmitted at a location where the candidate location slot index i is 8 or 9. The same method may be applied for slots in which the candidate location slot index i is 10 to 17, slots in which the candidate location slot index i is 20 to 27, and slots in which the candidate location slot index i is 30 to 37.

iii) Downlink transmission performed by the base station in an unlicensed band may be assumed to be burst transmission. Due to interference in the same or different RAT, the base station may fail to transmit an SSB due to LBT failure. When multiple slots or consecutive SSBs are used as one unit, a first SSB index after a symbol (gap) between consecutive SSBs may be configured as an additional candidate SSB index. Referring to FIG. 39(*a*), a first SSB index of each of slots in which the candidate location slot index i is 0, 2, 4, and 6, that is, four SSB indexes may be additional candidate SSB indexes. The UE may start SSB detection by assuming that four SSB indexes are transmitted at a location where the candidate location slot index i is 8 or 9. The same method may be applied for slots in which the candidate location slot index i is 10 to 17, slots in which the candidate location slot index i is 20 to 27, and slots in which the candidate location slot index i is 30 to 37.

When multiple candidate SSB locations (locations of resources to which candidate SSB indexes are mapped) are configured in a half frame, and when the UE detects one SSB index at a specific candidate SSB location among the multiple candidate SSB locations, the UE is required to identify a location where one detected SSB index has been detected in a time domain, in order to perform time synchronization with the base station. The base station may indicate a location where one SSB index is transmitted by using explicit or implicit information which is not used in a frequency band of 52.6 GHz among MIB contents described later. Accordingly, the location may be indicated without changing a conventionally used PBCH payload size. Referring to FIG. 39 (*a*), when a subcarrier spacing of 120 kHz is used, the duration of the DBTW may be 5 ms, and in this case, a bit size for indicating a location where one SSB index is transmitted may be one bit.

a. The base station may indicate a location (e.g., a symbol) in time where an SSB having one SSB index is transmitted through numerology used to transmit RMSI of an MIB, that is, one bit of a parameter for indicating a subcarrier spacing. That is, through parameter subCarrierSpacingCommon indicating the numerology, the UE may identify a location of the received SSB index in time. That is, the base station may inform, through subCarrierSpacingCommon, the UE of whether a location where an SSB having one SSB index has been transmitted is a candidate SSB location corresponding to a preconfigured SSB index or a location corresponding to an additional candidate SSB index. Through this, the UE may perform accurate time synchronization with the base station. In this case, a subcarrier spacing used for RMSI and a subcarrier spacing used for SSB transmission may be the same.

b. The base station may indicate a location (e.g., a symbol) in time where an SSB having one SSB index is transmitted through one bit of a parameter indicating an offset in a frequency domain included in an MIB. In this case, the offset may refer to an offset between an SSB and an overall resource block. In other words, the offset may refer to an offset between resource blocks available in a cell in which the UE and the SSB are included. That is, through parameter ssb-subcarrierOffset indicating the offset, the UE may identify a location of the received SSB index in time. That is, the base station may inform, through ssb-subcarrierOffset, the UE of whether a location where an SSB having one SSB index has been transmitted is a candidate SSB location corresponding to a preconfigured SSB index or a location corresponding to an additional candidate SSB index. Through this, the UE may perform accurate time synchronization with the base station.

c. The base station may indicate a location (e.g., a symbol) in time where an SSB having one SSB index is transmitted through one bit of a spare bit of an MIB. The base station may inform, through a spare bit, the UE of whether a location where an SSB having one SSB index has been transmitted is a candidate SSB location corresponding to a preconfigured SSB index or a location corresponding to an additional candidate SSB index. Through this, the UE may perform accurate time synchronization with the base station.

d. When a subcarrier spacing of 240 kHz is used and thus the number of candidate SSB locations are greater than two, the base station may indicate a location where one SSB index is transmitted through multiple bits by combining the methods a to c described above. Through this, the UE may perform accurate time synchronization with the base station.

2) A location of an SSB in a slot may be configured in the same manner as the configuration used in a frequency band exceeding 6 GHz in the existing NR system, and an SSB location in a half frame may be configured differently from the configuration used in a frequency band exceeding 6 GHz in the existing NR system. In addition, within a DBTW, additional candidate SSB locations according to LBT failure may be configured.

Figure 40:
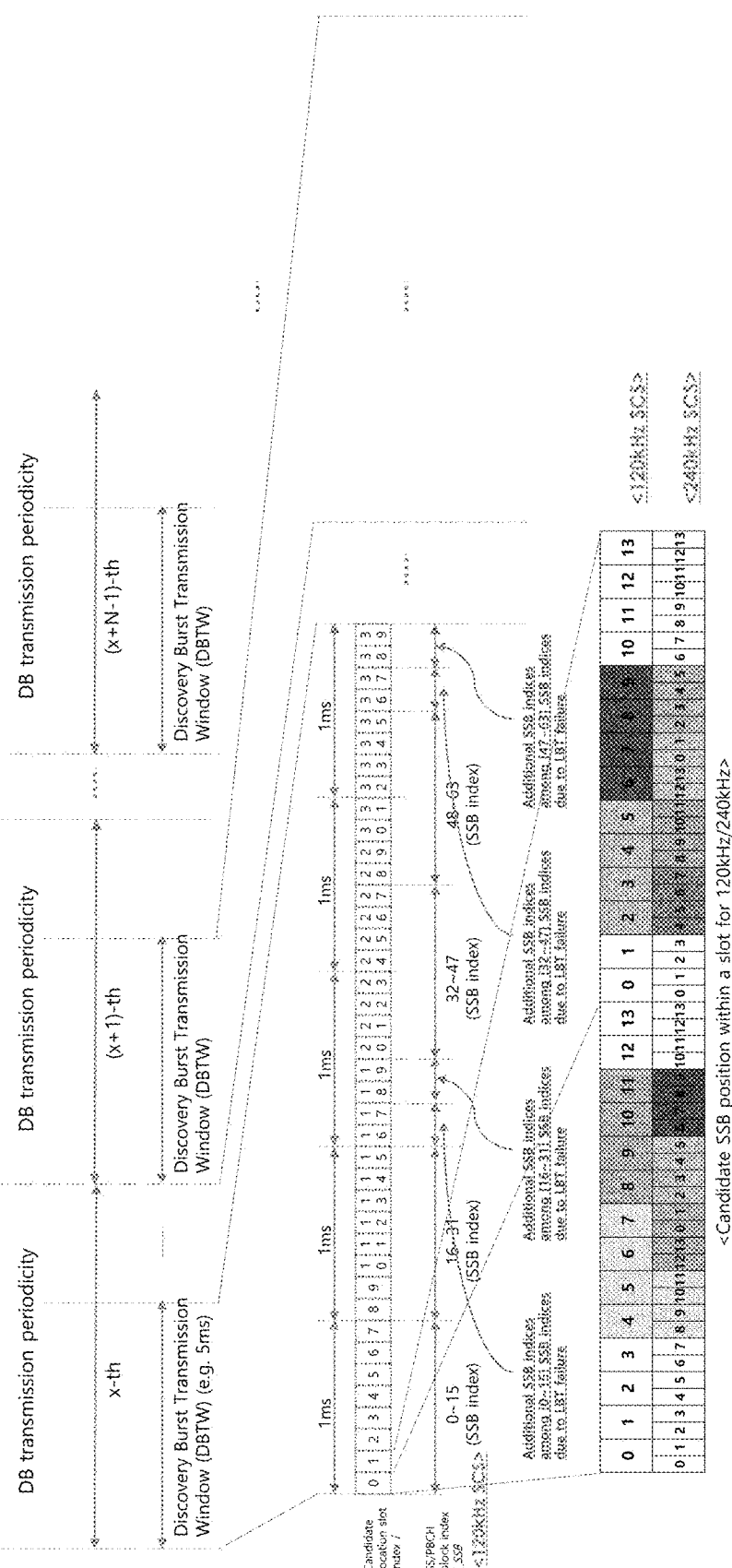
Figure 41:
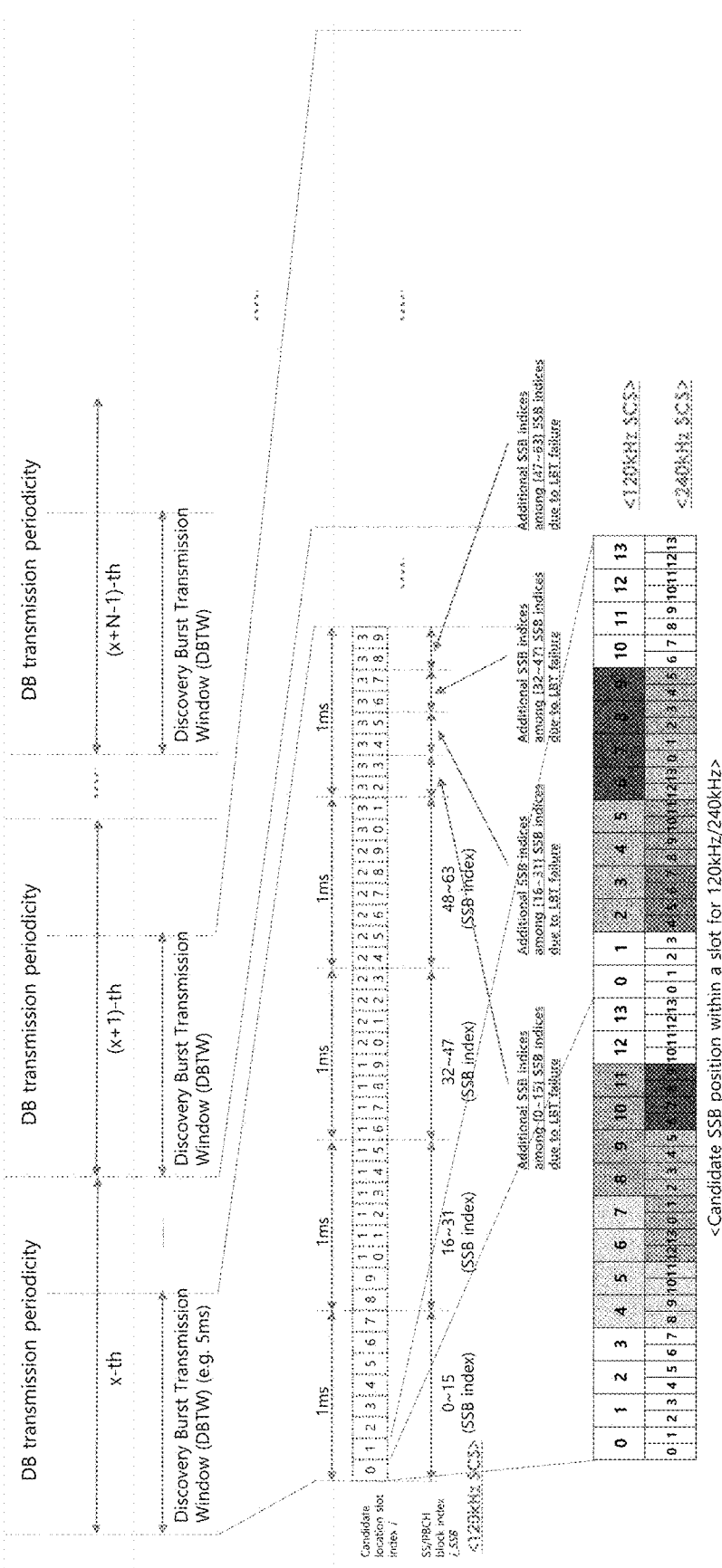
Figure 42:
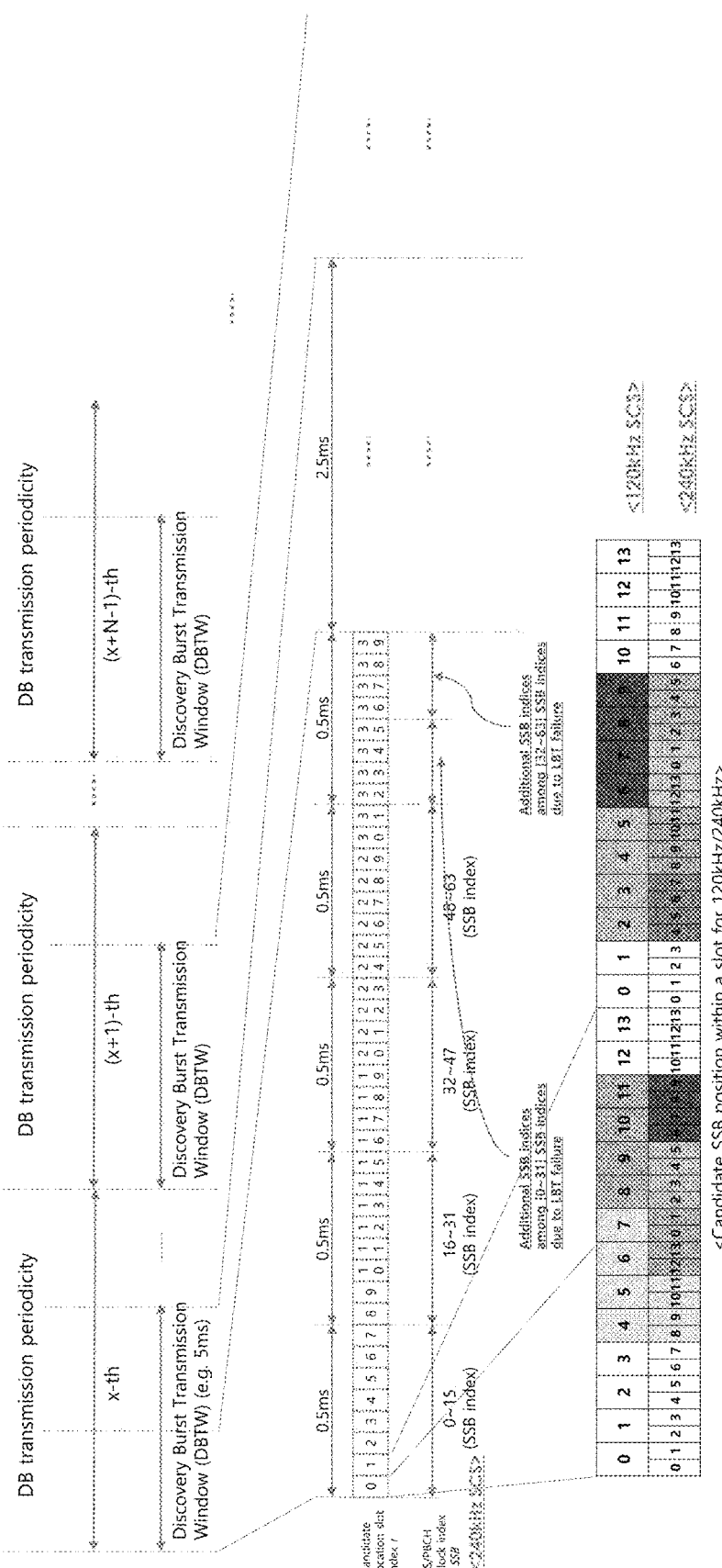

Locations where SSBs are transmitted in slots within the DBTW within the half frame may be grouped in units of bursts and transmitted. FIGS. 40 and 41 show a case where a subcarrier spacing is 120 kHz, and FIG. 42 shows a case where a subcarrier spacing is 240 kHz. Even when LBT exemption is possible even for frequency bands in an unlicensed band, SSB transmission locations may be grouped in units of bursts and transmitted. When the base station fails in LBT, a preconfigured additional candidate SSB location may be configured to transmit an SSB that the base station failed to transmit in the DBTW. Referring to FIGS. 40 to 42, additional candidate SSB locations may be configured in slots other than slots in which the existing SSBs may be transmitted, and when the UE receives an SSB at an additional candidate SSB location, the UE may perform time synchronization by using an additional candidate SSB location corresponding to the received SSB. The methods i) to iii) described above with reference to FIG. 39 may also be applied when an additional SSB index is transmitted in the additional candidate SSB location described above with reference to FIGS. 40 to 42. In addition, the methods a to d of 1) described above may also be applied when an additional SSB index is transmitted in the additional candidate SSB location described above with reference to FIGS. 40 to 42.

3) An SSB location in a slot may be configured differently from the configuration used in a frequency band exceeding 6 GHz in the existing NR system, and an SSB location in a half frame may be configured in the same manner as the configuration used in a frequency band exceeding 6 GHz in the existing NR system. In addition, additional candidate SSB locations according to LBT failure within a DBTW may be configured. This may be applied even when LBT exemption is possible even for frequency bands in an unlicensed band. When the base station fails in LBT, a preconfigured additional candidate SSB location may be configured to transmit an SSB that the base station failed to transmit in the DBTW. An additional candidate SSB index may be transmitted in a candidate SSB location, and the UE may apply the methods i) to iii) described above with reference to FIG. 39. In addition, when the above-described method 3) is applied, the above-described methods a to d of 1) may be applied.

4) A location of an SSB in a slot and an SSB location in a half frame may be configured differently from the configuration used in a frequency band exceeding 6 GHz in the existing NR system. In addition, additional candidate SSB locations according to LBT failure may be configured within a DBTW. In this case, locations where SSBs are transmitted in slots within the DBTW within the half frame may be grouped in units of bursts and transmitted.

Locations where SSBs are transmitted in slots within the DBTW within the half frame may be grouped in units of bursts and transmitted. FIGS. 40 and 41 show a case where a subcarrier spacing is 120 kHz, and FIG. 42 shows a case where a subcarrier spacing is 240 kHz. Even when LBT exemption is possible even for frequency bands in an unlicensed band, SSB transmission locations may be grouped in units of bursts and transmitted. When the base station fails in LBT, a preconfigured additional candidate SSB location may be configured to transmit an SSB that the base station failed to transmit in the DBTW. Referring to FIGS. 40 to 42, additional candidate SSB locations may be configured in slots other than slots in which the existing SSBs may be transmitted, and when the UE receives an SSB at an additional candidate SSB location, the UE may perform time synchronization by using an additional candidate SSB location corresponding to the received SSB. The methods i) to iii) described above with reference to FIG. 39 may also be applied when an additional SSB index is transmitted in the additional candidate SSB location described above with reference to FIGS. 40 to 42. In addition, the methods a to d of 1) described above may also be applied when an additional SSB index is transmitted in the additional candidate SSB location described above with reference to FIGS. 40 to 42.

Figure 44:
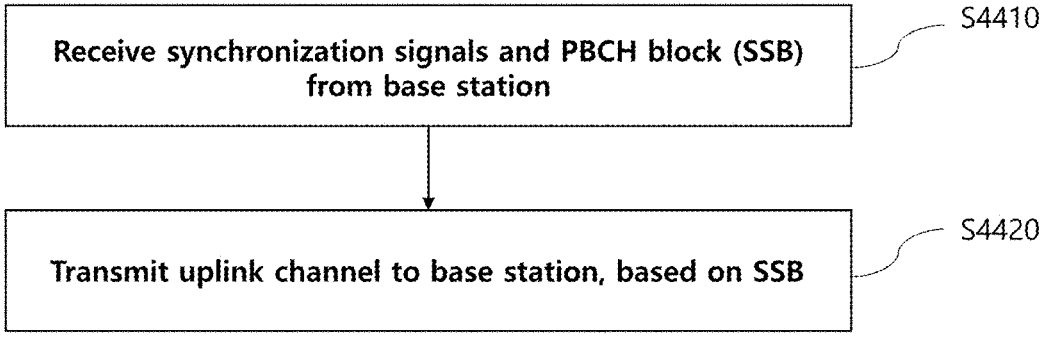
FIG. 44 is a flowchart showing a method for receiving a downlink signal and channel by a terminal according to an embodiment of the disclosure.

FIG. 44 is a flowchart showing a method for receiving a downlink signal and channel by a UE according to an embodiment of the disclosure.

Hereinafter, referring to FIG. 44, a method for receiving a downlink signal and channel by a UE described with reference to FIGS. 1 to 43 will be described.

A UE may receive a synchronization signals and PBCH block (SSB) from a base station (S4410). The UE may transmit an uplink channel to the base station, based on the SSB (S4420).

i) When a subcarrier spacing (SC S) is 480 KHz or 960 KHz, the SSB may be transmitted on a symbol mapped to a first SSB candidate set and a second SSB candidate set, each of which is configured by four symbols, and the first SSB candidate set and the second SSB candidate set may be mapped on one slot. A start symbol to which the first SSB candidate set is mapped may be a third symbol of the one slot, a start symbol to which the second SSB candidate set is mapped may be a tenth symbol of the one slot, and at least one gap symbol for beam sweeping may exist between the first SSB candidate set and the second SSB candidate set.

ii) When the subcarrier spacing (SCS) is 120 KHz, the SSB may be transmitted on a symbol mapped to a first SSB candidate set, a second SSB candidate set, a third SSB candidate set, and a fourth SSB candidate set, each of which is configured by four symbols. The first SSB candidate set, the second SSB candidate set, the third SSB candidate set, and the fourth SSB candidate set may be mapped on two slots. A start symbol to which the first SSB candidate set is mapped may be a fifth symbol of the two slots, a start symbol to which the second SSB candidate set is mapped may be a ninth symbol of the two slots, a start symbol to which the third SSB candidate set is mapped may be a seventeenth symbol of the two slots, and a start symbol to which the fourth SSB candidate set is mapped may be a twenty-first symbol of the two slots.

The SSB mapped to the first SSB candidate set and the second SSB candidate set when the subcarrier spacing (SCS) is 480 KHz or 960 KHz, and the SSB mapped to the first SSB candidate set, the second SSB candidate set, the third SSB candidate set, and the fourth SSB candidate set when the subcarrier spacing (SCS) is 120 KHz may be mapped to consecutive symbols.

When the subcarrier spacing (SCS) is 480 KHz or 960 KHz, a first symbol, a second symbol, an eighth symbol, and a ninth symbol of the one slot may be resources allocated for a control resource set (CORESET).

When the subcarrier spacing (SCS) is 480 KHz or 960 KHz, the at least one gap symbol may be a sixth symbol of the slot.

When the subcarrier spacing (SCS) is 480 KHz or 960 KHz, the one slot may be configured by a first half slot configured by seven symbols and a second half slot configured by seven symbols. The first SSB candidate set and the second SSB candidate set may be symmetrically mapped to the first half slot and the second half slot, respectively. The at least one gap symbol may be the last symbol of the first half slot.

When the subcarrier spacing (SCS) is 120 KHz, the SSB may be transmitted within a discovery burst transmission window (DBTW). The DBTW is a resource having the maximum length of 5 ms, and the maximum number of multiple SSBs transmittable in the DBTW may be 80. The DBTW may be configured by 40 slots. The first SSB candidate set, the second SSB candidate set, the third SSB candidate set, and the fourth SSB candidate set may be repeatedly mapped on a first slot set configured by slots other than a ninth slot, a tenth slot, a nineteenth slot, a twentieth slot, a twenty-ninth slot, a thirtieth slot, a thirty-ninth slot, and a fortieth slot among the 40 slots. Each of the slots configuring the first slot set may include two SSB candidate indexes indicating an SSB candidate set capable of transmitting the SSB. In odd-numbered slots among the slots configuring the first slot set, SSB candidates may be mapped to locations of symbols to which the first SSB candidate set and the second SSB candidate set are mapped. In even-numbered slots among the slots configuring the first slot set, SSB candidates may be mapped to locations of symbols to which the third SSB candidate set and the fourth SSB candidate set are mapped. Multiple SSB candidate sets capable of transmitting the SSB may be additionally mapped on a second slot set configured by the ninth slot, the tenth slot, the nineteenth slot, the twentieth slot, the twenty-ninth slot, the thirtieth slot, the thirty-ninth slot, and the fortieth slot among the 40 slots. Each of the slots configuring the second slot set may include two SSB candidate indexes indicating an SSB candidate set capable of transmitting the SSB. In odd-numbered slots among the slots configuring the second slot set, SSB candidates may be mapped to locations of symbols to which the first SSB candidate set and the second SSB candidate set are mapped. In even-numbered slots among the slots configuring the second slot set, SSB candidates may be mapped to locations of symbols to which the third SSB candidate set and the fourth SSB candidate set are mapped.

The UE may receive, from the base station, an indicator indicating that the multiple SSB candidate sets have been additionally mapped on the second slot set. The indicator may be a parameter indicating a subcarrier spacing included in a master information block (MIB). In this case, the subcarrier spacing may be a subcarrier spacing used for remaining minimum system information (RMSI). In addition, the indicator may be a parameter indicating an offset in a frequency domain included in the MIB. In this case, the offset may be an offset between resource blocks (RBs) available in a cell in which the UE and the SSB are included. The indicator may be a specific bit value of the MIB.

Figure 43:
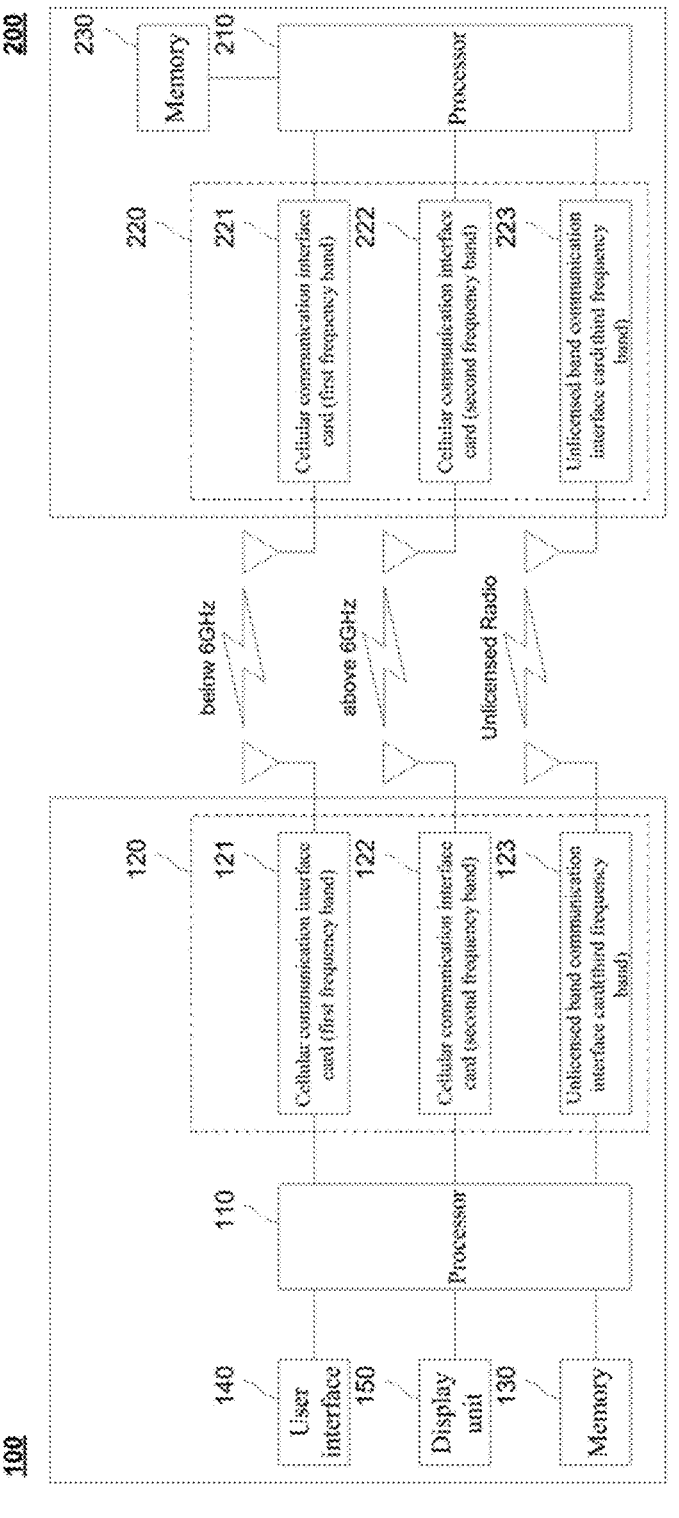
FIG. 43 is a block diagram showing a configuration of each of a terminal and a base station according to an embodiment of the disclosure.

A UE performing the method for receiving a downlink signal and channel described with reference to FIG. 44 may be the UE described with reference to FIG. 43. Specifically, the UE may include a communication module configured to transmit or receive a radio signal, and a processor configured to control the communication module. In this case, the method for receiving a downlink signal and channel described with reference to FIG. 44 may be performed through the processor. Similarly, a base station in this case may be the base station described with reference to FIG. 43. The base station may also include a communication module configured to transmit or receive a radio signal, and a processor configured to control the communication module. That is, the base station may transmit the downlink signal and channel described with reference to FIG. 44 to the UE. In this case, a method for transmitting a downlink signal and channel through a processor of a base station may be performed.

The method and the system of the disclosure are described in association with the specific embodiments, but some or all of the components or operations of the disclosure may be implemented by using a computing system having a universal hardware architecture.

The foregoing description of the disclosure is used for illustration and those skilled in the art to which the disclosure belongs will understand that the disclosure can be easily modified to other detailed forms without changing the technical spirit or an essential feature thereof. Therefore, it should be understood that the embodiments described above are illustrative in all aspects and are not limited. For example, each component described as a single type may be implemented to be distributed, and similarly, components described as being distributed may also be implemented in a combined form.

The scope of the disclosure is represented by the claims to be described below rather than the detailed description, and all changes or modified forms derived from the meaning and scope of the claims and their equivalent concepts should be construed as being included in the scope of the disclosure.

The invention claimed is:

1. A method performed by a terminal configured to operate in a wireless communication system, comprising:
  receiving a synchronization signals and physical broadcast channel block (SSB) from a base station; and
  transmitting an uplink channel to the base station, based on the SSB,
  wherein i) in case that a subcarrier spacing (SCS) is 480 KHz or 960 KHz, the SSB is transmitted on symbols mapped to a first SSB candidate and a second SSB candidate, each of which is configured by four symbols, the first SSB candidate and the second SSB candidate are mapped on one slot, and a start symbol to which the first SSB candidate is mapped is a third symbol of the one slot, a start symbol to which the second SSB candidate is mapped is a tenth symbol of the one slot, and at least one gap symbol is located between the first SSB candidate and the second SSB candidate, and ii) in case that the subcarrier spacing (SCS) is 120 KHz, the SSB is transmitted on symbols mapped to a third SSB candidate, a fourth SSB candidate, a fifth SSB candidate, and a sixth SSB candidate, each of which is configured by four symbols, the third SSB candidate, the fourth SSB candidate, the fifth SSB candidate, and the sixth SSB candidate are mapped on two slots, and a start symbol to which the third SSB candidate is mapped is a fifth symbol of the two slots, a start symbol to which the fourth SSB candidate is mapped is a ninth symbol of the two slots, a start symbol to which the fifth SSB candidate is mapped is a seventeenth symbol of the two slots, and a start symbol to which the sixth SSB candidate is mapped is a twenty-first symbol of the two slots.

2. The method of claim 1, wherein the SSB is mapped to four consecutive symbols.

3. The method of claim 1, wherein in case that the SCS is 480 KHz or 960 KHz, a first symbol, a second symbol, an eighth symbol, and a ninth symbol of the one slot are resources allocated for a control resource set (CORESET).

4. The method of claim 1, wherein in case that the SCS is 480 KHz or 960 KHz, the at least one gap symbol includes a seventh symbol of the one slot.

5. The method of claim 1, wherein in case that the subcarrier spacing (SCS) is 480 KHz or 960 KHz, the one slot is configured by a first half slot configured by seven symbols and a second half slot configured by seven symbols, and the first SSB candidate and the second SSB candidate are mapped to the first half slot and the second half slot in an identical form, respectively.

6. The method of claim 1, wherein in case that the SCS is 480 KHz or 960 KHz, the at least one gap symbol includes a last symbol of the one slot.

7. The method of claim 1, wherein in case that the SCS is 120 KHz, the SSB is transmitted within a discovery burst transmission window (DBTW), the DBTW is a resource having a maximum length of 5 ms, and multiple SSB candidates are transmittable in the DBTW.

8. The method of claim 7, wherein the DBTW is configured by 40 slots, the third SSB candidate, the fourth SSB candidate, the fifth SSB candidate, and the sixth SSB candidate are repeatedly mapped on a first slot set configured by slots other than a ninth slot, a tenth slot, a nineteenth slot, a twentieth slot, a twenty-ninth slot, a thirtieth slot, a thirty-ninth slot, and a fortieth slot among the 40 slots, and each of the slots configuring the first slot set comprises a first SSB candidate index and a second candidate SSB index.

9. The method of claim 8, wherein locations of SSB candidates mapped to odd-numbered slots among the slots configuring the first slot set are the same as locations to which the third SSB candidate and the fourth SSB candidate are mapped, and locations of SSB candidates mapped to even-numbered slots among the slots configuring the first slot set are the same as locations to which the fifth SSB candidate and the sixth SSB candidate are mapped.

10. The method of claim 8, wherein the multiple SSB candidates capable of transmitting the SSB are additionally mapped on a second slot set configured by the ninth slot, the tenth slot, the nineteenth slot, the twentieth slot, the twenty-ninth slot, the thirtieth slot, the thirty-ninth slot, and the fortieth slot among the 40 slots, and each of the slots configuring the second slot set comprises a third SSB candidate index and a fourth SSB candidate index.

11. The method of claim 10, wherein locations of SSB candidates mapped to the odd-numbered slots among the slots configuring the second slot set are the same as locations to which the third SSB candidate and the fourth SSB candidate are mapped, and locations of SSB candidates mapped to the even-numbered slots among the slots configuring the second slot set are the same as locations to which the fifth SSB candidate and the sixth SSB candidate are mapped.

12. The method of claim 10, further comprising receiving, from the base station, an indicator indicating that the multiple SSB candidates have been additionally mapped on the second slot set.

13. The method of claim 1, wherein the SSB is transmitted on symbols mapped to a plurality of SSB candidates, wherein the plurality of SSB candidates are mapped to a plurality of slots, wherein the plurality of SSB candidates are indexed, receiving, from the base station, information related to an index of the plurality of SSB candidates, wherein the information is included in a master information block (MIB).

14. A terminal configured to operate in a wireless communication system, the terminal comprising:

a communication module; and a processor configured to control the communication module, wherein the processor is configured to:

receive a synchronization signals and physical broadcast channel block (SSB) from a base station; and transmit an uplink channel to the base station, based on the SSB, wherein i) in case that a subcarrier spacing (SCS) is 480 KHz or 960 KHz, the SSB is transmitted on symbols mapped to a first SSB candidate and a second SSB candidate, each of which is configured by four symbols, the first SSB candidate and the second SSB candidate are mapped on one slot, and a start symbol to which the first SSB candidate is mapped is a third symbol of the one slot, a start symbol to which the second SSB candidate is mapped is a tenth symbol of the one slot, and at least one gap symbol is located between the first SSB candidate and the second SSB candidate, and ii) in case that the subcarrier spacing (SCS) is 120 KHz, the SSB is transmitted on symbols mapped to a third SSB candidate, a fourth SSB candidate, a fifth SSB candidate, and a sixth SSB candidate, each of which is configured by four symbols, the third SSB candidate, the fourth SSB candidate, the fifth SSB candidate, and the sixth SSB candidate are mapped on two slots, and a start symbol to which the third SSB candidate is mapped is a fifth symbol of the two slots, a start symbol to which the fourth SSB candidate is mapped is a ninth symbol of the two slots, a start symbol to which the fifth SSB candidate is mapped is a seventeenth symbol of the two slots, and a start symbol to which the sixth SSB candidate is mapped is a twenty-first symbol of the two slots.

15. The terminal of claim 14, wherein the SSB is mapped to four consecutive symbols.

16. The terminal of claim 14, wherein in case that the SCS is 480 KHz or 960 KHz, a first symbol, a second symbol, an eighth symbol, and a ninth symbol of the one slot are resources allocated for a control resource set (CORESET).

17. The terminal of claim 14, wherein in case that the SCS is 480 KHz or 960 KHz, the at least one gap symbol includes a seventh symbol of the one slot.

18. A method performed by a base station configured to operate in a wireless communication system, the method comprising:

transmitting a synchronization signals and physical broadcast channel block (SSB) to a terminal; and receiving an uplink channel based on the SSB from the terminal, wherein i) in case that a subcarrier spacing (SCS) is 480 KHz or 960 KHz, the SSB is transmitted on symbols mapped to a first SSB candidate and a second SSB candidate, each of which is configured by four symbols, the first SSB candidate and the second SSB candidate are mapped on one slot, and a start symbol to which the first SSB candidate is mapped is a third symbol of the one slot, a start symbol to which the second SSB candidate is mapped is a tenth symbol of the one slot, and at least one gap symbol is located between the first SSB candidate and the second SSB candidate, and ii) in case that the subcarrier spacing (SCS) is 120 KHz, the SSB is transmitted on symbols mapped to a third SSB candidate, a fourth SSB candidate, a fifth SSB candidate, and a sixth SSB candidate, each of which is configured by four symbols, the third SSB candidate, the fourth SSB candidate, the fifth SSB candidate, and the sixth SSB candidate are mapped on two slots, and a start symbol to which the third SSB candidate is mapped is a fifth symbol of the two slots, a start symbol to which the fourth SSB candidate is mapped is a ninth symbol of the two slots, a start symbol to which the fifth SSB candidate is mapped is a seventeenth symbol of the two slots, and a start symbol to which the sixth SSB candidate is mapped is a twenty-first symbol of the two slots.

* * * * *